United States Patent [19]
Gomi et al.

[11] Patent Number: 5,416,393
[45] Date of Patent: May 16, 1995

[54] LEGGED MOBILE ROBOT FOOT STRUCTURE

[75] Inventors: Hiroshi Gomi; Masao Nishikawa; Masato Hirose; Hideaki Takahashi; Takashi Matsumoto; Akira Takeno, all of Saitama, Japan

[73] Assignee: Honda Giken Kogyo Kabushiki Kaisha, Tokyo, Japan

[21] Appl. No.: 65,124

[22] Filed: May 20, 1993

[30] Foreign Application Priority Data

| May 20, 1992 | [JP] | Japan | 4-152745 |
| May 20, 1992 | [JP] | Japan | 4-152746 |
| May 20, 1992 | [JP] | Japan | 4-152747 |

[51] Int. Cl.⁶ ............................................. G05B 19/00
[52] U.S. Cl. .......................... 318/568.2; 318/568.12; 318/568.1; 901/1; 395/80; 180/8.1; 180/8.6
[58] Field of Search .................... 318/560-646; 395/80-99; 901/1, 3, 5, 7, 9, 12, 13, 15, 23, 45-49; 180/8.1-8.9; 414/730-735

[56] References Cited

U.S. PATENT DOCUMENTS

| 4,641,251 | 2/1987 | Inoue | 901/1 X |
| 4,776,852 | 10/1988 | Rubic | 623/26 |
| 4,834,200 | 5/1989 | Kajita | 180/8.1 |
| 5,151,859 | 9/1992 | Yoshino et al. | 364/424.02 |
| 5,159,988 | 11/1992 | Gomi et al. | 180/8.6 |
| 5,206,569 | 4/1993 | Ozawa | 318/568.12 |
| 5,221,883 | 6/1993 | Takenaka et al. | 318/568.12 |
| 5,236,385 | 8/1993 | May | 446/300 |
| 5,252,901 | 10/1993 | Ozawa et al. | 318/568.12 |
| 5,255,753 | 10/1993 | Nishikawa et al. | 180/8.6 |

FOREIGN PATENT DOCUMENTS

| 62-97005 | 6/1987 | Japan |
| 62-97006 | 6/1987 | Japan |
| 3184781 | 12/1991 | Japan |
| 3184782 | 12/1991 | Japan |

OTHER PUBLICATIONS

"Body Building" By Wayne Harlow And Mark Ford, Creative Visual COmmunication 1982.

Primary Examiner—Paul Ip
Attorney, Agent, or Firm—Lyon & Lyon

[57] ABSTRACT

A foot structure of a biped waling mobile robot having a body and two articulated legs each having a foot at its distal end. In the foot structure, a movable foot piece is housed in each foot which is driven by an actuator to be swung out to enlarge the ground contact surface. A controller provided for the actuator and based on a condition of walking such as stair descending, it controls the operation of the actuator such that the foot's ground contact surface is enlarged. The structure has another aspect in which a ratio between distances from a point at which the foot is connected to the leg to the foot ends can also be adjusted in response to the walking condition. Moreover, the foot can be arranged such that the foot is configured to have portions to be contact with the ground at its four corners and the movable foot pieces have additional contact portion enlarging or reducing the ground contact portions.

46 Claims, 53 Drawing Sheets

Forward ⇐

LEGGED MOBILE ROBOT FOOT STRUCTURE

BACKGROUND OF THE INVENTION

1. Field of the Invention

This invention relates to a legged mobile robot having a foot structure, more particularly to a legged mobile robot having a foot structure which increases the stability of the robot during walking.

2. Description of the Prior Art

Many improvements relating to legged walking mobile robots have been proposed. Improvements applicable to the autonomous biped type mobile walking robot can be found, for example, in Japanese Laid-open Patent Publication Nos. 62(1987)-97,005 and 62(1987)-97,006. Improvements relating specifically to the foot structure of the biped type mobile walking robot are disclosed in the assignee's Japanese Laid-open Patent Publication No. 3(1991)-184,781.

Among the different types of mobile walking robots, the biped walking type robot is by nature the most unstable. Depending on the conditions of the ground or other surface the robot walks over, the walking environment, the walking speed and the like, it is often difficult to maintain the robot stable during walking. Although it is relatively easy for the robot to maintain its stability during low-speed walking on a flat horizontal surface, the biped walking robot tends to become unstable under various unusual circumstances, as during stair climbing and descent, walking on an inclined surface, walking over a surface with obstacles, and walking at high speed. Biped walking may also be made difficult by external environmental factors such as earthquake-induced vibration and the wind.

One conceivable way of increasing the stability of a biped walking type legged robot during walking is to design the robot's feet to have a large ground contact surface, i.e. a large surface for making contact with the terrain. Depending on the walking conditions, however, simply making the feet larger may have the opposite effect of destabilizing the robot. For example, when a robot with big feet climbs stairs, the toes of its feet are apt to catch on the step overhangs that are usually provided on stairs. When this happens, there is a high likelihood of the robot falling over. Moreover, when a robot steps over a projection or other such obstacle on the terrain, the likelihood of its falling over because the toe or heel portion of the foot comes in contact with the obstacle is greater if its feet are large. On the other hand, during fast walking there is a greater possibility of interference between the feet and resulting tip over if the feet are large. While there are also many other circumstances in which large feet tend to detract from the walking stability, those mentioned in the foregoing are sufficient to show that simply making a robot's feet larger does not provide a basic solution to the problem of how to increase stability during walking.

SUMMARY OF THE INVENTION

This invention was accomplished in the light of the foregoing circumstances and has as its basic object to provide a legged mobile robot having a foot structure which enables to maintain its stability at all times during walking irrespective of the terrain condition, the walking speed or changes in the surrounding conditions.

Moreover, for example, even what are generally considered flat terrains generally include bumps and depressions to some degree. Even if these bumps and depressions are minute, the robot's walking nevertheless becomes unstable if a part of the ground contact surface of a foot lands on a local bump, because the bump causes the foot ground contact surface to tilt and prevents it from making uniform contact with the terrain. On the other hand, the point which functions to support the robot with respect to the terrain during walking so as to prevent it from tipping over (the support point) is located at the edge of the foot of the leg most distant from the ankle joint center. Closer points do not function as support points. Because of this, it will be considered not to form a ground contact surface over the entire foot but to form discrete ground contact surfaces only at the four corners of the foot. Specifically, elastic pads made of rubber or the like and serving as cushioning member will be provided at four locations situated two each on the left and right sides of a vertical plane parallel to the direction of advance of the robot and passing through the center of ankle joint, the two elastic pads on either side being situated one each at the forward and rearward ends with respect to the direction of robot advance. (In other words, the elastic pads are located at four corners of the foot.) The four corner regions thus constitute the ground contact portions making up the effective ground contact surface with respect to the terrain.

Since forming the ground contact portions only at the four corners of the feet provides the feet with only a small effective ground contact surface area relative to the terrain, however, it may, under certain walking circumstances, become a cause for walking instability, contrary to what is intended. As will be explained in more detail later, this may become the case, for example, in climbing and descending stairs. This is because during stair climbing and descent it frequently happens that the whole foot does not land on the step surface. The toe of the foot tends to extend off the step surfaces during stair descent and the heel tends to stick out during stair climbing. Therefore, if ground contact portions are formed only at the four corners of the foot, a non-ground contact portion (a portion not provided with a cushioning member) comes in contact with the edge of the step when the ground contact portions at either the toe or heel end are off the step surface. Since this causes the foot to tilt relative to the step surface, the robot may become unstable and tip over.

Another object of the invention is therefore to provide a legged mobile robot having a foot structure which enables to maintain its stability at all times during walking including stair climbing or descending irrespective of the terrain condition.

For realizing this object, the present invention provides a legged mobile robot having at least one leg with a foot contacting the ground, comprising a movable foot piece, an actuator connected with the movable foot piece for driving the movable foot piece in a first direction in which a surface of the foot contacting the ground is enlarged or a second direction in which the surface is reduced, and a controller connected with the actuator for controlling the operation of the actuator.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

Embodiments of the invention will now be explained based on a biped walking robot as an example of an actuator.

Figure 1:
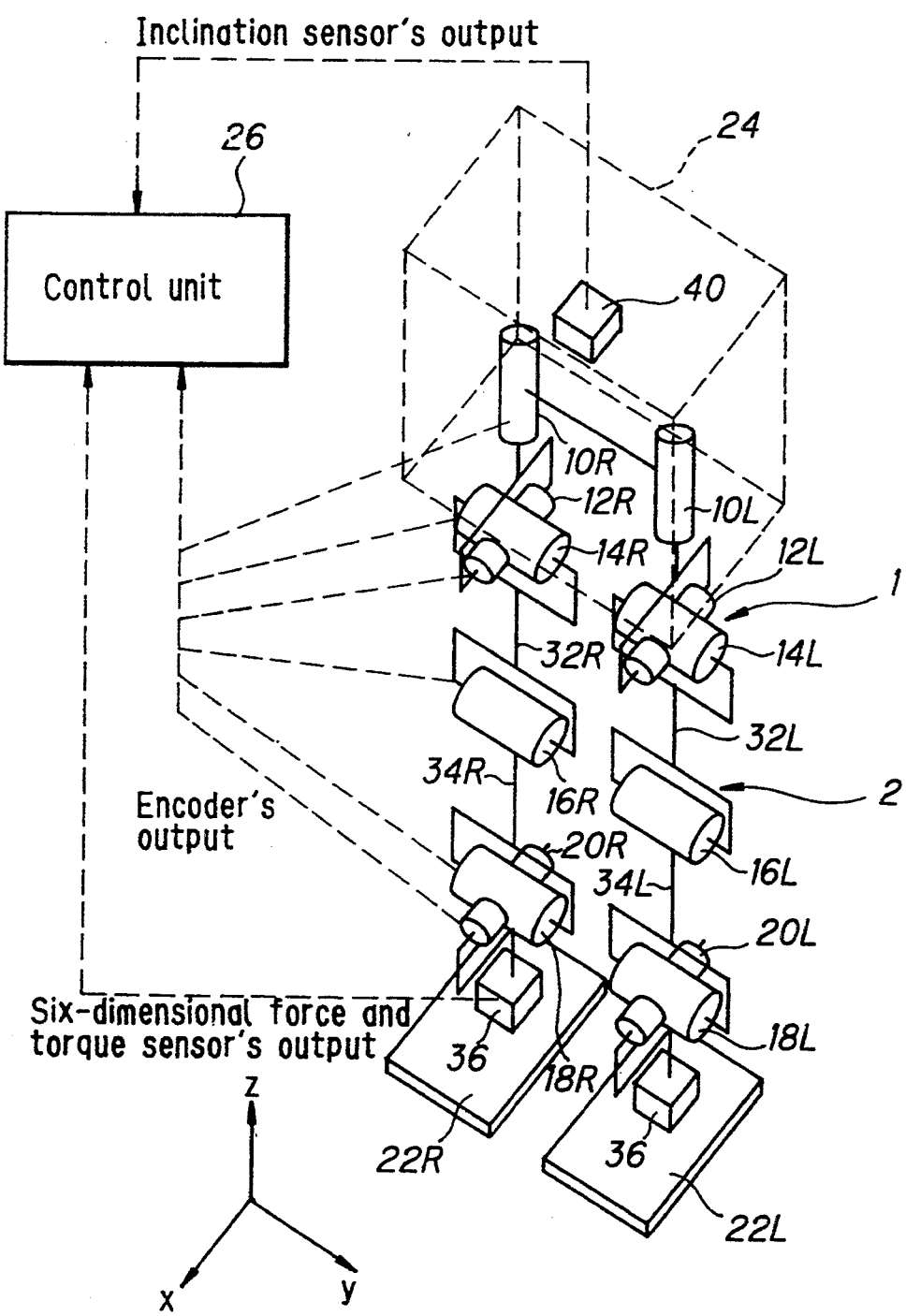
FIG. 1 is a schematic view showing the overall configuration of a control system of a legged mobile robot to be equipped with a foot structure according to the invention.

An overall skeleton view of a biped walking robot 1 is shown in FIG. 1. The robot 1 has left and right legs 2, 2 each having six joints (axes). (To make the arrangement easier to understand, the joints (axes) are represented as the electric motors by which they are driven.) The six joints (axes) are, starting at the top, joints (axes) 10R, 10L for swiveling (generally horizontal rotation about the z axis) of the legs at the hip (R and L indicating the right and left legs), joints (axes) 12R, 12L for rotation at the hip in the pitch direction (rotation about the x axis), joints (axes) 14R, 14L for rotation at the hip in the roll direction (rotation about the y axis), joints (axes) 16R, 16L for rotation at the knee in the roll direction, joints (axes) 18R, 18L for rotation at the ankle in the roll direction and joints (axes) 20R, 20L for rotation at the ankle in the pitch direction. Feet 22R, 22L, the structure of which will be explained later in detail, are provided at the lower end of this arrangement and a body (main unit) 24 housing a control unit 26 is provided at the upper end. The hip joints in the foregoing configuration are constituted by the joints (axes) 10R(L), 12R(L) and 14R(L) and the ankle joints by the joints (axes) 18R(L) and 20R(L). The hip and knee joints are connected by thigh links 32R, 32L and the knee joints and ankle joints by crus links 34R, 34L.

The respective legs 2,2 have six degrees of freedom, so that during locomotion the legs as a whole can be caused to execute the desired motion by driving the 6×2=12 joints (axes) to appropriate angle. The robot is thus capable of walking freely within three dimensional space. The joints are provided mainly with electric motors, as was mentioned earlier, and reduction gear mechanism for increasing motor torque. The structure of the joints is described in the assignee's earlier Japanese Patent Application No. 1(1989)-324,218 (Japanese Laid-Open Patent Publication No. 3(1991)-184,782) etc., and since it is not essential aspect of the invention, will not be explained further here.

The individual ankles of the robot 1 shown in FIG. 1 are provided with a six-dimensional force and torque sensor 36 of conventional design. By measuring the x, y and z force components Fx, Fy and Fz transmitted to the robot through the feet and also measuring the moment components Mx, My and Mz around the three axes, the six-dimensional force and torque sensor 36 detects whether or not the associated feet has landed and the magnitude and direction of the forces acting on the supporting leg. The sole of each foot member is equipped at its four corners with touchdown switches 38, not illustrated in FIG. 1, of conventional design for detecting whether or not the foot is in contact with the ground. The top of the body 24 is provided with an inclination sensor 40 for detecting the robot's inclination angle and angular velocity relative to z axis in the x-z and y-z planes. Each electric motor at the individual joints is provided with a rotary encoder for generating rotational information. And, although not illustrated in FIG. 1, the robot 1 is provided with a zero reference switch 42 for calibrating the output of the inclination sensor 40 and a limit switch 44 for a fail safe. The outputs of the sensors 36 and the like are sent to the control unit 26 in the body.

Figure 2:
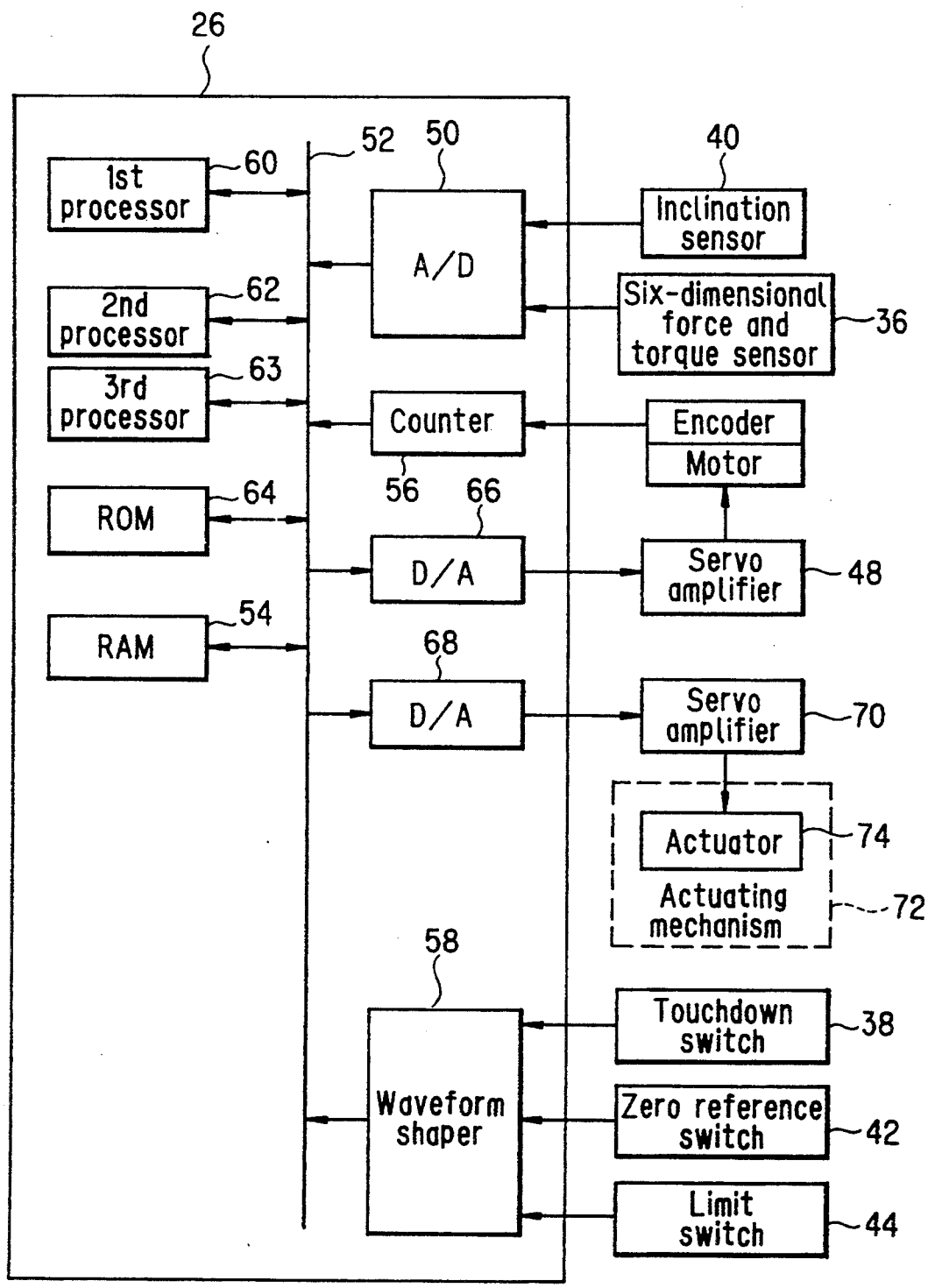
FIG. 2 is a block diagram showing the details of a control unit illustrated in FIG. 1.

As shown in the block diagram of FIG. 2, the control unit 26 has a microcomputer. The outputs from the inclination sensor 40 etc. are converted into digital signals by an A/D converter 50 and the resulting digital values are sent via a bus 52 to a RAM (random access memory) 54 for storage. In addition, the outputs of encoders disposed adjacent to the respective motors are input to the RAM 54 through a counter 56, while outputs of the touchdown switches 38 and the like are stored in the RAM 54 via a waveform shaper 58. The control unit has a first processor 60, a second processor 62 and a third processor 63 each made of a CPU. The first processor 60 fetches a walking pattern defined in advance in terms of joint trajectories from a ROM (read-only memory) 64, computes target joint angles and outputs the same to the RAM 54, while outputting information of the walking condition obtained from the walking pattern to the third processor 63. The second processor 62 fetches the target joint angles and measured joint angles from the RAM 54, computes control commands of the individual joint motors and sends the same to associated servo amplifier 48 thereof via a D/A converter 66. The third processor 63 receives the information of the walking condition from the first processor 60 and any other information such as a touchdown of the foot detected by the touchdown switches 38, the existence of obstacles and stairs to be detected by a vision sensor (not shown) and the occurrence of earthquakes to be sensed by a seismometer (not shown). Based on the information, the third processor 63 determines and sends control values for an actuator 74 of an actuating mechanism 72 provided at the individual feet 22 via a second D/A converter 68 and a second servo amplifier 70 as will be referred to just below.

The foot structure of the robot according to the invention will now be explained in detail with reference to FIG. 3 and later figures.

Figure 3:
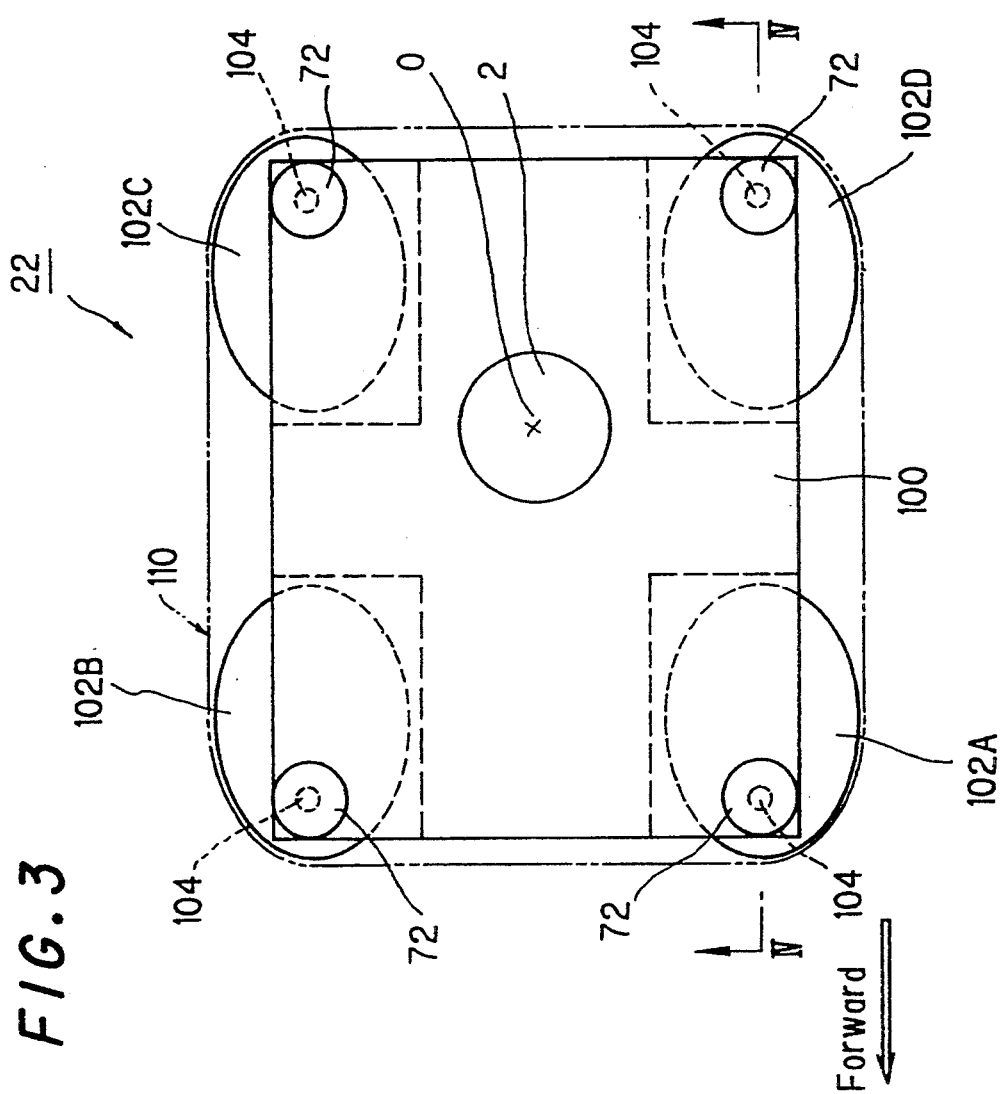
FIG. 3 is a plan view of a foot structure according to a first embodiment of the invention.
Figure 4:
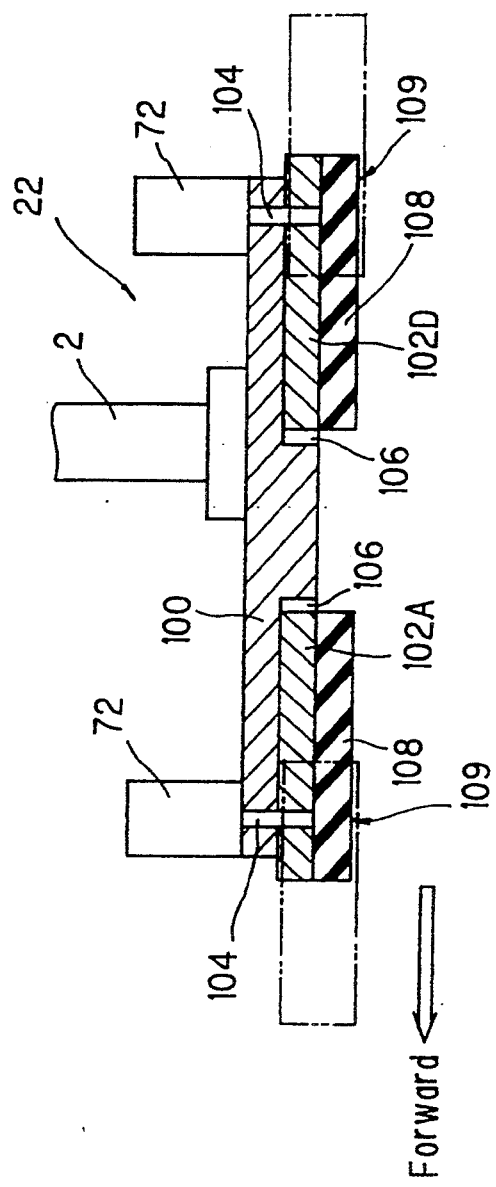
FIG. 4 is a sectional view taken along the line IV—IV of FIG. 3.

FIGS. 3 and 4 show a first embodiment of the foot structure according to the invention, specifically an example of the structure of the foot 22R (L) of the robot 1 of FIG. 1. Since the robot's left and right feet are symmetrical, the foot is designated in this and the following figures simply as "foot 22" without a symbol L or R to indicate whether it is the left foot or the right foot. As shown in FIGS. 3 and 4, the foot 22 comprises a plate-like main foot member 100 attached to the lower end of the individual legs 2 of the robot 1. The main foot member 100 is rectangular in plan view and is attached to the leg 2 at a position such that the distance between the central point of attachment (more precisely the point of vertical projection of the ankle joint on the main foot member 100) O and the leading end of the foot 22 (i.e. between the ankle and the toe) is longer than the distance between the central point of attachment O and the trailing edge (i.e. between the ankle and the heel). Plate-like movable foot pieces 102A, 102B, 102C and 102D of elliptical shape in plan view are disposed on the bottom surface of the main foot member 100 at the four corners thereof. The movable foot pieces 102A-102D are supported via support shafts 104 so as to be rotatable in a horizontal plane (a plane parallel to the ground). The actuating mechanism 72 is provided at each upper surface corner of the main foot member 100 for rotating the corresponding support shaft 104 about its axis. The actuating mechanisms 72 can, as in the illustrated arrangement, be constituted using the actuators (indicated by reference numeral 74 in FIG. 2) constituted as geared electric motors or pneumatic or hydraulic rotary actuators.

The support shafts 104 are connected with an off-center point of the associated movable foot pieces 102A-102D. Therefore, as will be explained more thoroughly later, rotation of the movable foot pieces 102A-102D varies the amount by which they project beyond the main foot member 100 as seen in plan view.

The main foot member 100 is formed at the four corners of its bottom surface with recesses 106 for accommodating the rotatable movable foot pieces 102A-102D, and the bottoms of the movable foot pieces 102A-102D have elastic pads 108 made of rubber or the like attached thereto. Although in an actual foot the bottom edges of the elastic pads 108 are usually beveled or curved, this feature is omitted from the drawings in the interest of simplicity. The touchdown switches 38 are usually mounted on the movable foot pieces 102A-102D. (In the interest of simplicity, they are not shown in FIGS. 3 and 4.)

Figure 5:
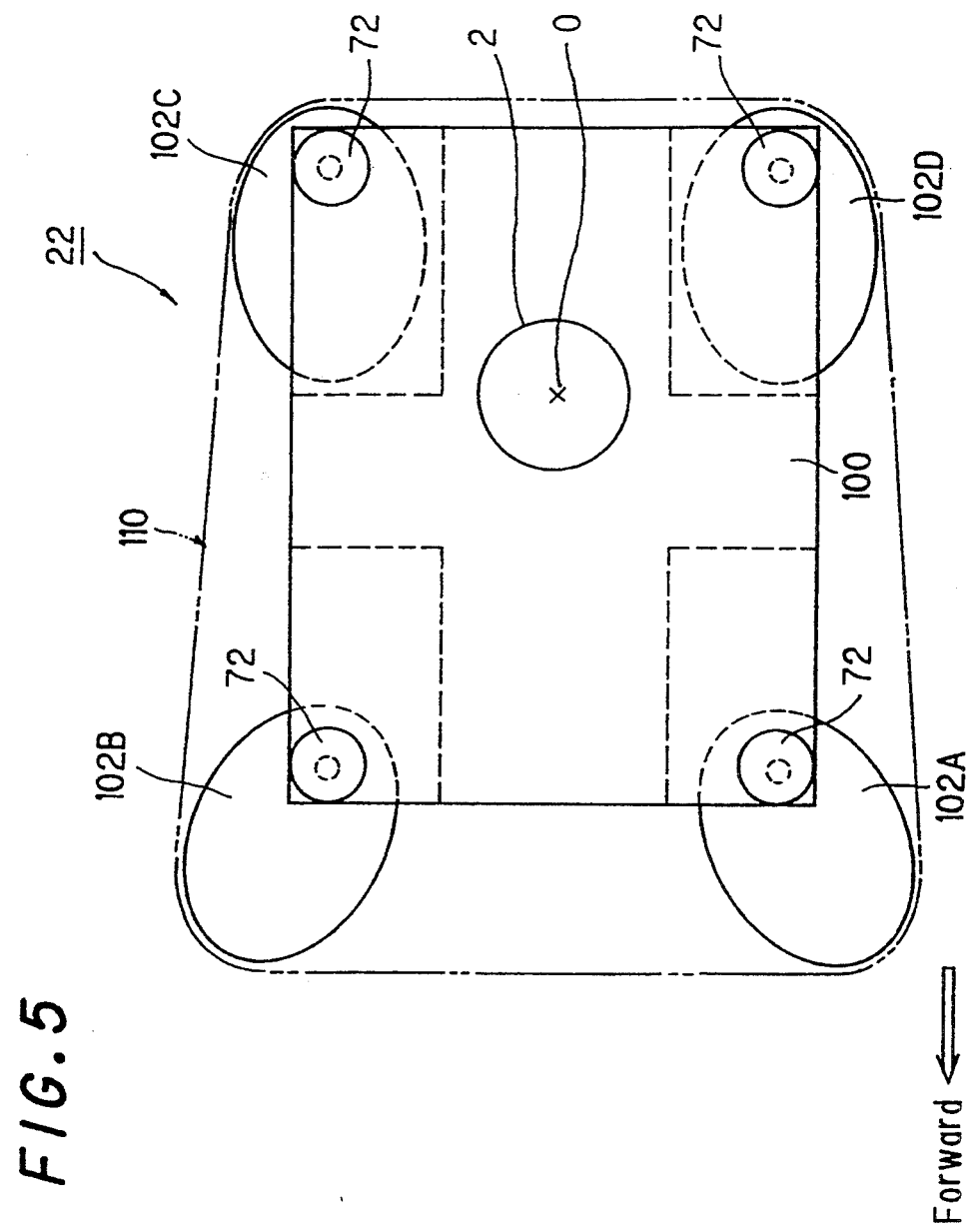
FIGS. 5 to 7 are plan views of the foot structure showing movable foot pieces swung out to enlarge foot's ground contact surface.
Figure 6:
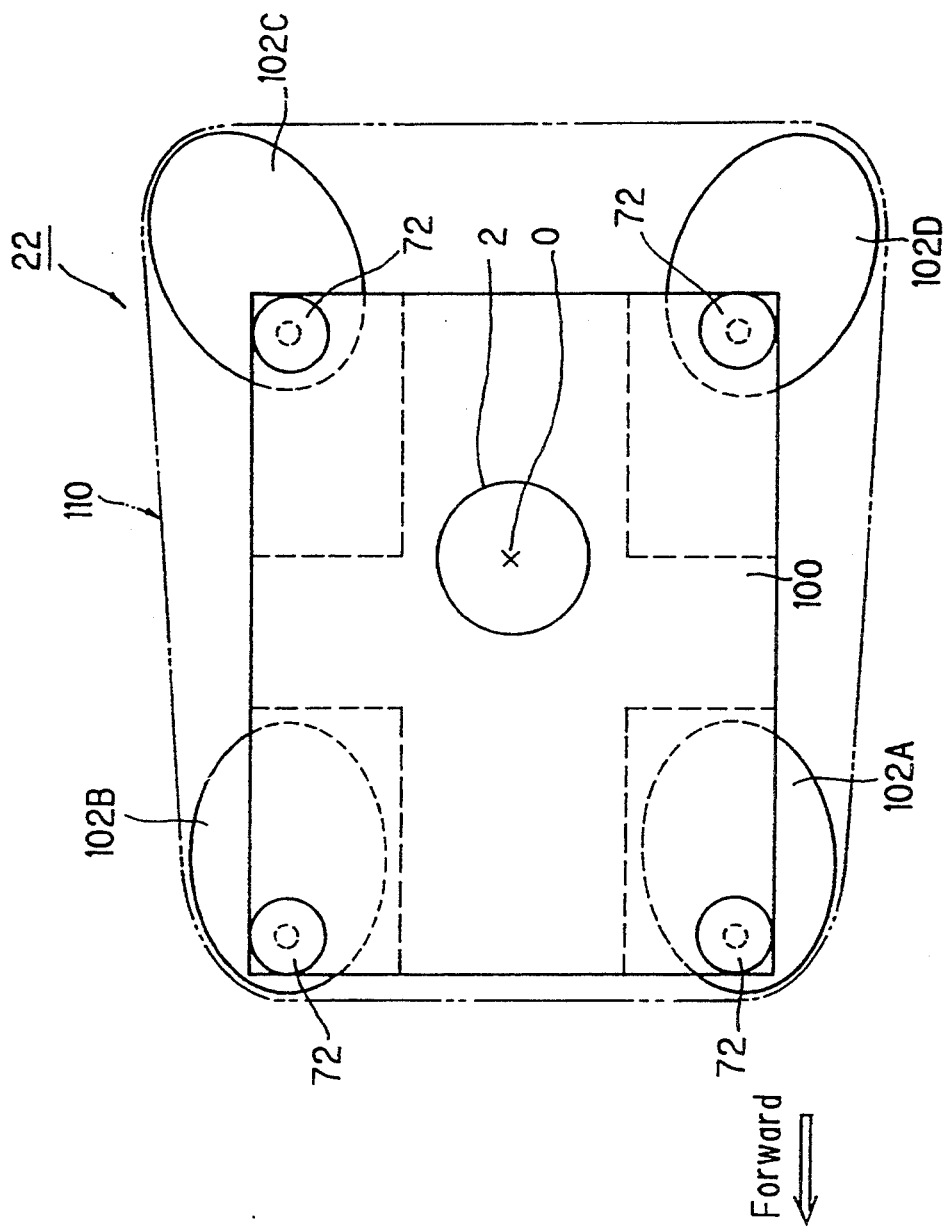
Figure 7:
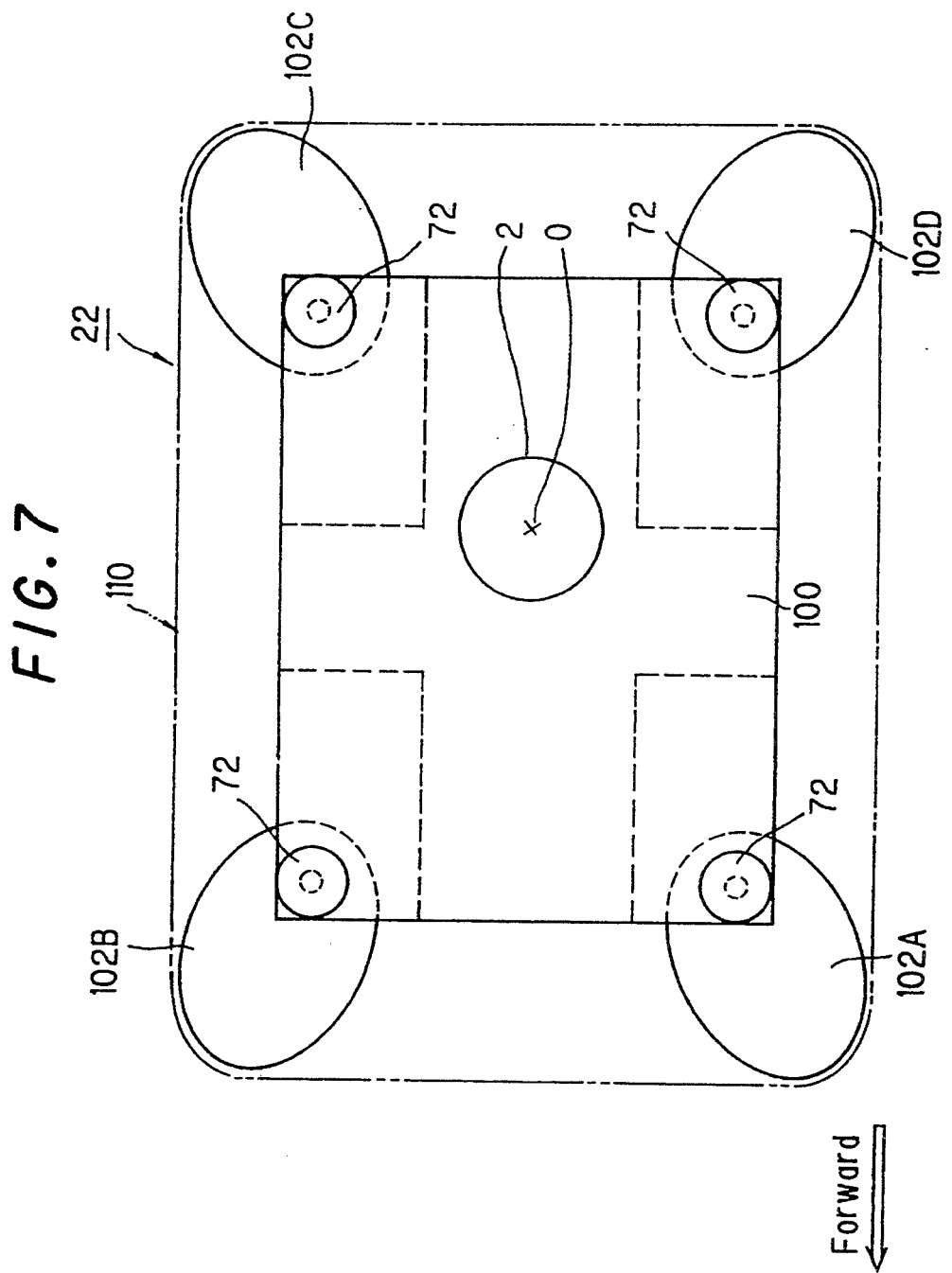

The functions of the foot structure according to the embodiment of FIGS. 3 and 4 will now be explained with reference to FIGS. 5 to 7. In this embodiment, during walking, only the bottom surfaces of the movable foot pieces 102A–102D, more precisely the bottom surfaces of the elastic pads 108, constitute an effective ground contact surface 109 (shown in FIG. 4) with respect to the terrain. The perimeter of the effective ground contact surface 109 is indicated by two-dash envelope lines 110 in FIGS. 3, 5, 6 and 7. The region enclosed by the envelope 110 is the equivalent ground contact region. The area of the equivalent ground contact region is smallest in the state shown in FIGS. 3 and 4. From this state, if one of the actuating mechanisms 72 is operated, the associated foot piece (e.g. the one associated with movable foot piece 102A) is rotated in the horizontal plane (and therefore in the effective ground contact plane), causing it to project out from the recess 106 of the main foot member 100. The equivalent ground contact region is thus enlarged by the amount that the movable foot piece 102A is projected relative to the main foot member 100. FIG. 5 shows the two movable foot pieces 102A, 102B at the toe end corners simultaneously swung obliquely forward, FIG. 6 shows the two movable foot pieces 102C, 102D at the heel end corners simultaneously swung out, and FIG. 7 shows all of the movable foot pieces 102A–102D simultaneously swung out.

Thus the equivalent ground contact region can be enlarged and reduced by appropriately rotating the movable foot pieces 102A–102D. Moreover, since the movable foot pieces 102A–102D of the present embodiment are provided with the individual actuating mechanisms 72, they can be rotated independently. It is therefore possible to swing only the toe end movable foot pieces 102A, 102B obliquely forward as shown in FIG. 5 so as to enlarge the equivalent ground contact region only at the toe end or swing only the heel end movable foot pieces 102A–102D obliquely rearward as shown in FIG. 6 so as to enlarge the equivalent ground contact region only at the heel end.

Figure 8:
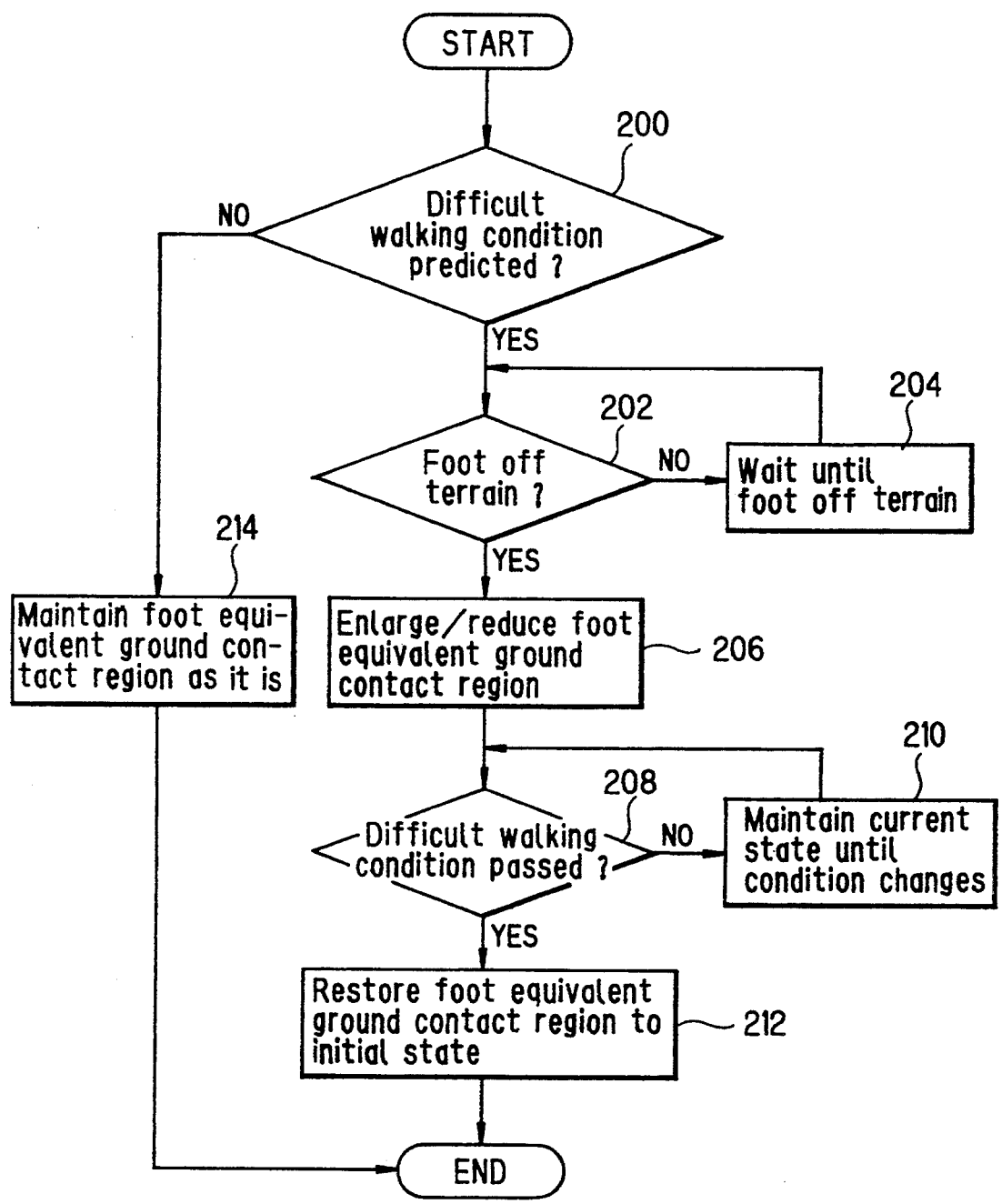
FIG. 8 is a flow chart showing how to control operation of an actuator for driving the movable foot pieces.

FIG. 8 is a flow chart of the operations for controlling the aforesaid foot structure in response to the walking conditions. In step 200, at the start of the control, a discrimination is made as to whether or not a condition can be expected to arise which will make it difficult to continue the walking started with the equivalent ground contact region of the feet in the initial state. By conditions which make walking difficult are meant, for example, stair climbing, stair descent, presence of obstacles on the terrain, terrain slopes, earthquakes, strong winds, other environmental factors, and increase of walking speed. The discrimination of such conditions can be conducted in the third processor 63 on the basis of the walking condition information, on the basis of the information obtained by actual detection of the presence of stairs or obstacles using the vision sensor or by detection of earthquake occurrence using the seismometer, or on the basis of both types of information. If the result of the discrimination in step 200 is YES, i.e. if a condition that will make walking difficult is expected to arise, control passes to step 202. On the other hand, if such a condition is not expected (NO), control passes to step 214 in which the initial state is maintained (the area of the equivalent ground contact region is not changed) and the control routine is terminated. Specifically, the actuators 74 of the foot actuating mechanisms 72 are not operated and the movable foot pieces 102A–102D are not operated.

When control passes to step 202, a discrimination is made as to whether or not the foot ground contact surfaces are off the terrain (ground). This is necessary because the actuators 74 of the foot actuating mechanism 72 (and thus the movable foot pieces 102A–102D) are driven only when the foot is off (not in contact with) the terrain. Otherwise the extremely high load that would act on the actuators 74 of the actuating mechanisms 72 should the movable foot pieces 102A–102D be operated when the foot is in contact with the terrain would make it difficult to operate the actuators 74 and might damage them. The discrimination in step 202 can be made on the basis of the ground contact detection signals from the touchdown switches 38 mounted on the feet or from the signal output by the six-dimensional force and torque sensors 36. When the result of the discrimination in step 202 is NO, i.e. when it is found that the foot is not off the terrain, control passes to step 204 where it waits until the foot rises off the terrain and then returns to step 202 after passage of a prescribed period of time. When the result of the discrimination in step 202 is YES, i.e. when it is found that the foot is off the terrain, control passes to step 206.

Step 206 drives one or more of the actuators 74 of the actuating mechanisms 72 associated with the movable foot pieces 102A–102D so as to enlarge or reduce the equivalent ground contact region. Step 206 may drive the actuators 74 either to enlarge or reduce the equivalent ground contact region, depending on the type of condition predicted to arise in step 200. In response to the predicted type of condition, step 206 also selects the distribution of the foot at which the equivalent ground contact region is to be enlarged or reduced (e.g. whether the enlargement/reduction is to be at the toe, at the heel or at both). In addition, it adjusts the amount of change (enlargement or reduction) in the equivalent ground contact region in accordance with the degree of difficulty presented by the detected condition. The selection between equivalent ground contact region enlargement/reduction, the selection of the enlargement/reduction distribution and the adjustment of the amount of enlargement/reduction are ordinarily conducted in step 200.

Steps 202, 204 and 206 are executed separately or serially for the left and right feet (22L, 22R) of the biped walking type robot. After the foot equivalent ground contact region has been enlarged or reduced in step 206, walking is continued while maintaining the new foot equivalent ground contact region area. In the meantime, control passes to step 208 in which a discrimination is conducted as to whether or not the difficult walking condition has passed and the initial condition been restored. In other words, a discrimination is made as to whether the difficult condition has ceased to exist during the walking following the completion of step 206. When the result in step 208 is NO, i.e. when it is found that the difficult walking condition has not passed, control passes to step 210 in which the current state of the equivalent ground contact region is maintained, whereafter, following passage of a prescribed period of time, control returns to step 208. On the other hand, when the result in step 208 is YES, i.e. when it is found that the difficult walking condition has ceased to exist, control passes to step 212.

Step 212 reduces or enlarges the equivalent ground contact region so as to restore it to the initial area.

Namely, it operates the actuators 74 of the actuating mechanisms 72 so as to restore the movable foot pieces 102A-102D to their initial positions. While not indicated in FIG. 8, similarly to what was explained earlier in connection with steps 202 and 204, step 212 is executed for operating the actuators 74 of the actuating mechanisms 72 only when the foot is off the terrain. When the foot is in contact with the terrain, operation of the actuators 74 is delayed until the foot rises off the terrain. Step 212 is also executed separately or serially for the left and right feet (22R, 22L).

Thus when it is predicted that walking will become difficult, the foot equivalent ground contact region is enlarged or reduced in accordance with the circumstances and, as a result, walking stability can be secured even under conditions such as those described above.

Examples of difficult walking conditions and the equivalent ground contact region expansion/reduction made in response thereto will now be explained with reference to FIGS. 9 to 11.

Figure 9:
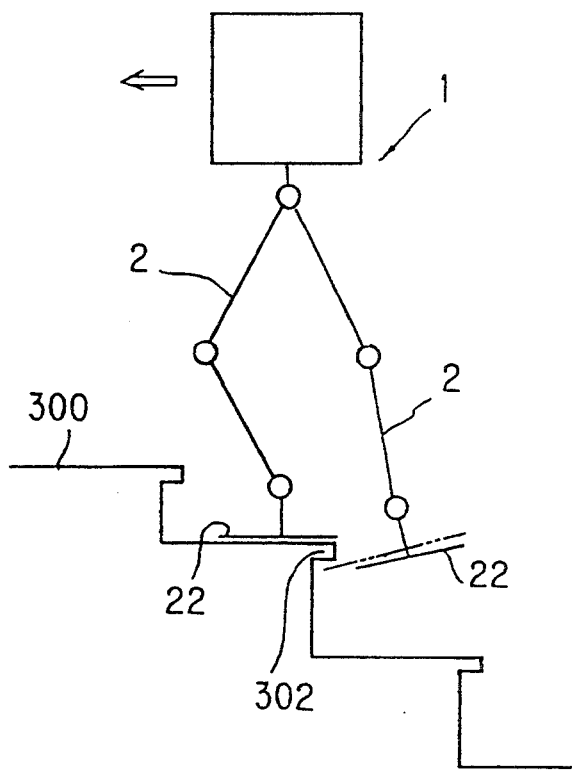
FIG. 9 is an explanatory view showing the robot equipped with the foot structure is climbing stairs.

FIG. 9 shows the robot 1 climbing stairs 300. As in most stairs, the tops of the steps of the stairs 300 have eave-like overhangs 302. If the foot 22 is enlarged as shown by the broken line, it is apt to collide with the overhang 302 and may tip over as a result. When this condition is expected, therefore, the equivalent ground contact region of the foot 22 is reduced. Since the collision between the foot 22 and the overhang 302 occurs at the toe of the foot 22, it suffices to reduce the equivalent ground contact region of the foot 22 at the toe end. To be specific, it suffices to operate the actuators 74 of the actuating mechanisms 72 so as to reduce the distance between the point of attachment of the leg 2 to the foot 22 (more precisely, the point of vertical projection of the ankle joint of the leg 2) to the tip of the toe.

Figure 10:
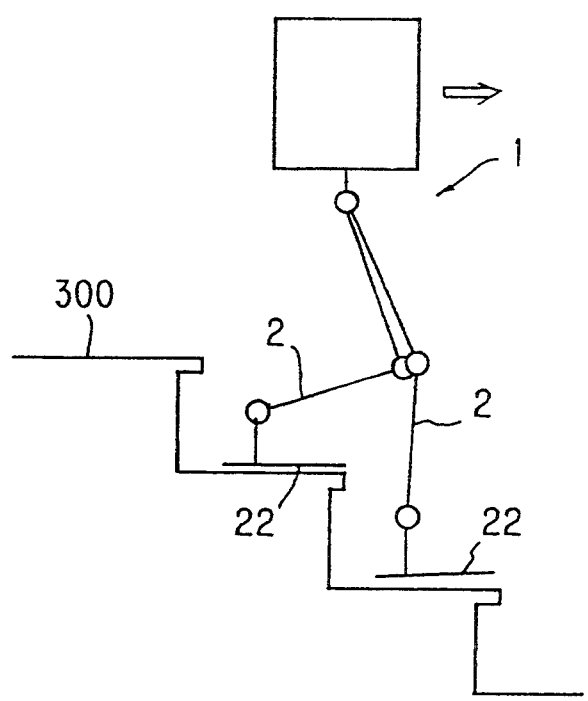
FIG. 10 is an explanatory view showing the robot is descending stairs.

FIG. 10 shows the robot 1 descending the stairs 300. During descent of the stairs 300, the robot 1 experiences a moment tending to cause it to fall forward (in the direction of stair descent). If the area of the equivalent ground contact region of the foot 22 is small, the robot 1 becomes even more likely to topple. When this condition is expected, therefore, the equivalent ground contact region of the feet 22 is enlarged. Since the effect of preventing forward fall increases with increasing distance between the forward tip of the foot 22 and the point of attachment of the leg 2 (from the toe to the ankle), the equivalent ground contact region is enlarged at the toe end of the feet 22. To be specific, it suffices to operate the actuators 74 of the actuating mechanisms 72 so as to extend the distance between the point of attachment of the leg 2 to the feet 22 (more precisely, the point of vertical projection of the ankle joint of the leg 2) to the tip of the toe.

Figure 11:
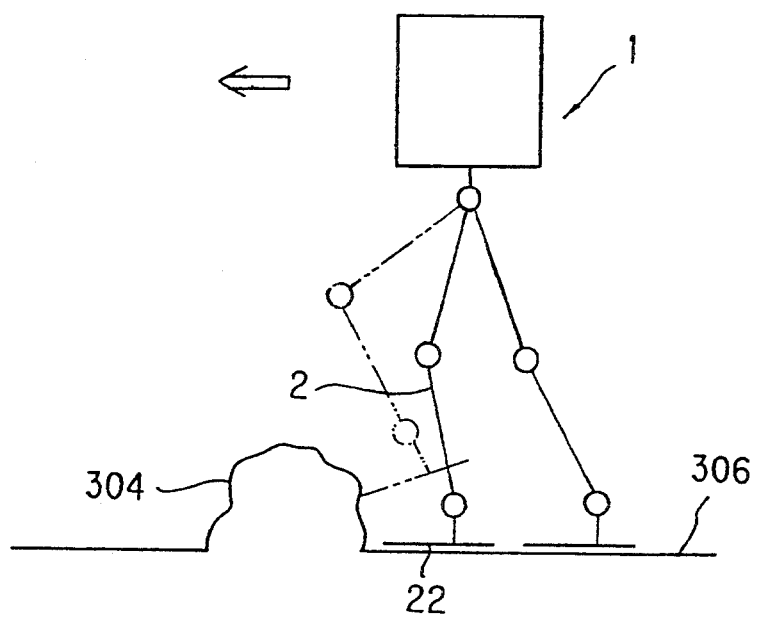
FIG. 11 is an explanatory view showing the robot is walking on a terrain.

FIG. 11 shows a terrain 306 with an obstacle, namely a bump 304. If the equivalent ground contact region of the foot 22 is large, the toe of the foot 22 is likely to collide with the bump 304 when the free leg is swung up and is also likely to collide with it when the leg 2 is lowered on the opposite side of the bump 304. In either case, the robot 1 is apt to tip over. In such a situation, the danger of tip-over can be eliminated by reducing the equivalent ground contact region of the feet 22.

Although not illustrated in the drawings, the robot 1 may also have to walk up, down or across inclined terrain. The tendency for the robot 1 to fall in the direction of downward incline in such cases can be eliminated by enlarging the equivalent ground contact region of the feet 22.

The robot 1 also becomes more likely to tip over at high walking speed if the area of the feet 22 is large because a large foot area increases the likelihood of interference by the foot of the free leg. During high-speed walking, therefore, the likelihood of tip-over is decreased by reducing the equivalent ground contact region of the foot 22. The control for reducing the equivalent ground contact region of the foot 22 can be conducted when it is predicted that the speed will exceed a preset walking speed. The change in the equivalent ground contact region can of course be implemented stepwise in accordance with the walking speed.

When it is expected that the walking of the robot will be destabilized by some external environmental factor, as when an earthquake is detected or the robot 1 is walking outdoors on a windy day, walking stability is secured by enlarging the equivalent ground contact region of the foot 22. In the event of a prediction that the walking is apt to be destabilized by such an external environmental factor, it is preferable to reduce the walking speed at the same time as enlarging the equivalent ground contact region.

Figure 12:
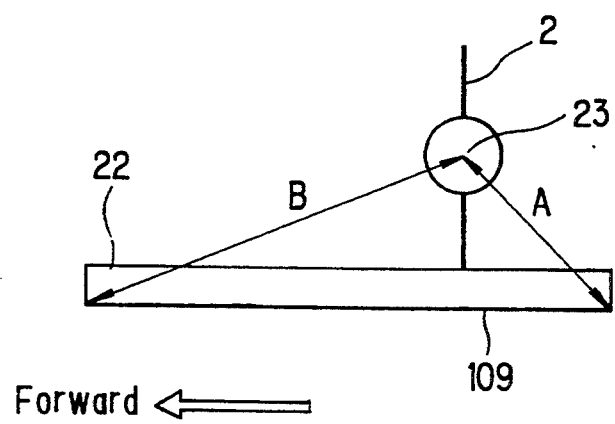
FIG. 12 is an explanatory view showing another aspect of the foot structure according to the invention in which a ratio between distances from the ankle joint to the foot ends are varied.
Figure 13:
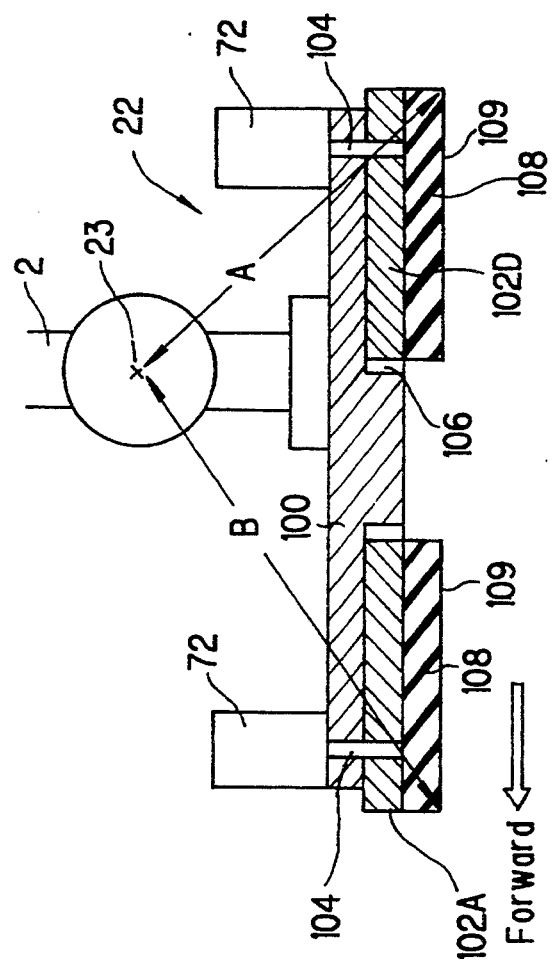
FIGS. 13 to 15 are sectional views of the foot structure according to the first embodiment showing the ratio is varied.

Aside from the above, the arrangement illustrated in the figures can not only vary the effective ground contact region, but also can vary distances A, B from the ankle joints to the foot ends as illustrated in FIG. 12 and hence a ratio A/B therebetween in accordance with the walking condition. More correctly, here, the distance A is a projected distance in the x-z plane from the center 23 of the ankle joints 18,20 to the rear extremity of the effective ground contact surface 109 and the distance B is that to the forward extremity thereof.

This will be explained with reference to FIGS. 13 to 19.

Figure 14:
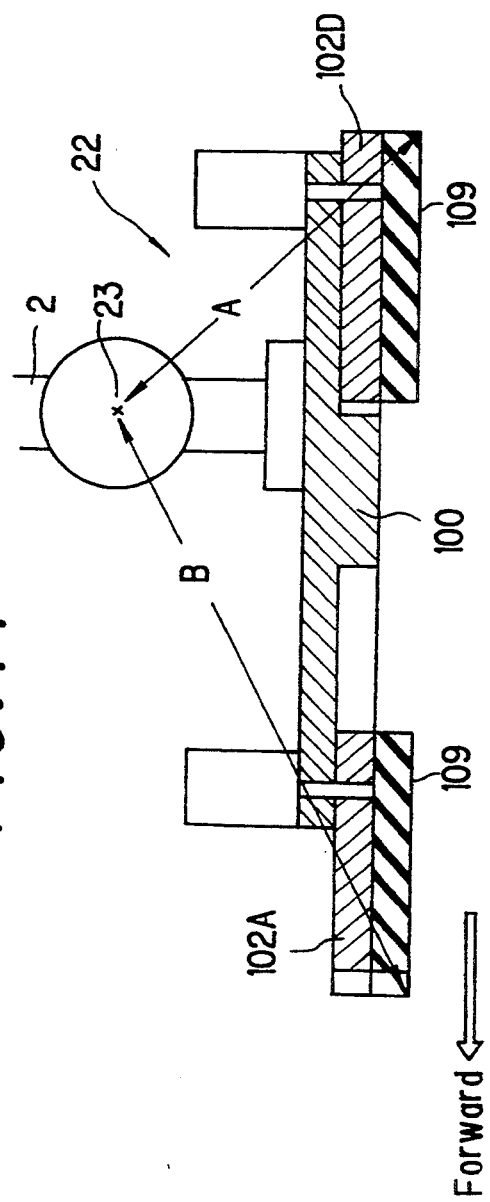
Figure 15:
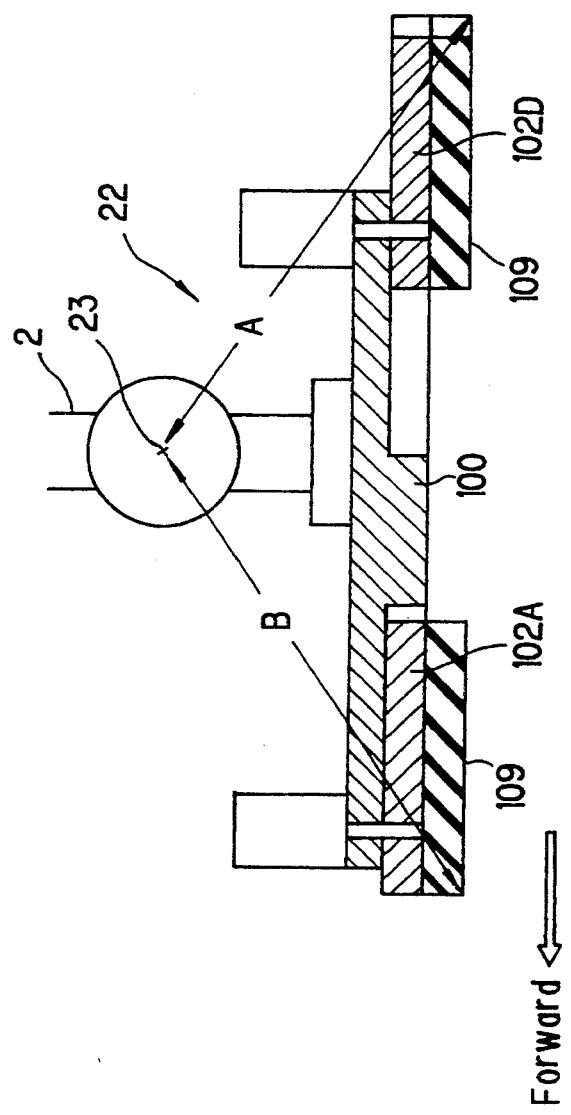

When the foot 22 is in the condition where the movable foot pieces 102A-102D have not been swung outward, the projected distance A from the ankle joint center 23 to the rear extremity of the effective ground contact surface 109 and the distance B from the ankle joint center 23 to the forward extremity thereof are as shown in FIG. 12. The ratio A/B between the distances A and B in this state is 0.79 in the example shown in FIGS. 3 and 13. If one of the actuating mechanisms 72 is then operated, the associated movable foot piece, e.g. 102A, will be rotated in the horizontal plane and swung out from its recesses 106, thereby changing the ratio A/B. FIGS. 5 and 14 show the foot 22 with the movable foot pieces 102A, 102B at the toe end corners simultaneously swung obliquely forward. This reduces the ratio A/B, to 0.63 in the illustrated example. FIGS. 6 and 15 show the foot 22 with the movable foot pieces 102C, 102D at the heel end corners simultaneously swung obliquely rearward. This increases the ratio A/B, to A/B=1 in the illustrated example. Thus by appropriately rotating the movable foot pieces 102A-102D the ratio A/B between the distances A and B can be appropriately varied.

Figure 16:
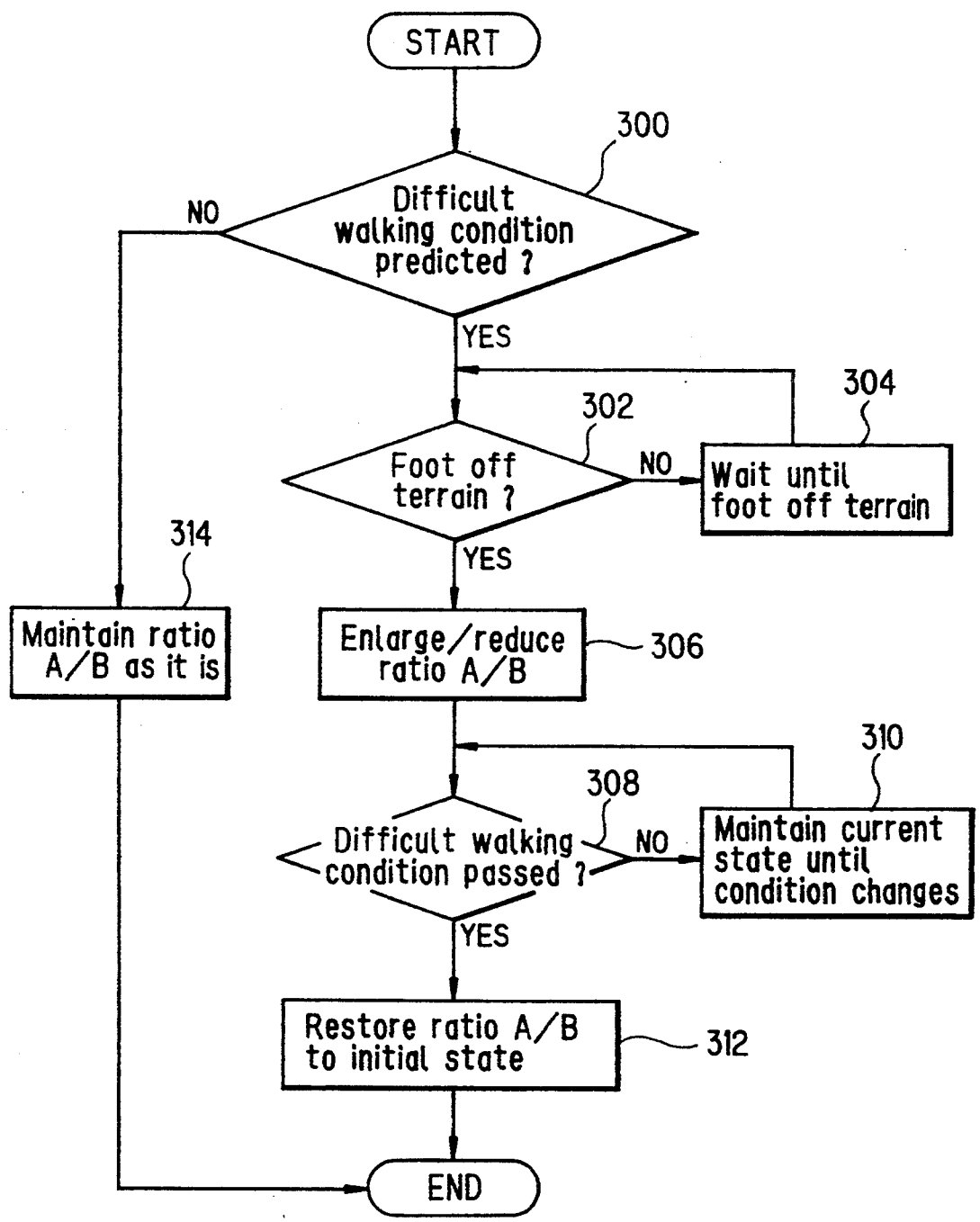
FIG. 16 is a flow chart, similar to FIG. 8, but showing how to control the actuator so as to vary the ratio.

FIG. 16 is a flow chart for controlling the ratio A/B in response to the walking condition.

Passing through steps 300 to 304 similarly to the flow chart of FIG. 8, control passes to step 306 in which the ratio A/B is enlarged or reduced in accordance with the determination made on step 300. The changed ratio is then restored at step 312 when it is found at step 308 that difficult walking condition has ceased to exist. The rest of the procedures is almost the same as that of FIG. 8 including step 314 in which the initial state is maintained if the result of the discrimination at first step is negative. Thus, the ratio can be changed in response to the walking condition such that a stable walking can be ensured even under difficult walking conditions. This will be explained more specifically with reference to FIGS. 17 to 19.

Figure 17:
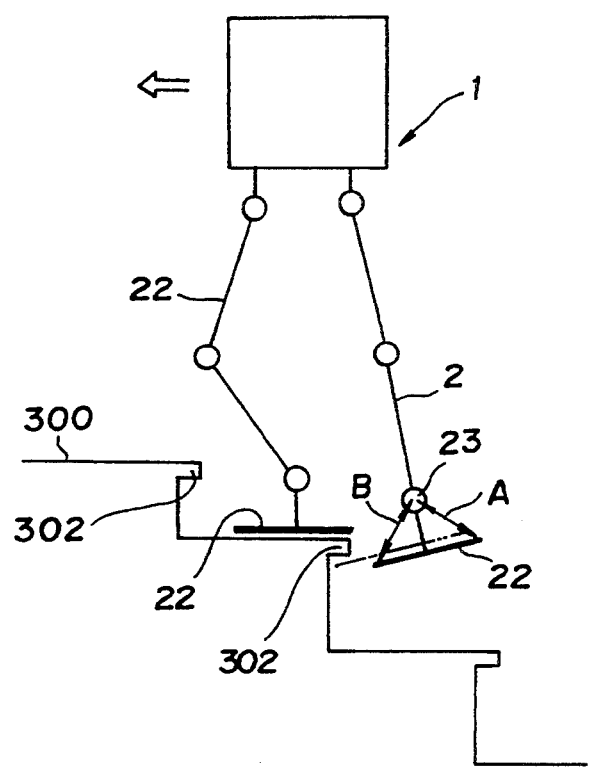
FIG. 17 is an explanatory view again showing the robot equipped with the foot structure is climbing stairs.

FIG. 17 shows the robot 1 climbing the stairs 300. When the ratio A/B between the heel end distance A and the toe end distance B of the feet 22 is small so that the toe end length of the feet 22 is long as shown by the phantom line, the toes of the feet are apt to catch on the step overhangs 302 that are usually provided on stairs. When this happens, there is a high likelihood of the robot falling over. When this condition is expected, therefore, the ratio A/B between the heel end distance A and the toe end distance B in the foot 22 is increased. Specifically, in the embodiment it suffices, for example, to operate the actuators 74 of the actuating mechanisms 72 so as to draw in the movable foot pieces 102A, 102B. During this type of stair climbing it is preferable to set the ratio A/B to near 1.0 (but not larger than 1.0). To be specific, it is preferable to set it between 0.9 and 1.0.

Figure 18:
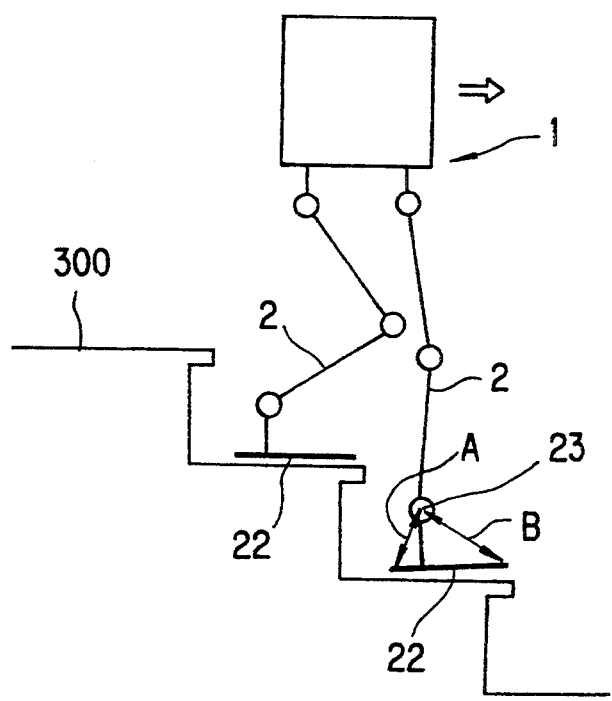
FIG. 18 is an explanatory view again showing the robot is descending stairs.
Figure 19:
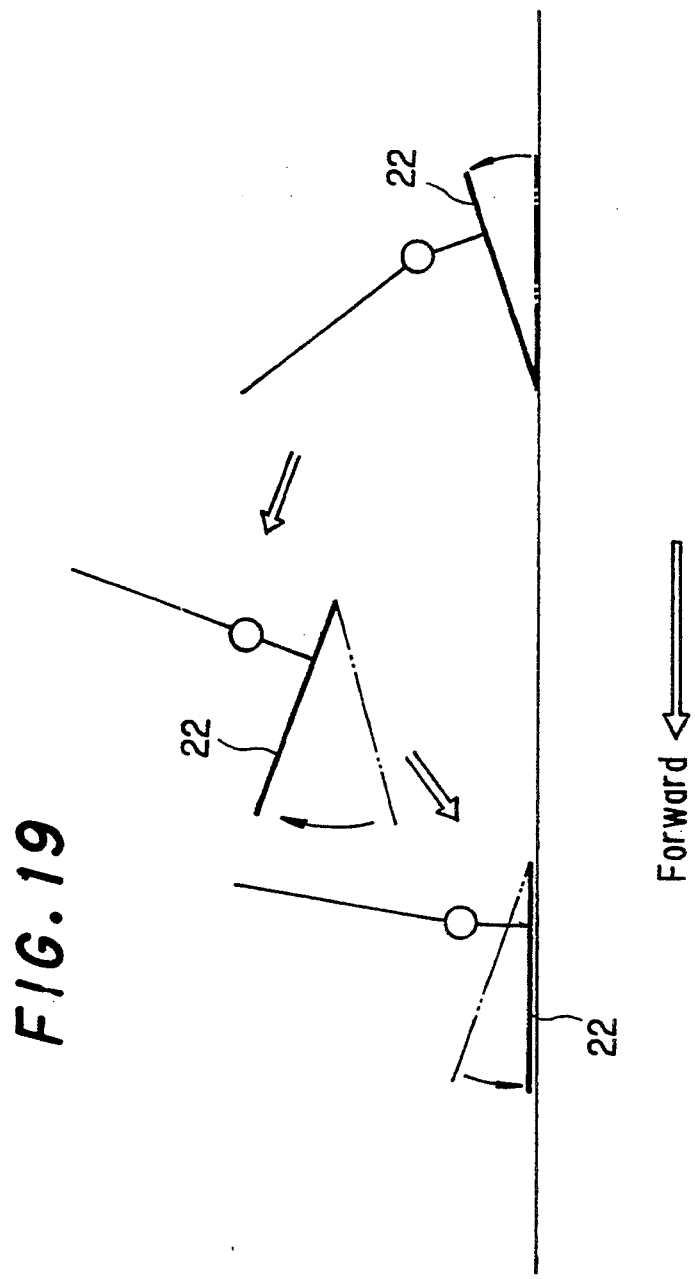
FIG. 19 is an explanatory view again showing the robot is walking on a terrain.

FIG. 18 shows the robot 1 descending the stairs 300. During descent of the stairs 300, the robot 1 experiences a moment tending to cause it to fall forward as was mentioned earlier. If the ratio A/B between the heel end distance A and the toe end distance B of the foot 22 is large so that the toe end of the foot 22 is short, the robot 1 becomes even more likely to topple. When this condition is expected, therefore, the ratio A/B of the foot 22 is reduced. Specifically, in the example of FIGS. 4 to 9 it suffices, for example, to operate the actuators 74 of the actuating mechanisms 72 so as to swing the movable foot pieces 102A, 102B forward.

The robot 1 also becomes more likely to tip over at high walking speed if the toe end of the foot 22 is long because interference is likely to occur. Moreover, in such cases the tilt angle of the foot of the free leg becomes large between swing-up and footfall so that the dynamic moment of the free leg becomes large. This will be better understood from FIG. 19. During walking of an ordinary biped walking robot, the foot 22 is normally first lifted off the terrain at the heel end, is tilted in the opposite direction in midair so as to land heel first, and is then lowered at the toe end. If the toe is long, therefore, the foot tilt angles will become large, making the dynamic moment large, particularly during high-speed walking, and increasing the likelihood of tip-over. During high-speed walking, therefore, the ratio A/B between the heel end distance A and the toe end distance B of the foot 2 is made small, thus reducing the risk of interference and reducing the foot inclination angle. As a result, stability is enhanced and the danger of tip-over reduced. The control for reducing the equivalent ground contact region of the foot 22 can be conducted when it is predicted that the speed will exceed a preset walking speed. The change in the equivalent ground contact region can of course be implemented stepwise in accordance with the walking speed.

A number of other embodiments of the foot structure, mainly embodiments that differ in mechanism, will now be explained with reference to FIGS. 20 to 38.

Figure 20:
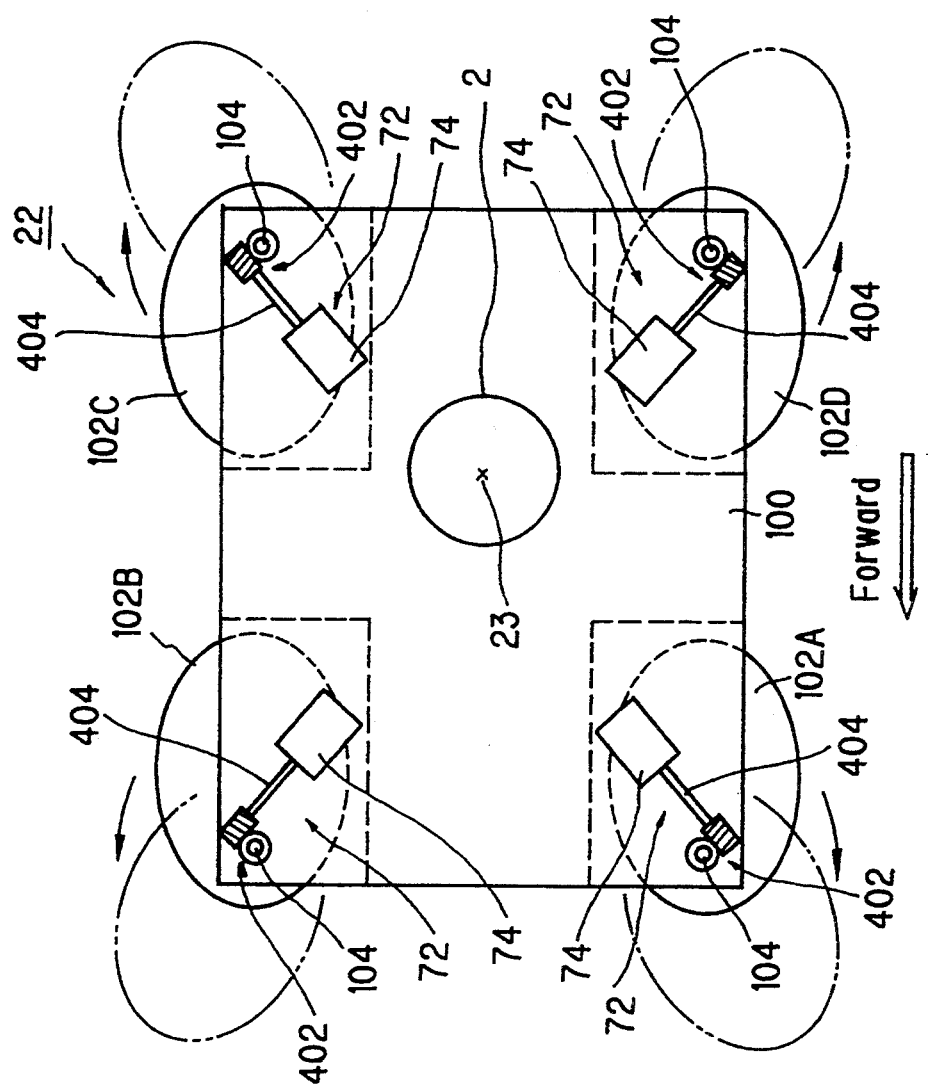
FIG. 20 is a plan view of a robot foot structure according to a second embodiment of the invention.

FIG. 20 shows a second embodiment which differs from the first embodiment as regards the actuating mechanisms 72 for operating the movable foot pieces 102A–102D. Here, components or elements in FIG. 12 and on which correspond to those in FIGS. 3 to 11 are assigned with identical reference numerals to their counterparts in FIGS. 3 to 19 and will not be repeated further.

In this embodiment, a worm gear 402 is inserted as a transmission mechanism between each of the foot pieces 102A–102D and a rotating shaft 404 of the actuator 74 associated with the foot piece.

The second embodiment of FIG. 20 operates similarly to that of FIGS. 3 and 4 in that driving the actuators 74 causes the movable foot pieces 102A–102D to be independently rotated in a plane parallel to the ground contact surface, thus enabling the equivalent ground contact region (and the ratio) to be enlarged/reduced to the fore or rear as desired. Further, the presence of the worm gears 402 as the transmission mechanisms between the actuators 74 and the movable foot pieces 102A–102D enables the force of reaction from the ground acting on the foot during the ground contact period to be absorbed by bending of the rotating shafts 404, whereby the force of reaction can be prevented from acting directly on the actuators 74 and the actuators 74 can thus be protected from exposure to heavy loads and damage.

Figure 21:
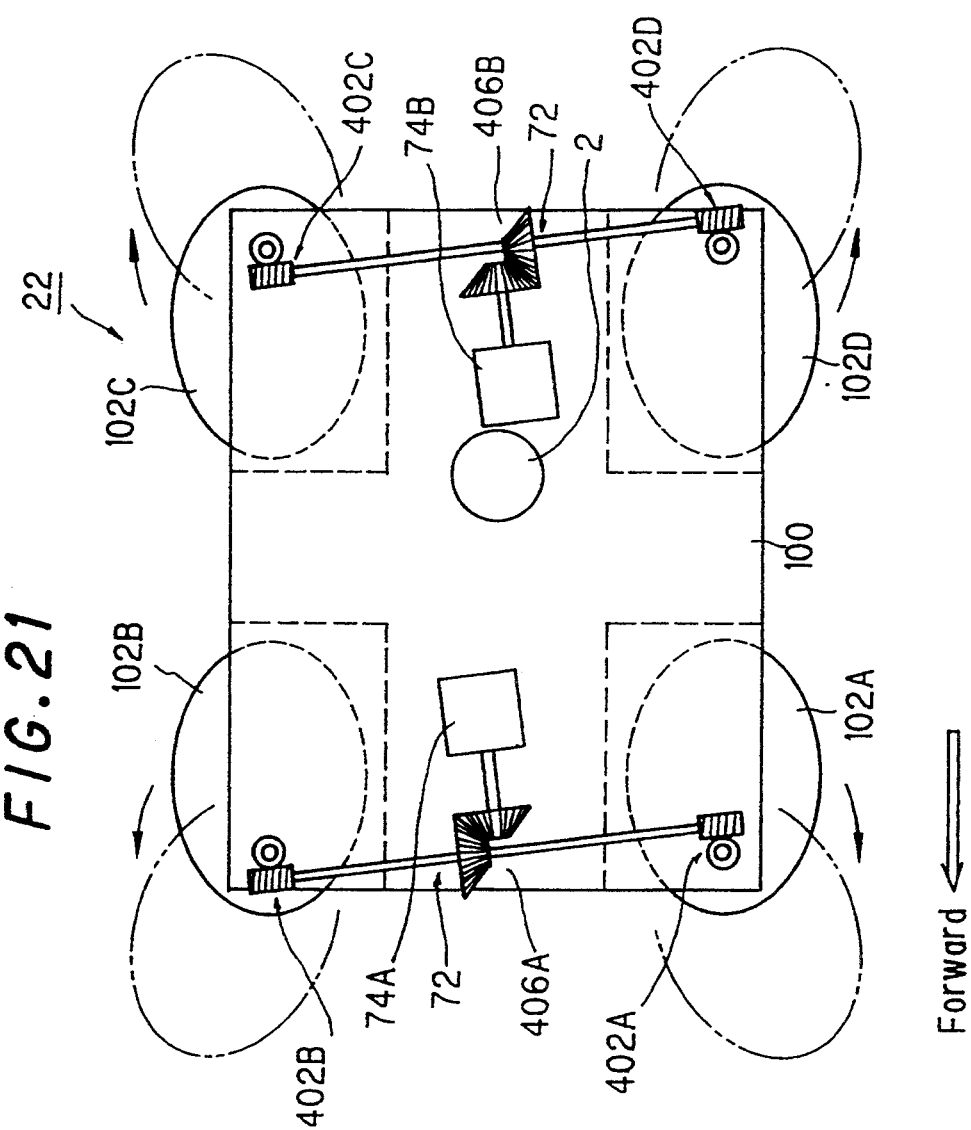
FIG. 21 is a plan view of a robot foot structure according to a third embodiment of the invention.

FIG. 21 shows a third embodiment which is a modification of the embodiment of FIG. 20. In this embodiment, the actuating mechanisms 72 are arranged so as to simultaneously operate the two forward movable foot pieces 102A, 102B and simultaneously operate the two rearward movable foot pieces 102C, 102D. As shown in FIG. 21, the two forward movable foot pieces 102A, 102B are driven by a common rotational drive type actuator 74A and the two rearward movable foot pieces 102C, 102D are driven by a common rotational drive type actuator 74B. The rotational driving force of the actuator 74A is transmitted through bevel gears 406A to worm gears 402A, 402B mounted on the common shaft and the worm gear 402A, 402B simultaneously rotate the movable foot pieces 102A, 102B in opposite directions. Similarly, the rotational driving force of the actuator 74B is transmitted through bevel gears 406B to worm gears 402C, 402D mounted on the common shaft and the worm gears 402C, 402D simultaneously rotate the movable foot pieces 102C, 102D in the opposite directions.

In the embodiment of FIG. 21, the equivalent ground contact region (and the ratio A/B) can be simultaneously enlarged/reduced on laterally opposite sides of the forward (toe) end of the foot 22 and can also be simultaneously enlarged/reduced on the laterally opposite sides of the rearward (heel) end of the foot 22.

Figure 22:
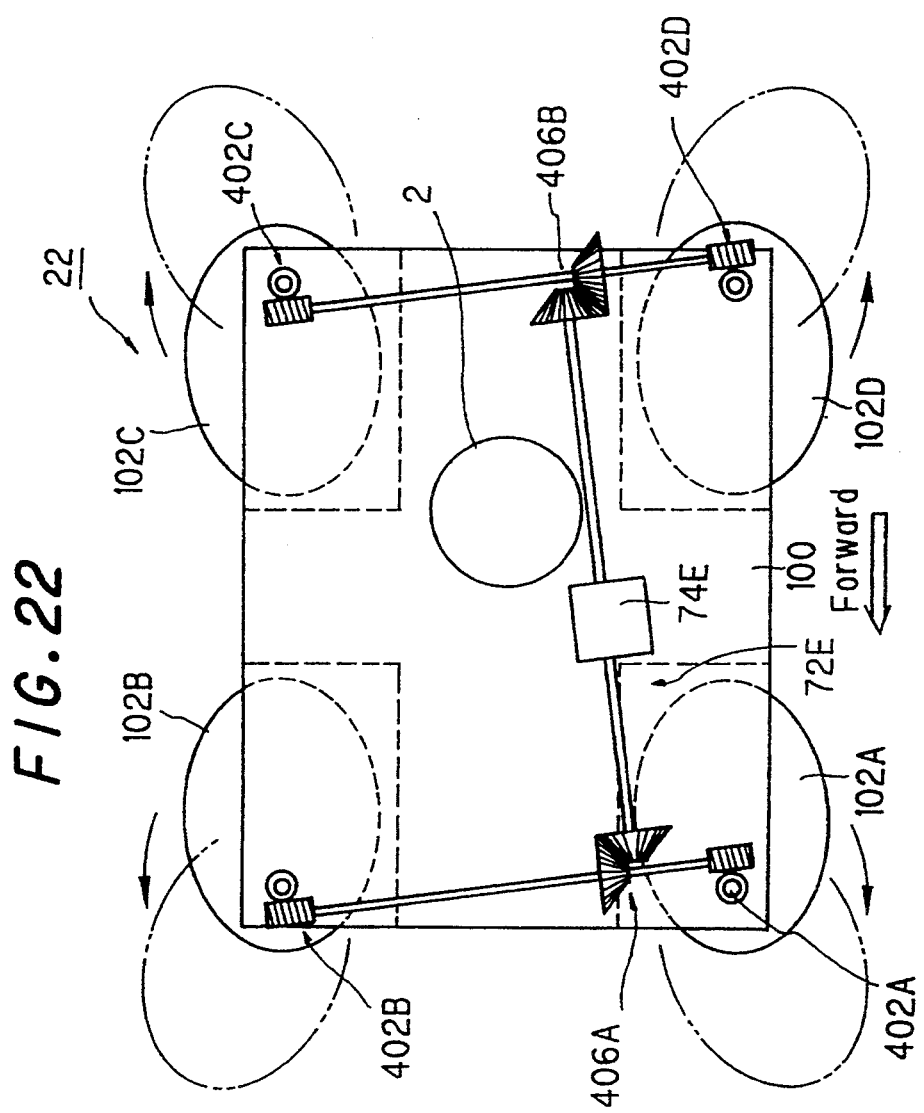
FIG. 22 is a plan view of a robot foot structure according to a fourth embodiment of the invention.

FIG. 22 shows a fourth embodiment equipped with an actuating mechanism 72E which simultaneously operates all of the movable foot pieces 102A–102D. A single rotational drive type actuator 74E is provided for all of the movable foot pieces 102A–102D. The rotational driving force of the actuator 74E is transmitted through two sets of the bevel gears 406A, 406B and the four worm gears 402A–402D and applied simultaneously to the movable foot pieces 102A–102D. As a result the movable foot pieces 102A–102D are all rotated at one time. As a result, the equivalent ground contact region (and the ratio A/B) is simultaneously enlarged/reduced at the forward and rearward ends of the foot.

In the embodiments of FIG. 21 and 22, the bevel gears 406A, 406B and the worm gears 402A–402D are present as transmission mechanisms between the actuators 74A–74B (actuator 74E) and the movable foot pieces 102A–102D and, therefore, the intermediate shafts are again able to absorb the force of reaction the ground contact surfaces receive from the terrain.

Figure 23:
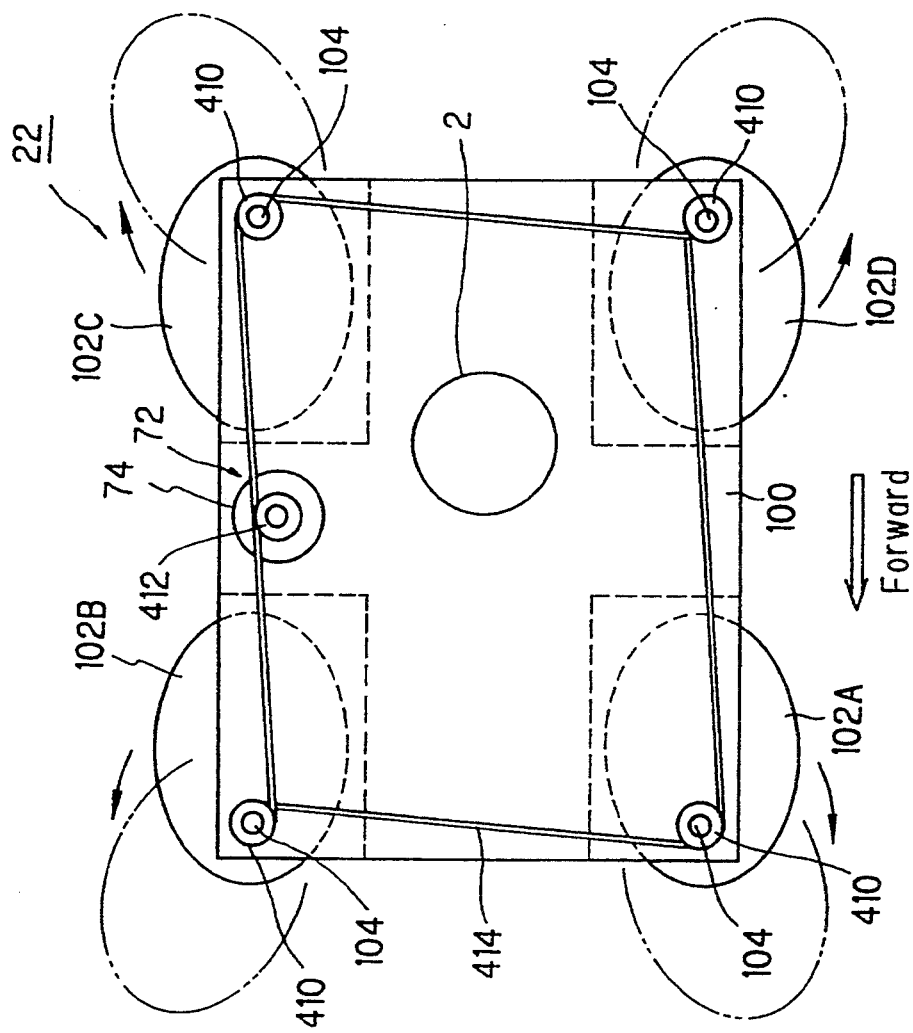
FIG. 23 is a plan view of a robot foot structure according to a fifth embodiment of the invention.
Figure 24:
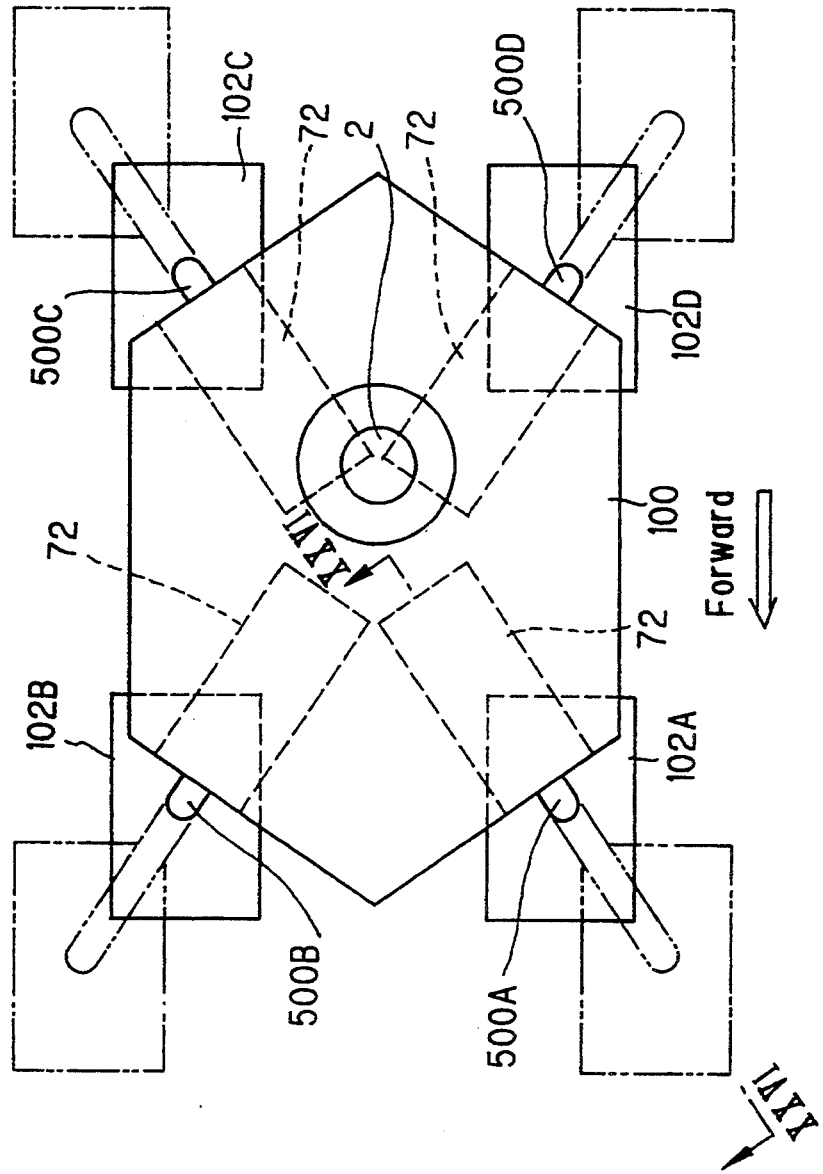
FIG. 24 is a plan view of a robot foot structure according to a sixth embodiment of the invention.
Figure 25:
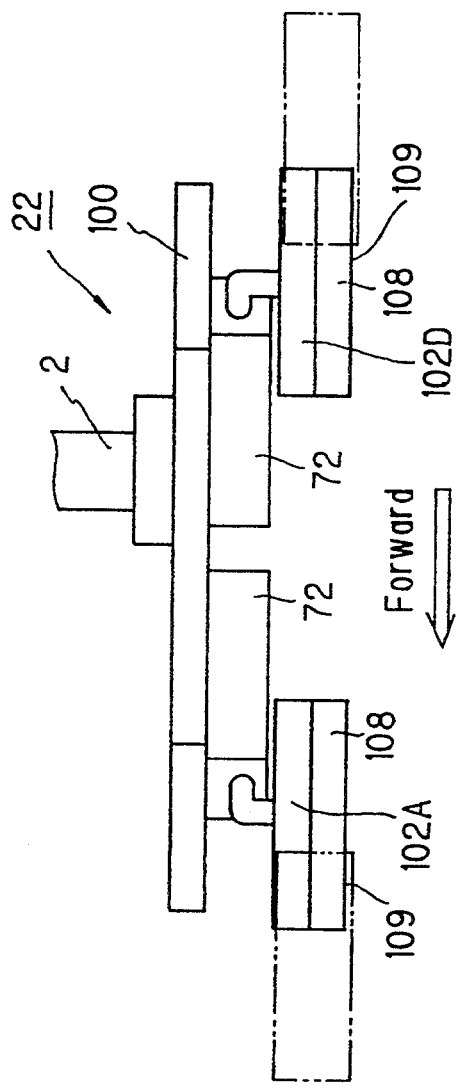
FIG. 25 is a side view of the robot foot structure of FIG. 24.

FIG. 23 shows a fifth embodiment in which the movable foot pieces 102A-102D are all operated in unison. The support shaft 104 of each of the movable foot pieces 102A-102D is provided with a pulley 410 and the actuator 74 is constituted as a rotational drive type actuator. The actuator 74 is further provided with a second pulley 412 and an endless belt 414 is wound about the four pulleys 410 on the side of the movable foot pieces 102A-102D and the pulley 412 on the side of the actuator 74. With this arrangement the movable foot pieces 102A-102D can all be simultaneously rotated by rotating the pulleys 410,412. Thus the equivalent ground contact region (and the ratio A/B) can be simultaneously enlarged/reduced at the forward and rearward ends of the foot 22. The pulleys 410, 412 can be replaced with sprockets and the belt 414 with a chain.

Although in all of the foregoing embodiments the equivalent ground contact region is enlarged/reduced by rotating the movable foot pieces 102A-102D in the horizontal plane (in the plane parallel to the effective ground contact surface), the invention does not limit the movement of the movable foot pieces 102A-102D to rotation in the horizontal plane.

FIGS. 24 to 36 show embodiments in which the equivalent ground contact region is enlarged/reduced by linearly moving the movable foot pieces 102A-102D in the plane parallel to the effective ground contact surface.

In a sixth embodiment shown in FIGS. 24 to 27, the movable foot pieces 102A-102D are assigned with a rectangular plan view shape, are disposed at the four corners of the bottom of the main foot member 100. Each of the movable foot pieces 102A-102D has the elastic pad 108 bonded on its bottom surface. The bottom surfaces of the elastic pads 108 constitute the effective ground contact surface 109. The movable foot pieces 102A-102D are fixed to the ends of positioning shafts 500A-500D and the equivalent ground contact region is enlarged/reduced by radially extending/retracting the movable foot pieces 102A-102D relative to the main foot member 100 by extending/retracting the positioning shafts 500A-500D. As the actuators of the actuating mechanisms 72 for extending/retracting the positioning shafts 500A-500D there are used fluid pressure cylinders driven by pressurized air, oil or the like. Also in this embodiment, it will be apparent from FIG. 27 that the ratio A/B can be adjusted as desired.

Figure 26:
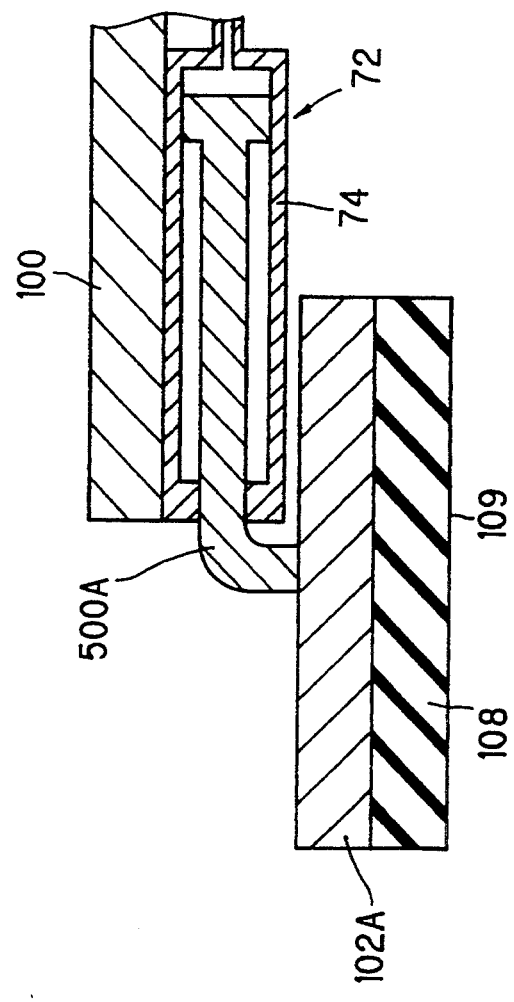
FIG. 26 is a sectional view taken along the line XXVI—XXVI of FIG. 24.
Figure 27:
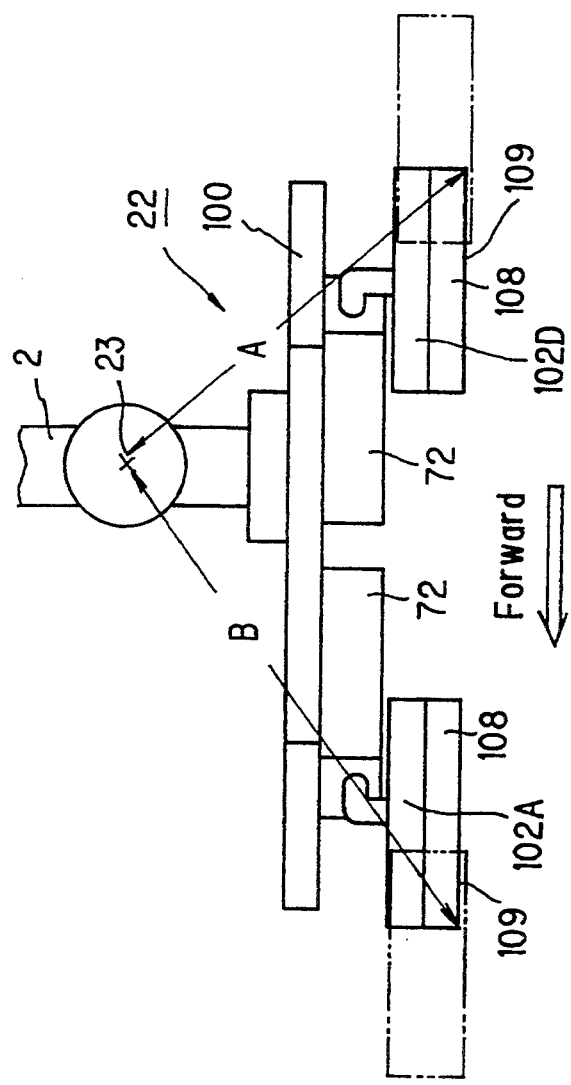
FIG. 27 is a side view, similar to FIG. 25, but showing the ratio between the distances from the ankle joint to the foot ends.
Figure 28:
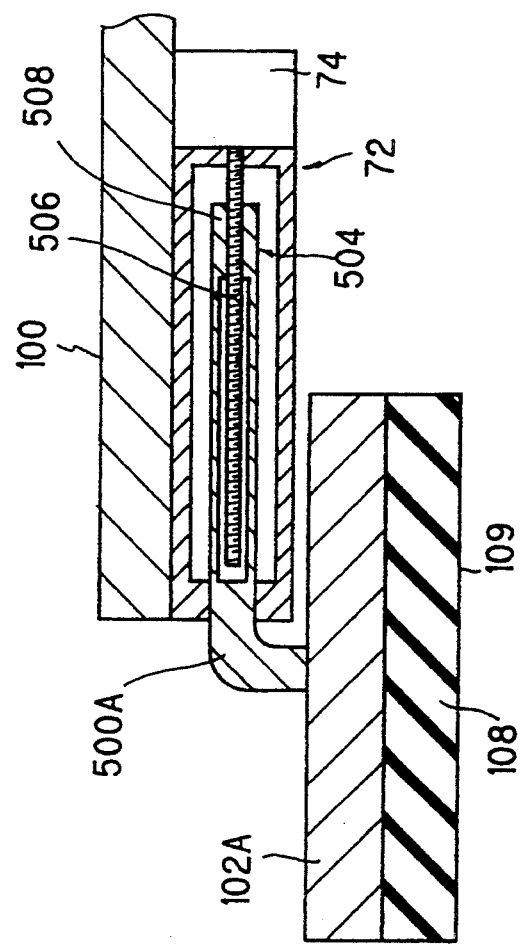
FIG. 28 is a sectional partial view of a robot foot structure according to a seventh embodiment of the invention.

FIG. 28 shows a seventh embodiment corresponding to the movable foot piece 102A and associated members in FIG. 26. In this embodiment, each of the movable foot pieces 102A-102D is linearly extended and retracted by using a motor or other rotational drive type actuator as the actuator 74 of the actuating mechanism 72 and providing a screw mechanism for converting the rotational driving force of the actuator 74 into a linear driving force. As shown in FIG. 28, a female screw member 508 formed in the positioning shaft 500A is screwed onto a screw 506 rotated by the rotational drive type actuator 74. The positioning shaft 500A is extended/retracted by the rotational driving force of the actuators 74, whereby the movable foot piece 102 is also extended/retracted. While not shown in FIG. 28, the operating mechanisms for the other movable foot pieces 102B-102D are configured in the same manner.

Figure 29:
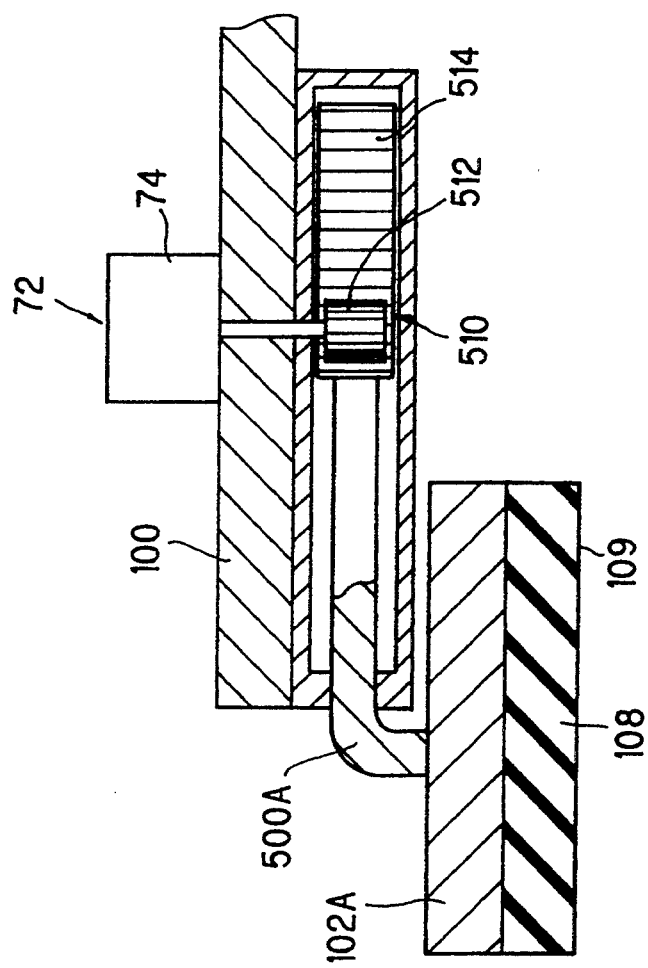
FIG. 29 is a sectional partial view of a robot foot structure according to an eighth embodiment of the invention.

FIG. 29 shows an eighth embodiment corresponding to the movable foot piece 102A and associated members in FIG. 26. In this embodiment, the actuators 74 of the actuating mechanisms 72 for linearly extending and retracting the movable foot pieces 102A-102D are motors or other rotational drive type actuators similar to those used in the embodiment of FIG. 28 but the rotational driving force of each actuator 74 is transmitted to the movable foot piece 102A after being converted to a linear driving force by a rack-and-pinion mechanism 510. In the embodiment of FIG. 29, a pinion 512 rotated by the rotational drive type actuator 74 is engaged with a rack 514 that is integrally connected with the positioning shaft 500A. Thus the rotation of the actuator 74 causes the positioning shaft 500A to extend/retract, whereby the movable foot piece 102A is also extended/retracted. The operating mechanisms for the other movable foot pieces 102B-102D are similarly configured.

Figure 30:
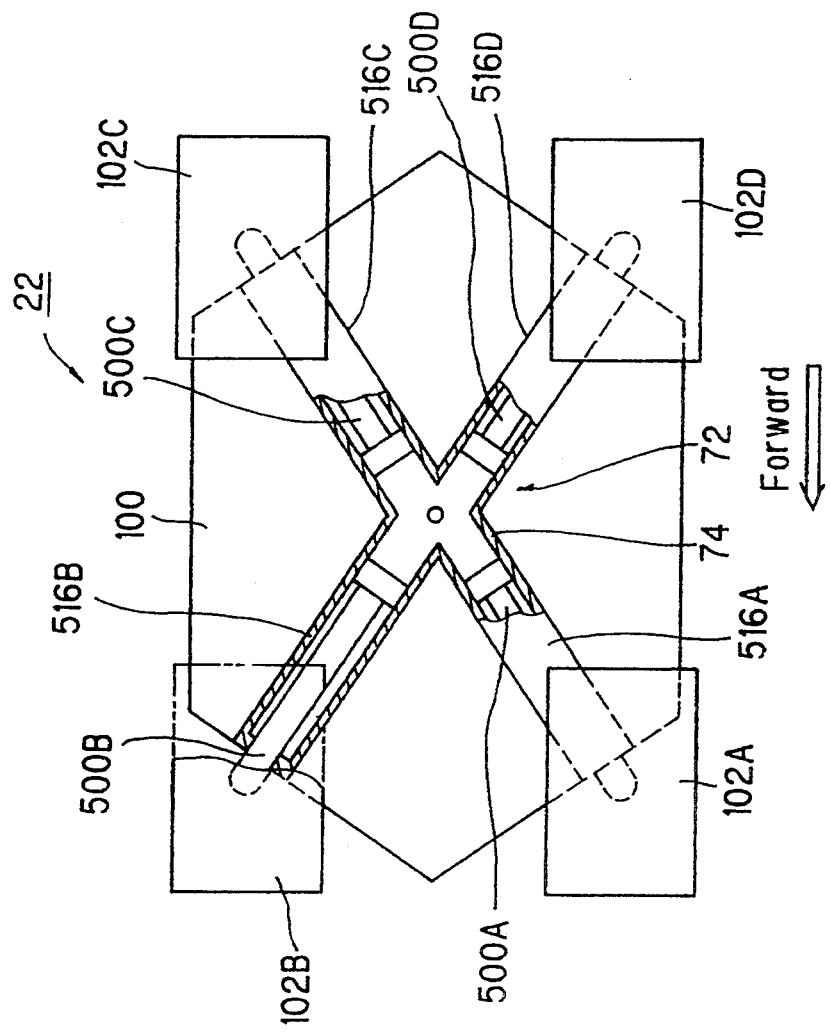
FIG. 30 is a bottom view of a robot foot structure according to a ninth embodiment of the invention.

FIG. 30 shows a ninth embodiment of the foot structure in which the equivalent ground contact region is again enlarged/reduced by linearly extending/retracting the movable foot pieces 102A-102D, characterized in that all of the movable foot pieces 102A-102D are simultaneously moved by the actuator 74 constituted as a single actuator. In this embodiment, the actuator 74 is constituted of four fluid pressure cylinders 516A-516D whose drive sides (sides to which the fluid pressure is applied) are integrally joined. In other respects, the configuration is similar to that shown in FIGS. 24 to 26. In this embodiment, the equivalent ground contact region (and the ratio A/B) can be enlarged/reduced simultaneously at the forward and rearward ends of the foot 22 simply by increasing/decreasing the fluid pressure on the drive side of the actuator 74 and thus causing the positioning shafts 500A-500D and the movable foot pieces 102A-102D to extend/retract in unison.

Figure 31:
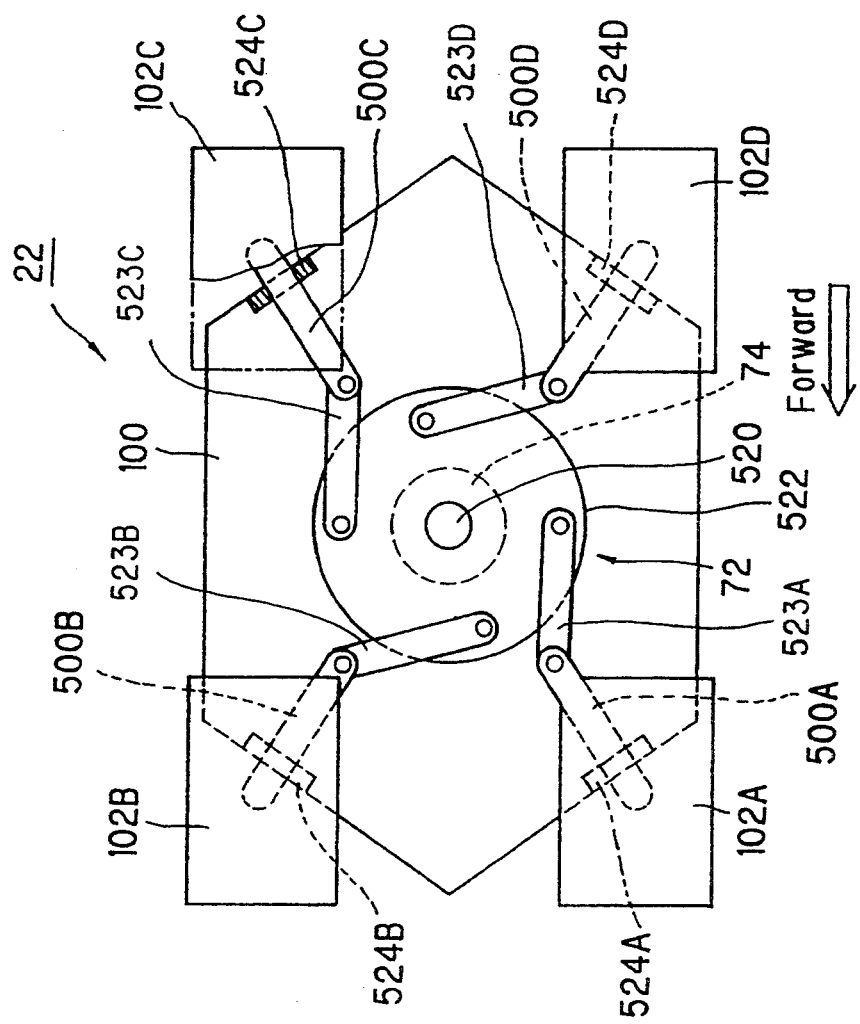
FIG. 31 is a bottom view of a robot foot structure according to a tenth embodiment of the invention.

FIG. 31 shows a tenth embodiment in which the movable foot pieces 102A-102D are similarly linearly extended/retracted in unison. In the embodiment of FIG. 31, the actuator 74 of the actuating mechanism 72 is constituted as a motor (ordinary or geared) or other rotational drive type actuator, and a disk-like rotating body 522 is fixed on a rotational drive shaft 520. Points near the periphery of the rotating body 522 are connected with the positioning shafts 500A-500D of the movable foot pieces 102A-102D via links 523A-523D. The positioning shafts 500A-500D are passed through guides 524A-524D fixed on the main foot member 100 so as to ensure their linear movement in the axial direction. In this embodiment, the rotational driving force of the rotational drive type actuator 74 is converted into a linear driving force by the link mechanisms constituted by the links 523A-523D and associated members, whereby the movable foot pieces 102A-102D are simultaneously extended/retracted via the positioning shafts 500A-500D.

Figure 32:
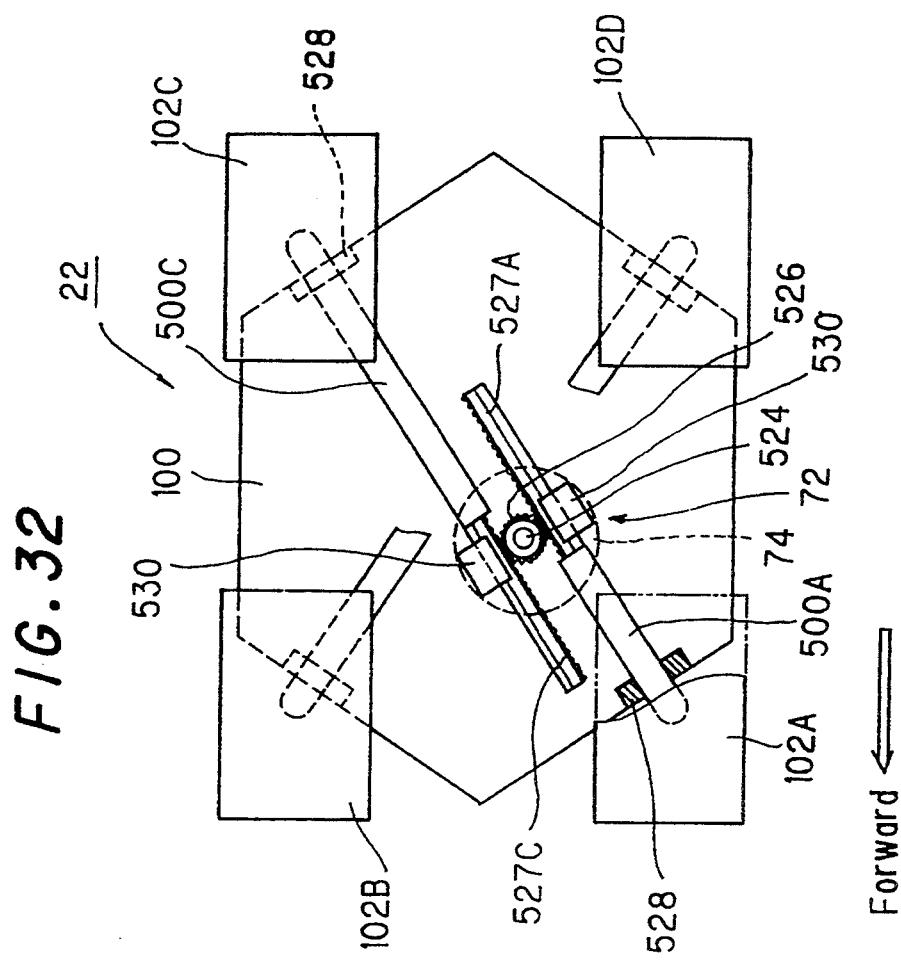
FIG. 32 is a bottom view of a robot foot structure according to an eleventh embodiment of the invention.
Figure 33:
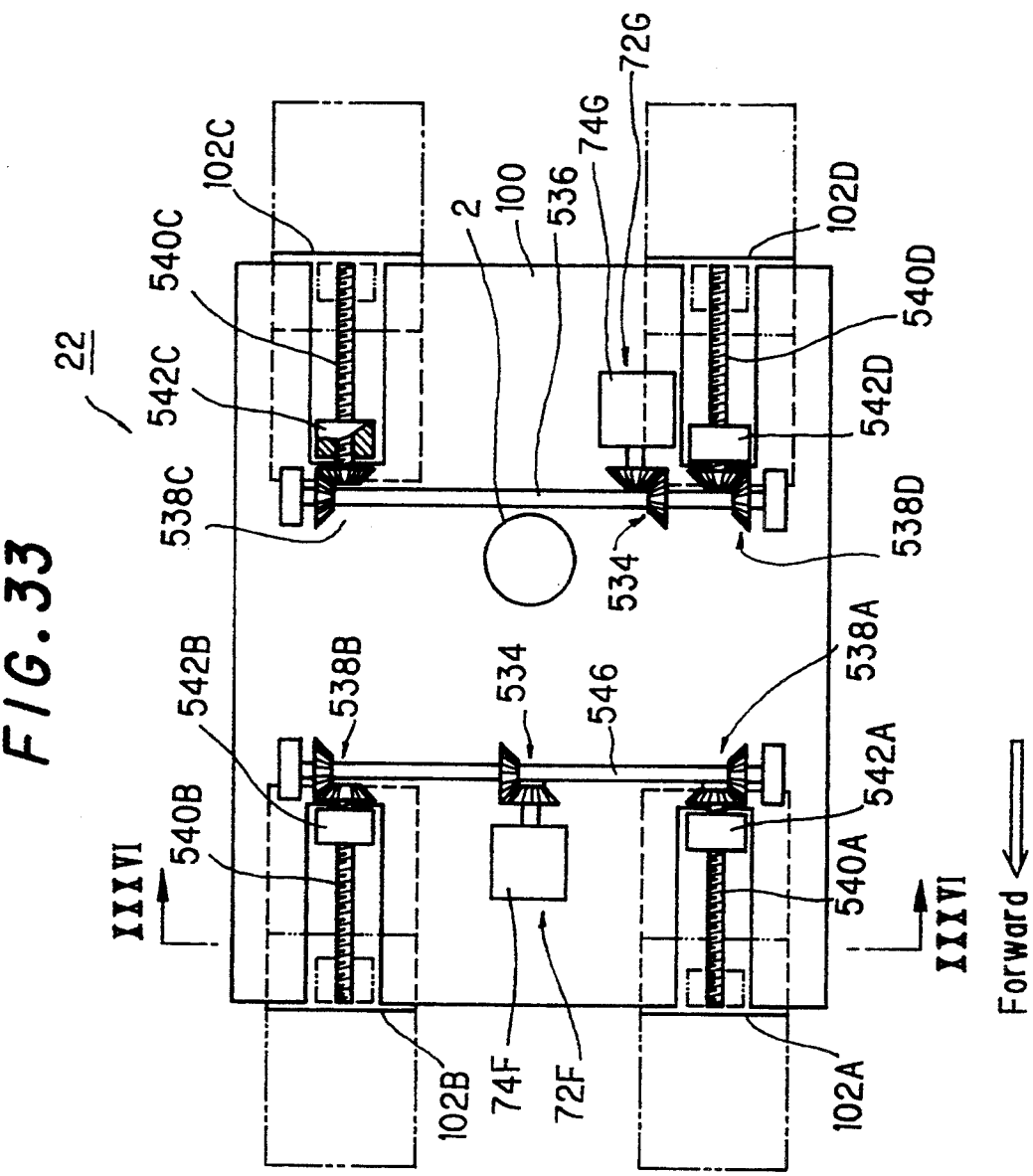
FIG. 33 is a plan view of a robot foot structure according to a twelfth embodiment of the invention.
Figure 34:
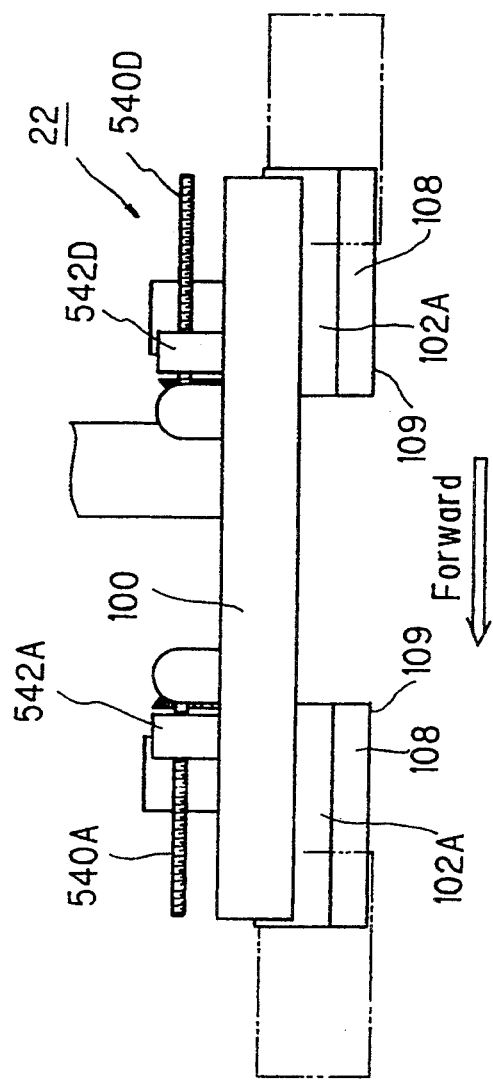
FIG. 34 is a side view of the robot foot structure of FIG. 33.
Figure 35:
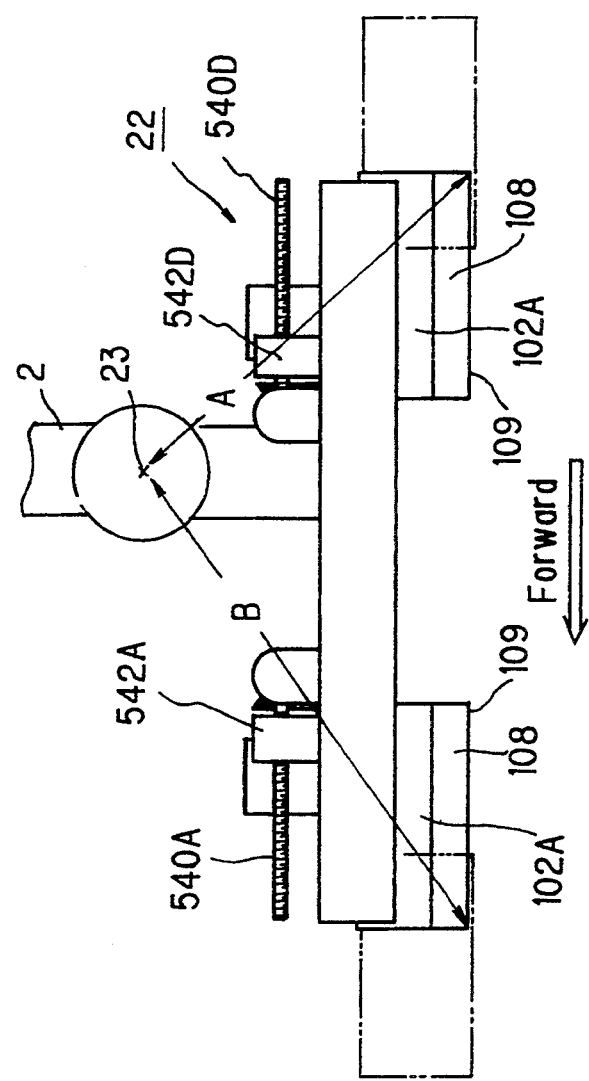
FIG. 35 is a side view, similar to FIG. 34, but showing the ratio between the distances from the ankle joint to the foot ends.
Figure 36:
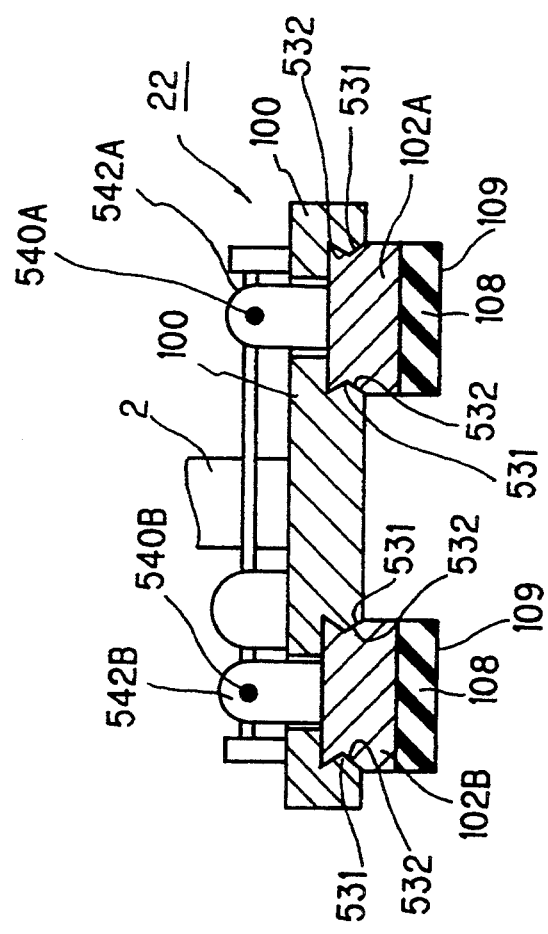
FIG. 36 is a sectional view taken along the line of XXXVI—XXXVI of FIG. 33.

FIG. 32 shows an eleventh embodiment of the foot structure in which the foot pieces 102A-102D are linearly moved, characterized in that the pairs of foot pieces at diametrically opposite corners of the foot 22 are simultaneously moved by rack-and-pinion mechanisms. In the embodiment of FIG. 32, the actuator 74 is constituted as a motor or other rotational drive type actuator and is provided in common for driving the movable foot pieces 102A, 102C and a pinion 526 is provided on the rotational drive shaft 524 of the actuator 74. The pinion 526 is engaged with a rack 527A formed integrally with the positioning shaft 500A of the movable foot piece 102A and with a rack 527C formed integrally with the positioning shaft 500C of the movable foot piece 102C. The positioning shafts 500A, 500C are passed through guides 528, 530 fixed on the main foot member 100 for guiding them with respect to the racks 527A, 527C. Although not illustrated in FIG. 32, the operating mechanism for the other two movable foot pieces 102B, 102D is similarly constituted. In this embodiment, operating one of the rotational drive type actuators 74 causes the diametrically opposite movable foot pieces 102A, 102C to be simultaneously extended/retracted, while operating the other causes the remaining movable foot pieces 102B, 102D to be extended/retracted.

FIGS. 33 to 36 show a twelfth embodiment in which the two toe end movable foot pieces 102A, 102B are simultaneously linearly extended/retracted and, independently, the two heel end movable foot pieces 102C, 102D are simultaneously linearly extended/retracted. As shown in FIGS. 33 to 36, the main foot member 100 is rectangular in plan view and is provided on its bottom at opposite sides of the toe end with the movable foot pieces 102A, 102B, and on its bottom at opposite sides of the heel end with the movable foot pieces 102C, 102D. Each of the movable foot pieces 102A–102D has the elastic pad 108 bonded on its bottom surface. The bottom surfaces of the elastic pads 108 constitute the effective ground contact surface 109. The movable foot pieces 102A, 102B are formed on both sides of the upper portions thereof with convex or concave guide follower portions 531 and the corresponding parts of the main foot member 100 are formed with complementarily shaped guide portions 532 by which the guide follower portions 531 are guided to slide linearly. The guide portions 532 serve to guide the movable foot pieces 102A, 102B in parallel with the direction of robot advance (the fore/aft direction) and also to receive the force of reaction the movable foot pieces 102A, 102B receive from the terrain at the time the foot lands on the terrain. Although not shown in the drawings, the heel end of the foot 22 is similarly configured for enabling the movable foot pieces 102C, 102D to be supported with respect to the main foot member 100 so as to be guided in parallel with the direction of robot advance.

In the embodiment, the movable foot pieces 102A, 102B at the toe end are simultaneously extended/retracted in the fore/aft direction by an actuating mechanism 72F equipped with a single common rotational drive type actuator 74F, which can be a motor. Specifically, the rotational driving force of the actuator 74F is transmitted through bevel gears 534 to a common intermediate shaft 546, the rotational force of the common intermediate shaft 546 is transmitted through bevel gears 538A and bevel gears 538B to screws 540A, 540B, and the rotation of the screws 540A, 540B is converted into linear motion by female screw blocks 542A, 542B engaged with the screws 540A, 540B, whereby the movable foot pieces 102A, 102B fixed to the female screw blocks 542A, 542B are linearly extended/retracted. On the other hand, the movable foot pieces 102C, 102D at the heel end are simultaneously extended/retracted in the fore/aft direction by an actuating mechanism 72G equipped with a single common rotational drive type actuator 74G, which can be a motor. Specifically, the rotational driving force of the actuator 74G is transmitted through the bevel gears 534 to the common intermediate shaft 546, the rotational force of the common intermediate shaft 546 is transmitted through bevel gears 538C and bevel gears 538D to screws 540C, 540D, and the rotation of the screws 540C, 540D is converted into linear motion by female screw blocks 542C, 542D engaged with the screws 540C, 540D, whereby the movable foot pieces 102C, 102D fixed to the female screw blocks 542C, 542D are linearly extended/retracted.

Thus in the embodiment shown in FIGS. 33 to 36, the equivalent ground contact region (and the ratio A/B) can be enlarged/reduced at the toe end of the foot 22 by driving the actuator 74F for simultaneously extending/retracting the toe end movable foot pieces 102A, 102B in parallel with the direction of robot advance. On the other hand, the equivalent ground contact region can be enlarged/reduced at the heel end of the foot 22 by driving the actuator 74G for simultaneously extending/retracting the heel end movable foot pieces 102C, 102D in parallel with the direction of robot advance.

Figure 37:
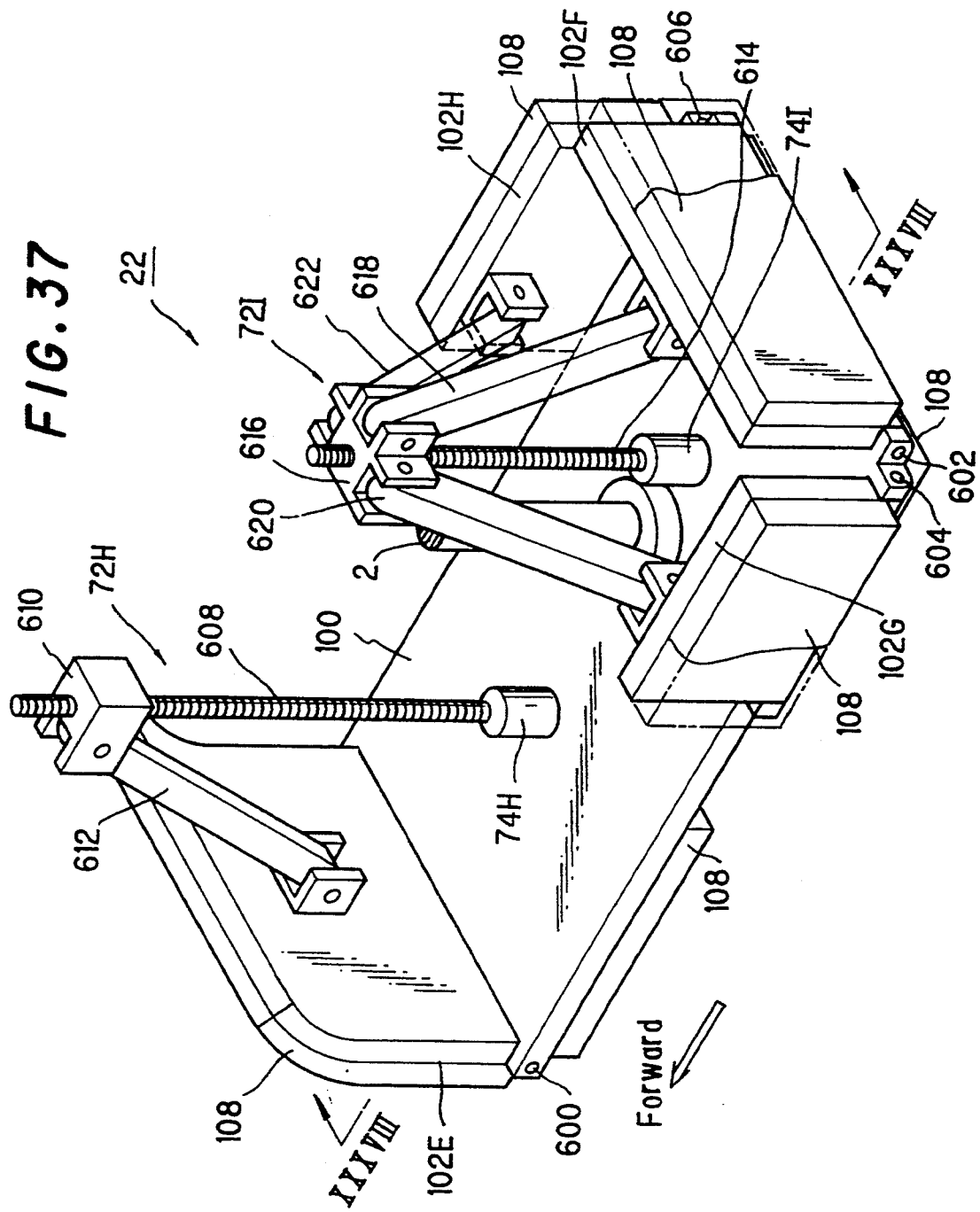
FIG. 37 is a perspective view of a robot foot structure according to a thirteenth embodiment of the invention.
Figure 38:
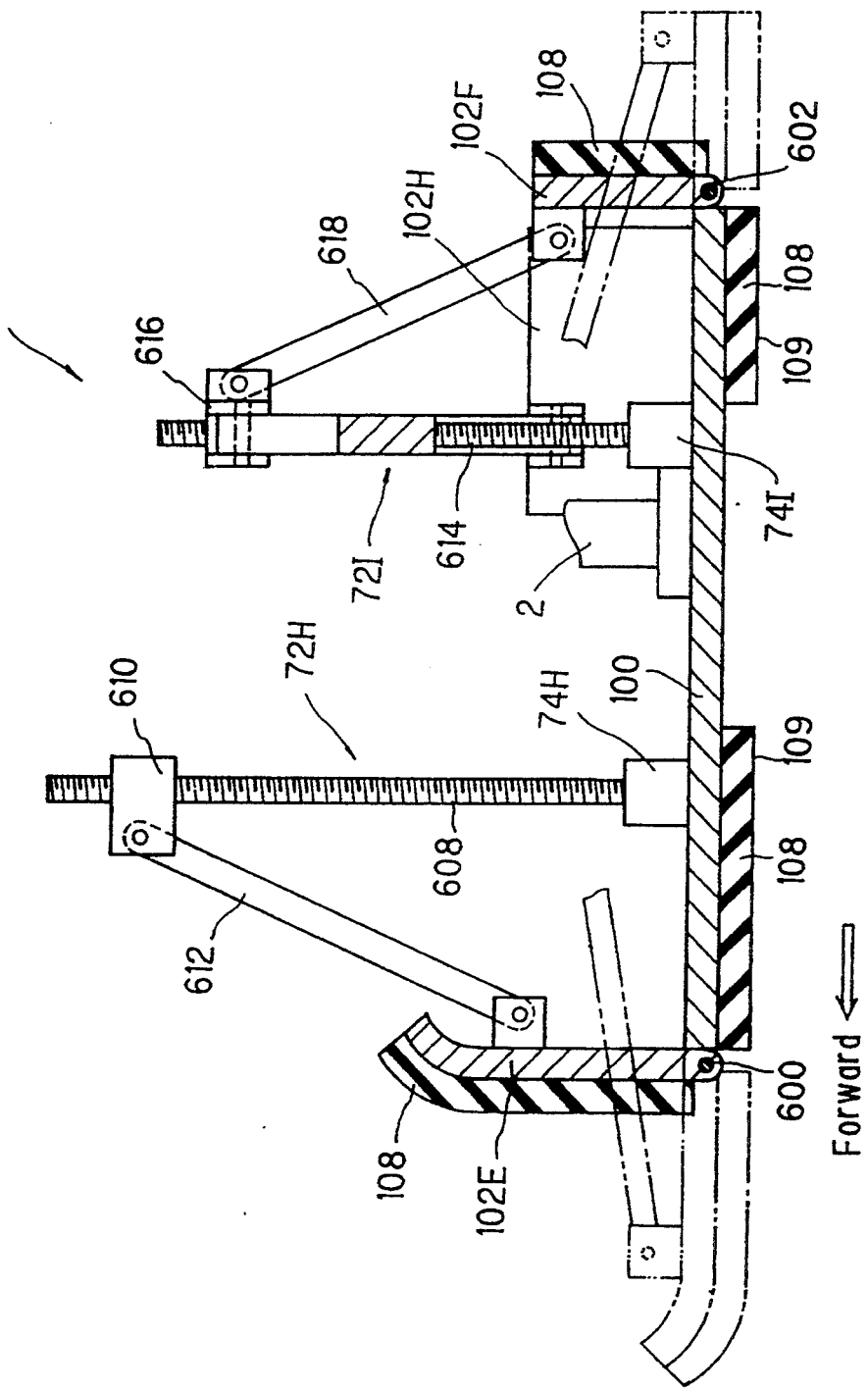
FIG. 38 is a sectional view taken along the line of XXXVIII—XXXVIII of FIG. 37.
Figure 39:
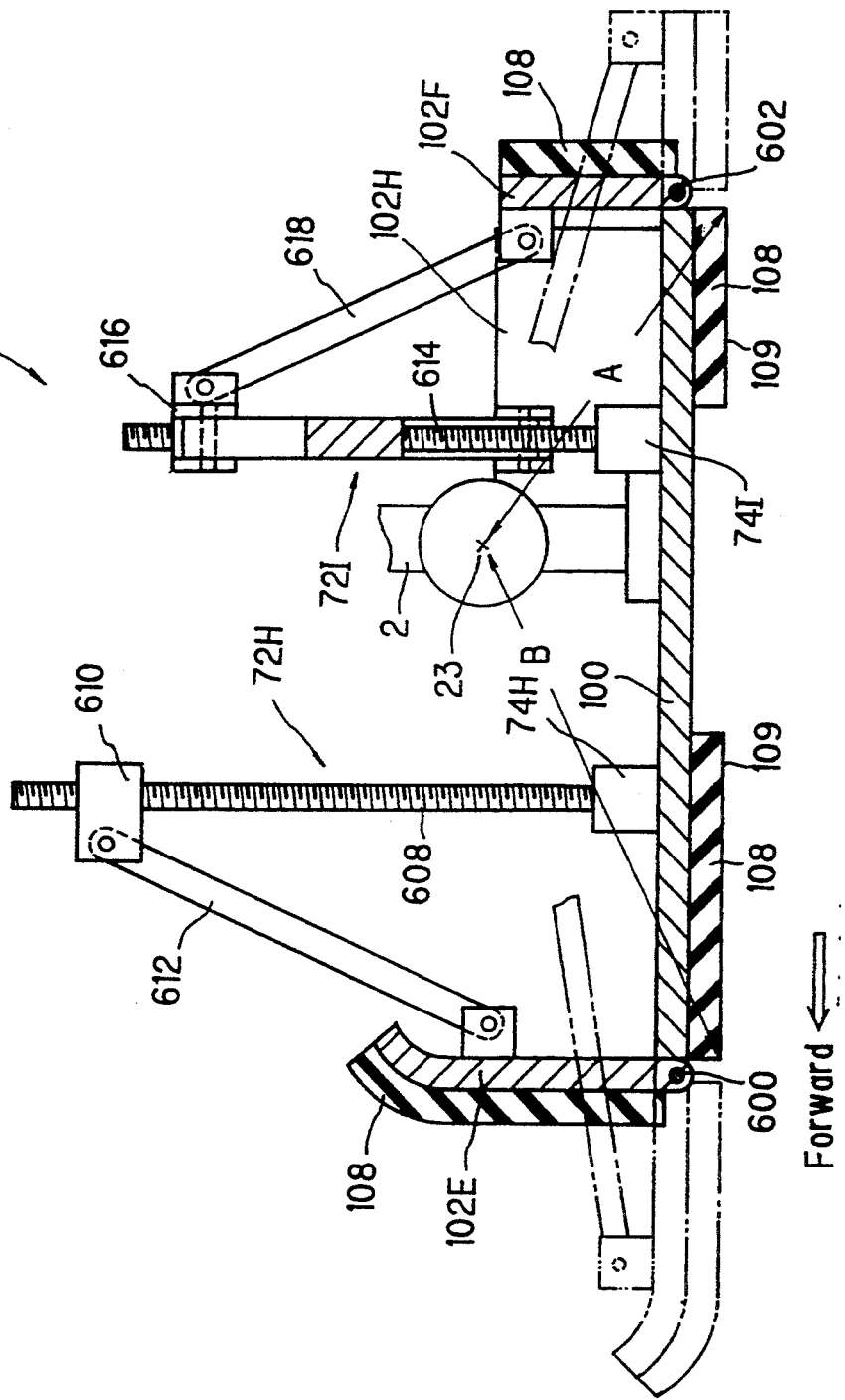
FIG. 39 is a sectional view, similar to FIG. 38, but showing the ratio between the distances from the ankle joint to the foot ends.

FIGS. 37 and 39 show a thirteenth embodiment in which the equivalent ground contact region of the foot 22 is expanded/reduced by rotating movable foot pieces 102E–102H about horizontal axes (axes parallel to the ground contact surface) so as to raise/lower them relative to the main foot member 100 and thus include/exclude them in/from the effective ground contact surface 109.

As shown in FIGS. 37 and 39, the main foot member 100 of this embodiment is of rectangular shape in plan view and has the elastic pads 108 bonded thereto at the toe and heel ends. The bottom surfaces of the elastic pads 108 constitute the effective ground contact surface 109. A movable foot piece 102E is attached to the toe end of the main foot member 100 so as to be rotatable about a horizontal support shaft 600 lying perpendicular to the direction of robot advance. In addition, a movable foot piece 102F is attached to the heel end of the main foot member 100 so as to be rotatable about a horizontal support shaft 602 lying perpendicular to the direction of robot advance. Further, movable foot pieces 102G, 102H are attached to the left and right sides of the main foot member 100 near its heel end so as to be rotatable about horizontal support shafts 604, 606 lying parallel to the direction of robot advance. Each of the movable foot pieces 102E–102H has the elastic pad 108 bonded on its bottom surface.

The movable foot piece 102E at the toe end can be rotated between vertical orientation and horizontal orientation (raised and lowered states) by an actuating mechanism 72H equipped with a motor (e.g. a geared motor) or other rotational drive type actuator 74H. More specifically, the rotational drive type actuator 74H is mounted on the main foot member 100 so as to be able to rotate a screw 608 whose axis of rotation lies vertically (perpendicular to the main foot member 100). The screw 608 is engaged with a female screw block 610 connected with one end of a link 612 the other end of which is connected with the movable foot piece 102E. Thus when the screw 608 is rotated by the actuator 74H, the female screw block 610 rises or falls depending on the direction of the rotation and the link 612 raises or lowers the movable foot piece 102E. The movable foot piece 102E at the heel end and the movable foot pieces 102G, 102H can be rotated between vertical orientation and horizontal orientation (raised and lowered states) by a common actuating mechanism 72I equipped with a motor (e.g. a geared motor) or other rotational drive type actuator 74I. More specifically, the rotational drive type actuator 74I is mounted on the main foot member 100 so as to be able to rotate a screw 614 whose axis of rotation lies vertical (perpendicular to the main foot member 100). The screw 614 is engaged with a female screw block 616 connected with one end of links 618, 620 and 622 the other ends of which are connected with the movable foot pieces 102F, 102G and 102H, respectively. Thus when the screw 614 is rotated by the actuator 74I, the female screw block 616 rises or falls depending on the direction of the rotation and the links 618, 620 and 622 raise or lower the movable foot pieces 102F, 102G and 102H.

In this embodiment, the equivalent ground contact region at the toe end of the foot 22 can be reduced/enlarged in a quantum manner by driving the actuator 74H to raise/lower the toe end movable foot piece 102E out of/into an extension of the effective ground contact surfaces of the main foot member 100. In addition, the equivalent ground contact region at the heel end of the foot 22 can be reduced/enlarged in a quantum manner by driving the actuator 74I to simultaneously raise/lower the heel end movable foot pieces 102F-102G out of/into an extension of the effective ground contact surfaces of the main foot member 100. Needless to say, the ratio can also be varied as required as shown in FIG. 39.

In the foregoing, the embodiments were explained with respect to the foot of the legged walking robot equipped with two legs. Basically, the feet of both legs can be of the same shape (structure) or of symmetrical shape (structure). However, when the feet both legs are considered simultaneously, it is preferable to decide the enlargement/reduction directions (the directions in which the movable foot pieces can be moved) on the basis of the positional relationship among the feet. More specifically, it is preferable to provide the movable foot pieces in such manner that, in the state where both legs are stationary in the upright orientation and the feet are aligned fore/aft and left/right relative to the direction of robot advance, the equivalent ground contact region of the respective feet can be enlarged/reduced in the directions which enlarge/reduce the region enclosed by the overall envelope enclosing the equivalent ground contact regions of all the feet (the region enclosed by the overall envelope being hereinafter referred to as the "total ground contact region"). This will be explained with respect to a specific example shown in FIGS. 40 to 42.

Figure 40:
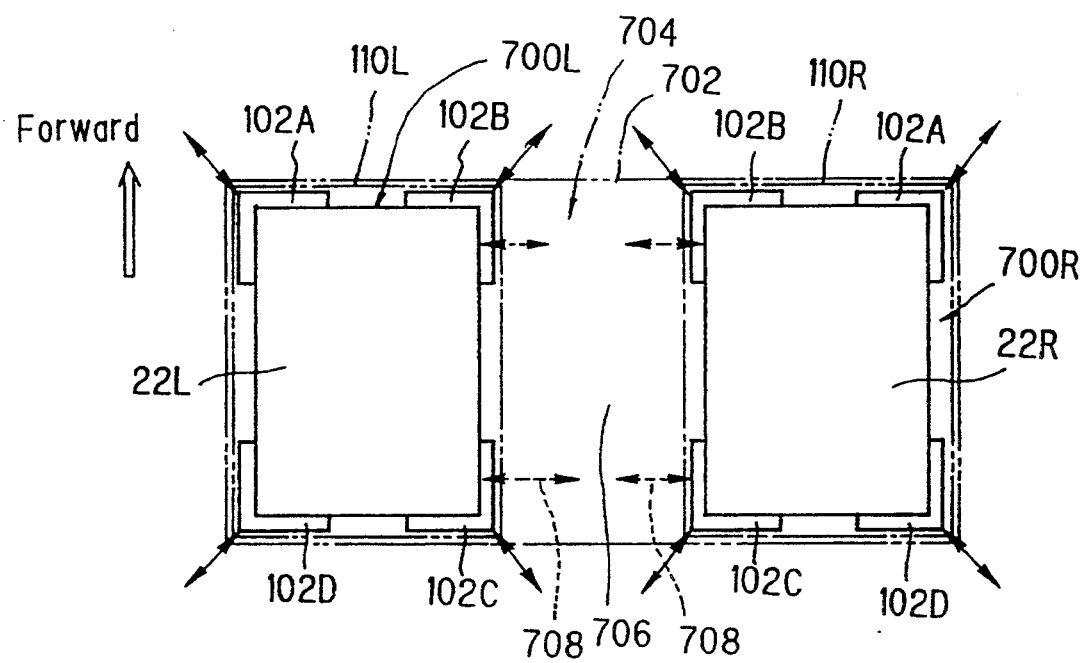
FIG. 40 is a plan view of a robot foot structure according to a fourteenth embodiment of the invention.
Figure 41:
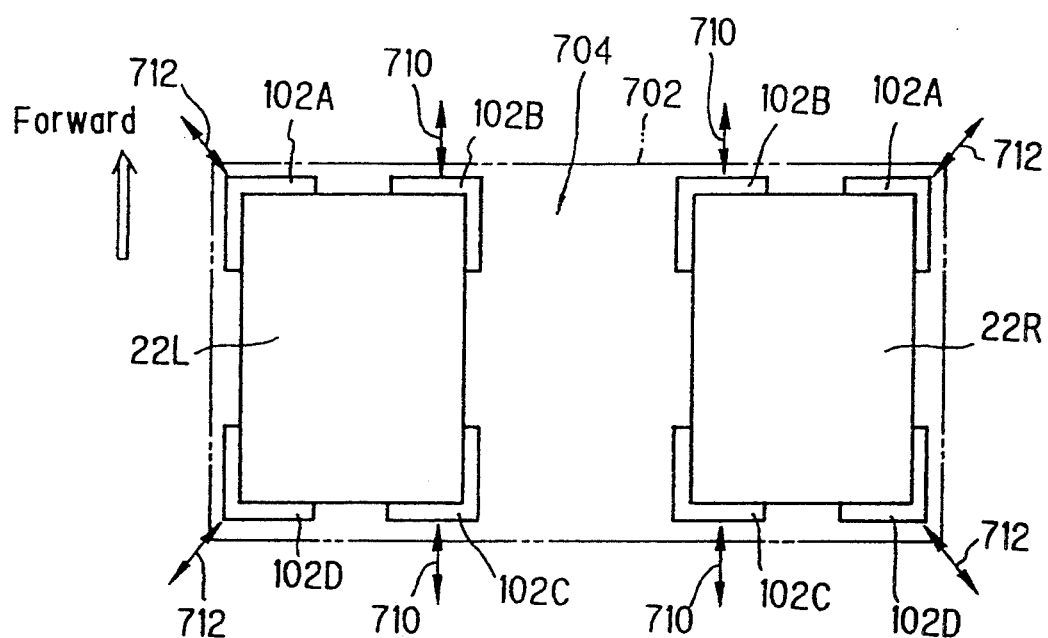
FIG. 41 is a plan view of the foot structure of FIG. 40 showing the moving direction of movable foot pieces.

FIGS. 40 and 41 show a fourteenth embodiment in which each of the feet is equipped at its four corners with the four movable foot pieces 102A-102D. The envelopes 110L, 110R connecting the outer edges of the movable foot pieces 102A-102D define the equivalent ground contact regions 700L, 700R. In this case the region enclosed by the envelope 702 encompassing the overall periphery of both the left and right equivalent ground contact regions 700L, 700R is the total ground contact region 704. In this case, it suffices for the movable foot pieces 102A-102D of each foot to be provided so as to be movable only in directions which enlarge/reduce the total ground contact region 704. In other words, there is no need for enlarging/reducing the equivalent ground contact regions 700L, 700R of the left and right feet 22L, 22R in the direction of the space 706 between the two equivalent ground contact regions (in the direction indicated by the broken line arrows 708). Solely from this point of view, there is no need to provide the movable foot pieces 102B, 102C at the inside corners of the left and right feet 22L, 22R. For improving the stability of the feet 22L, 22R, however, it is preferable to provide the movable foot pieces 102B, 102C on the inside corners so as to be movable in the fore/aft direction, as indicated by arrow 710 in FIG. 41. In this case, the movable foot pieces 102A, 102D at the outside corners can be provided either to move radially as indicated by the arrow 712 or to move fore/aft.

Figure 42:
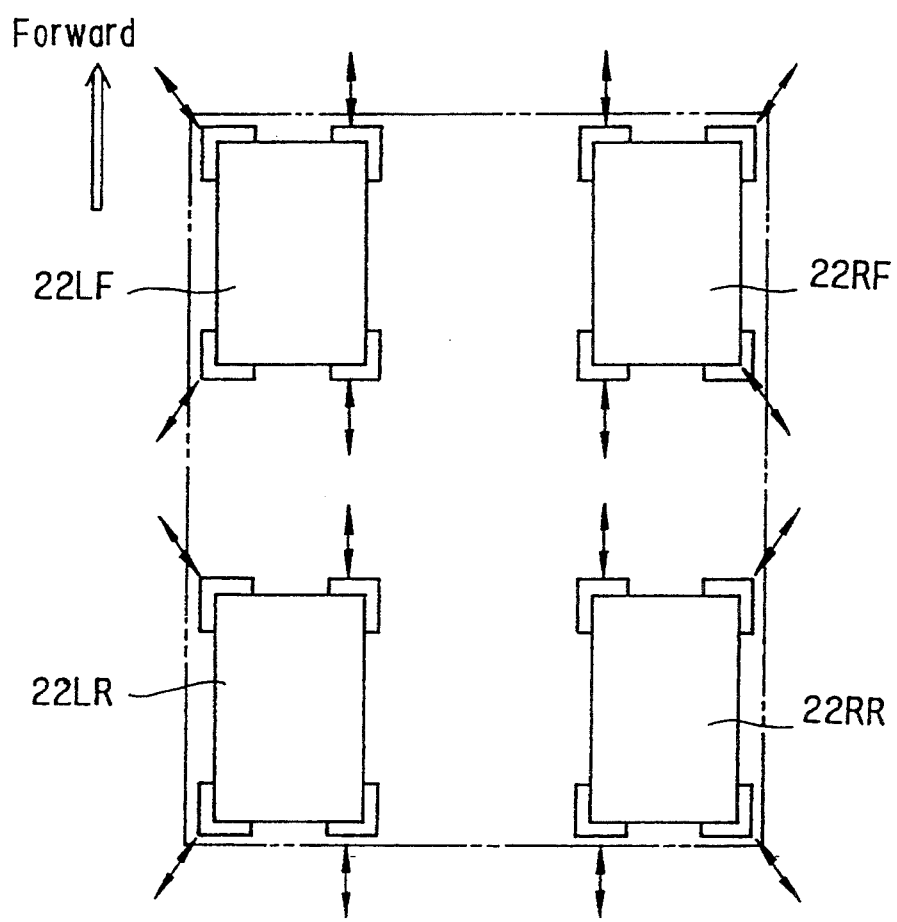
FIG. 42 is a plan view, similar to FIG. 40, but showing a robot foot structure according to a fifteenth embodiment of the invention.
Figure 43:
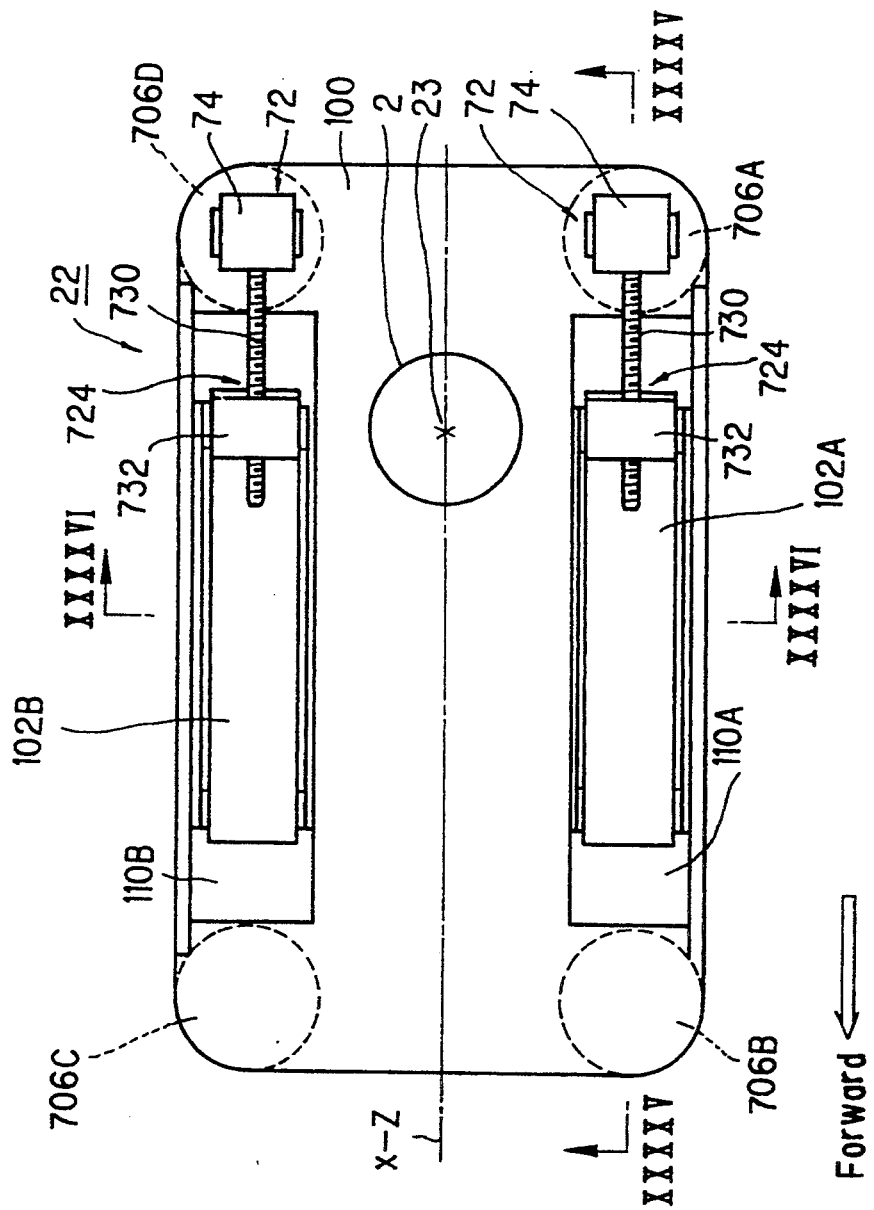
FIG. 43 is a plan view of a robot foot structure according to a sixteenth embodiment of the invention.
Figure 44:
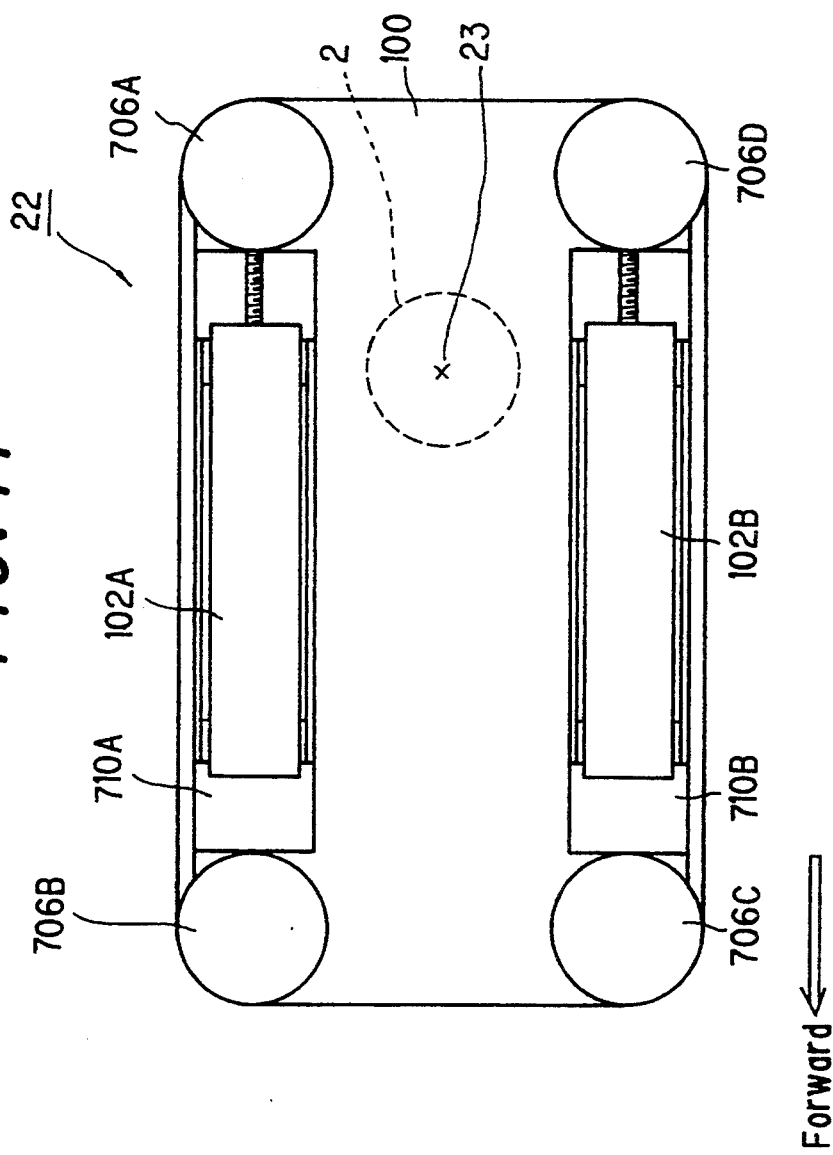
FIG. 44 is a bottom view of the foot structure of FIG. 43.

FIG. 42 shows a fifteenth embodiment in which, based on the same thinking as in FIG. 41, the movement directions of the movable foot pieces 102A-102D are determined in the case of a robot having four legs (although such a robot is not illustrated in the foregoing figures) and four feet 22LF, 22RF, 22LR, 22RR.

Figure 45:
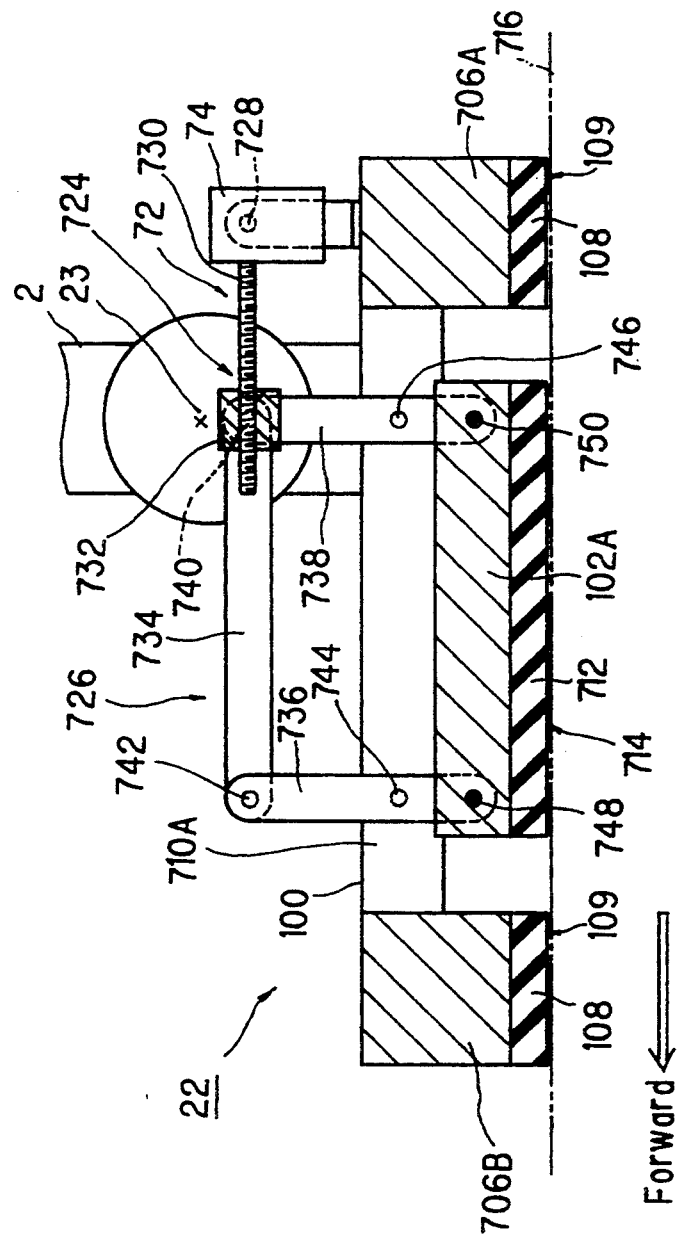
FIG. 45 is a sectional view taken along the line of XXXXV-XXXV of FIG. 43.

FIGS. 43 to 47 show a foot structure according to a sixteenth embodiment of the invention. As explained in more detail below, FIGS. 43 to 46 show the movable foot pieces 102A, 102B in positions where they are able to make contact with the terrain (i.e. in the large effective ground contact surface area state), while FIG. 47, which is a similar view to that of FIG. 45, shows the movable foot pieces 102A, 102B in positions where they do not make contract with the terrain (i.e. in the small effective ground contact surface area state).

Just like as the first embodiment or so, the foot 22 comprises the plate-like main foot member 100 attached to the lower end of the foot 22. The main foot member 100 is rectangular in plan view and is attached to the leg 2 at a position such that the distance between the central point of attachment (more precisely the point of vertical projection of the ankle joint center 23 on the main foot member 100) and the leading end of the foot 22 (i.e. between the ankle and the toe) is longer than the distance between the central point of attachment and the trailing edge (i.e. between the ankle and the heel). Fixed ground contact members 706A-706B are formed on the underside of the main foot member 100 at the four corners thereof, more precisely at four locations situated two each on the left and right sides of a vertical plane (shown as "x-z plane in the figure") parallel to the direction of advance of the robot and passing through the center of the ankle joint. The fixed ground contact members 706A-706B are formed by bonding the elastic pads 108 made of rubber or other elastic material to the bottom of the main foot member 100 at the four corners thereof. The bottom surfaces of the elastic pads constitute the effective ground contact surfaces 109.

Figure 46:
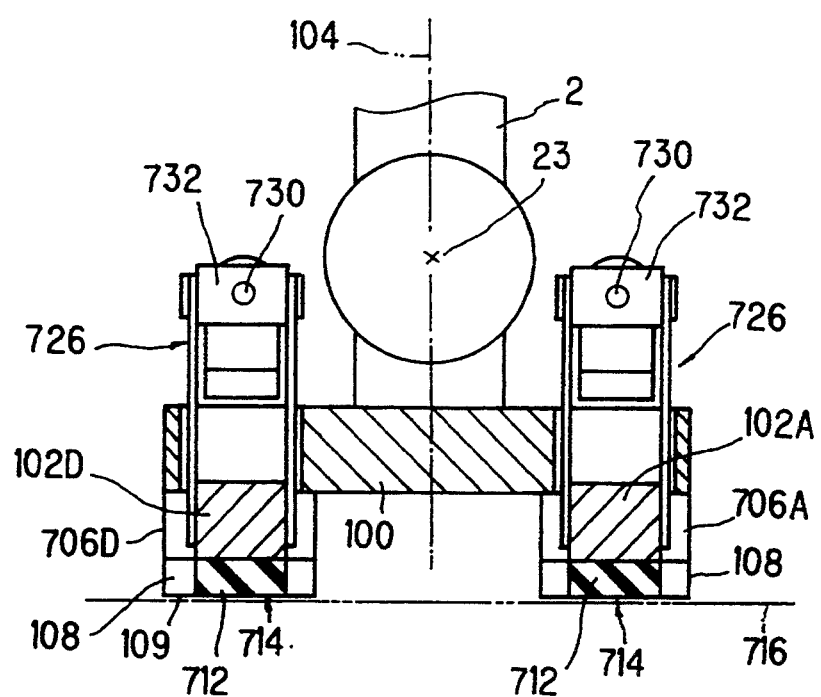
FIG. 46 is a sectional view taken along the line of XXXXVI—XXXXVI of FIG. 43.
Figure 47:
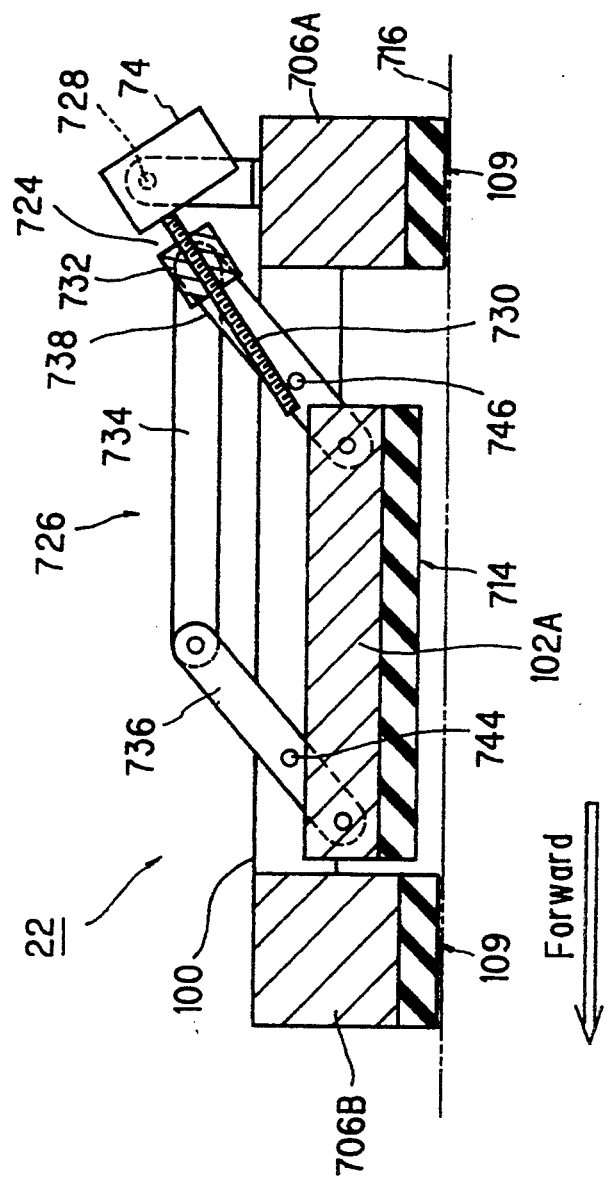
FIG. 47 is a sectional view taken along the same line as of FIG. 45.

The main foot member 100 is further formed near its left and right edges with respect to the direction of robot advance, more precisely at intermediate positions between the fixed ground contact members 706A and 706B and between the fixed ground contact members 706C and 706D, with rectangular voids 710A, 710B which pass completely through the main foot member 100 in its vertical direction and whose longer sides lie parallel to the direction of robot advance. The movable foot pieces 102A, 102B having a configuration that is long in the direction of robot advance are disposed in the voids 710A, 710B. Each of the movable foot pieces 102A, 102B has a cushioning member 712 made of rubber or other elastic material bonded on its bottom surface. The bottom surfaces of the cushioning members 712 constitute ground contactable surfaces 714. The movable foot pieces 102A, 102B are supported so as to be movable between a position wherein, as shown in FIGS. 45 and 46, the ground contactable surfaces 714 thereof are flush with the plane including the ground contact surfaces 109 of the fixed ground contact members 706A-706B (this plane being shown in FIGS. 45-47 by a two-dot chain line 716; the so-defined position being called the "ground contactable position") and a position wherein, as shown in FIG. 47, the ground contactable surfaces 714 are apart from the plane 716 (this position being called the "ground non-contacting position"). The movable foot pieces 102A, 102B are moved between the ground contactable position and the ground non-contacting position by the actuating mechanisms 72 described below.

In the embodiment illustrated in FIGS. 43 to 47, the actuating mechanisms 72 includes the actuator 74 of motors or other rotational drive type, screw mechanisms 724 and parallel link mechanisms 726. More specifically, as shown in detail in FIG. 45, the actuator 74 is mounted on the main foot member 100 so as to be tiltable about a support shaft 728 and to be capable of rotating a screw 730 engaged with a female screw block 732. The female screw block 732 is connected with the main foot member 100 and the movable foot piece 102A (102B) through links 734, 736, 738 constituting the parallel link mechanism 726. The links 734, 738 are rotatably connected to the female screw block 732 by a pin 740, the other end of the link 734 is rotatably connected to one end of the link 736 by a pin 742, the links 736, 738 are rotatably supported at intermediate points thereof on the main foot member 100 by pins 744, 746, and the distal ends of the links 736, 738 are rotatably connected with the movable foot piece 102A (102B) by pins 748, 750.

In the foot 22 at its actual state, the bottom edges of the elastic pads 108 of the fixed ground contact members 706A-706B of the main foot member 100 are usually beveled and the toe and heel ends of the main foot member 100 may be curved so that their edges are bent backward toward the top. Since these configurations are not features of the invention, however, they are not illustrated in the figures.

In the embodiment shown in FIGS. 43 to 47, as best shown in FIGS. 45 and 47, when the rotational drive type actuator 74 is operated to rotate the screw 730 about its axis, the female screw block 732 is advanced/retracted and the actuators 74 tilts accordingly. As a result, the links 736, 738 of the parallel link mechanism 726 swing about the pins 744, 746, causing the movable foot piece 102A (102B) to move obliquely up or down along an arcuate trajectory centered on the pins 744, 746 while maintaining its horizontal orientation. The ground contactable surface 714 of the movable foot piece 102A (102B) thus moves between a position in the plane 716 at which it can contact the ground (FIGS. 45 and 46) and a position apart from the plane 716 at which it cannot contact the ground (FIG. 47). When the movable foot pieces 102A, 102B are in the ground contactable position as shown in FIGS. 45 and 46, the ground contact surfaces 109 of the fixed ground contact members 706A-706B of the main foot member 100 and the ground contactable surfaces 714 of the movable foot pieces 102A, 102B constitute the effective ground contact surface. This is the state of large effective ground contact surface area. On the other hand, when the movable foot pieces 102A, 102B are in the ground non-contacting position as shown in FIG. 47, the effective ground contact surface is constituted solely by the ground contact surfaces 109 of the fixed ground contact members 706A-706B. This is the state of small effective ground contact surface area.

Figure 48:
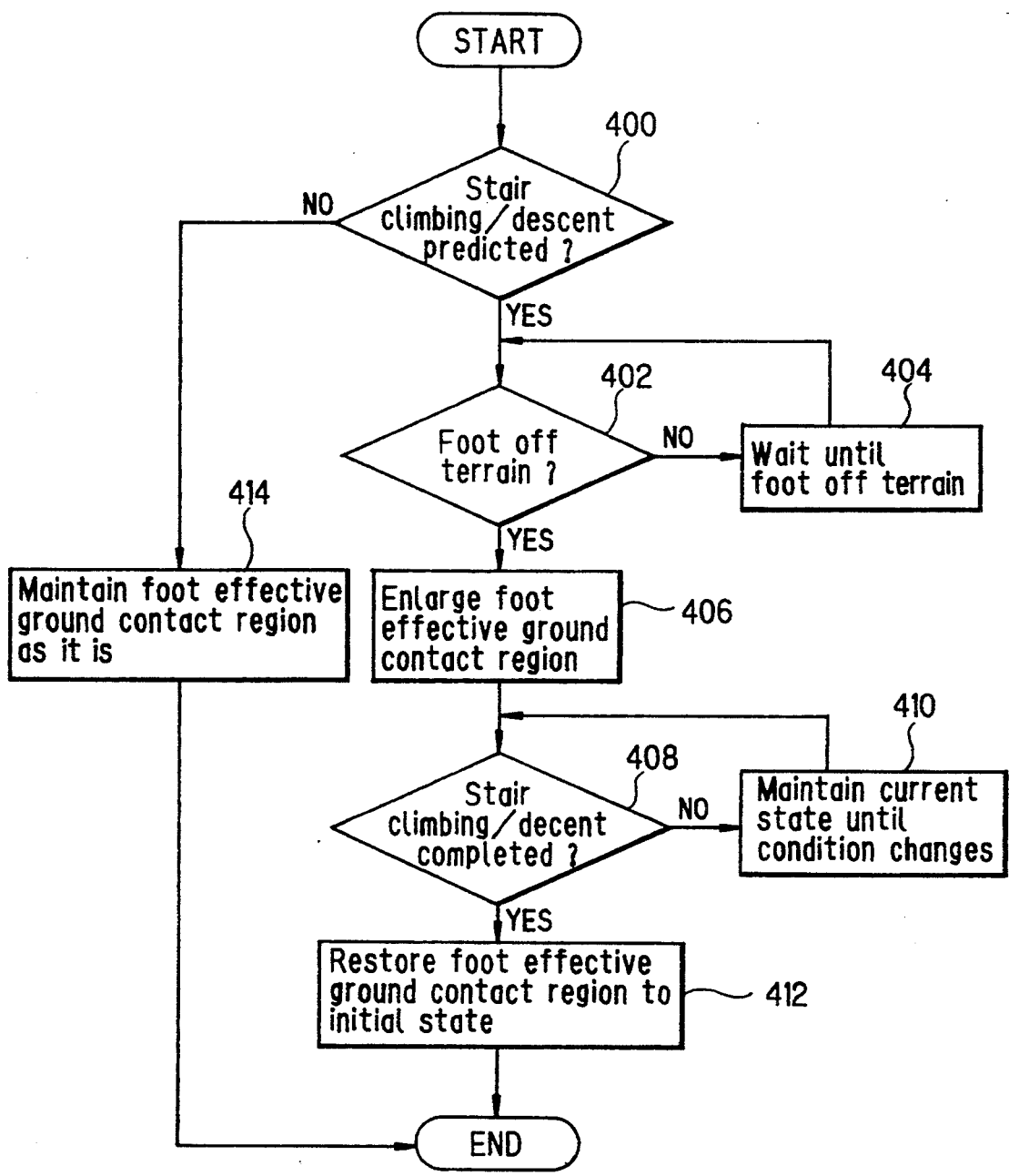
FIG. 48 is a flow chart showing how to control the operation of an actuator of the foot structure according to the sixteenth embodiment of the invention.

FIG. 48 is a flow chart of the procedure for controlling the operation of the aforesaid foot structure in accordance with the walking conditions. The flow chart of FIG. 48 assumes that the foot structure is initially in the small effective ground contact surface area state, i.e. in the state with the movable foot pieces 102A, 102B of the aforesaid embodiment in the ground non-contacting position (position shown in FIG. 47).

The control procedure of FIG. 48 starts with step 400 in which a discrimination is made as to whether or not walking up or down stairs is predicted in a similar manner to the first embodiment. When the result of the discrimination in step 400 is YES, i.e. when stair climbing or descent is predicted, control passes to step 402. On the other hand, if such a condition is not expected (NO), control passes to step 414 in which the initial state is maintained (the area of the effective ground contact region is not changed) and the control routine is terminated. Specifically, the actuators 74 of the foot actuating mechanisms 72 are not operated and the movable foot pieces 102A, 102B are not operated.

When control passes to step 402, a discrimination is made as to whether or not the foot ground contact surfaces (actually the ground contact surfaces of the fixed ground contact members 706A-706B of the main foot member 100) are off the terrain. As was stated before, this is necessary because the actuators 74 of the foot actuating mechanism 72 (and thus the movable foot pieces 102A, 102B) are operated only when the foot is off (not in contact with) the terrain. Otherwise the extremely high load that would act on the actuators 74 of the actuating mechanisms 72 should the movable foot pieces 102A, 102B be operated when the foot is in contact with the terrain would make it difficult to operate the actuators 74 and might even damage them. When the result of the discrimination in step 402 is NO, i.e. when it is found that the foot is not off the terrain, control passes to step 404 where it waits until the foot rises off the terrain and then returns to step 402 after passage of a prescribed period of time. When the result of the discrimination in step 402 is YES, i.e. when it is found that the foot is off the terrain, control passes to step 406.

Step 406 drives the actuators 74 of the actuating mechanisms 72 associated with the movable foot pieces 102A, 102B so as to enlarge the effective ground contact region. That is to say, the actuators 74 are operated to bring the movable foot pieces 102A, 102B to their ground contactable positions. Steps 402, 404 and 406 are executed separately or serially for the left and right feet (22L, 22R) of the biped walking type robot. After the foot effective ground contact region has been enlarged or reduced in step 406, walking is continued for climbing or descending the stairs while maintaining the new foot effective ground contact region area. In the meantime, control passes to step 408 in which a discrimination is conducted as to whether or not the stair climbing or descent has terminated and the initial condition been restored. When the result in step 408 is NO, i.e. when it is found that the stair climbing or descent has not been completed, control passes to step 410 in which the current state of the effective ground contact region is maintained, whereafter, following passage of a prescribed period of time, control returns to step 408. On the other hand, when the result in step 408 is YES, i.e. when it is found that the stair climbing or descent has been completed, control passes to step 412. Step 412 restores the effective ground contact area to its initial size. Namely, it operates the actuators 74 of the actuating mechanisms 72 so as to restore the movable foot pieces 102A, 102B to their initial ground non-contacting positions. While not indicated in FIG. 48, similarly to what was explained earlier in connection with steps 402 and 404, step 412 is executed for operating the actuators 74 of the actuating mechanisms 72 only when the foot is off the terrain. Step 412 is also executed separately or serially for the left and right feet (22R, 22L).

Thus when walking involving stair climbing or descent is predicted, the foot effective ground contact region is enlarged and the climbing or descent is executed in this state. On the other hand, when stair climbing or descent is not predicted or when the stair climbing or descent has been completed, i.e. during walking on a flat terrain, walking is conducted with the foot effective ground contact surface made small. As a result, walking stability can be secured both during stair climbing and descent and during level ground walking.

Figure 49:
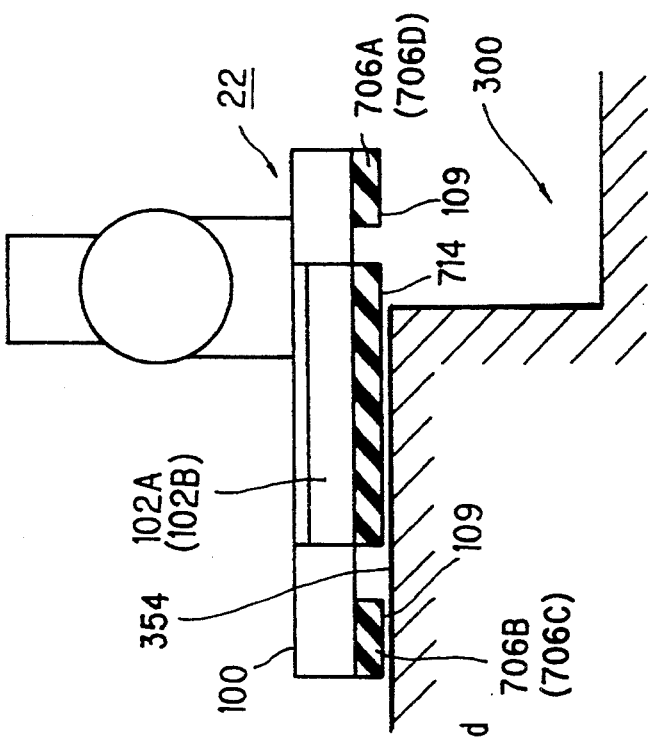
FIG. 49 is an explanatory view showing the operation of the foot structure according to the sixteenth embodiment of the invention.
Figure 49:
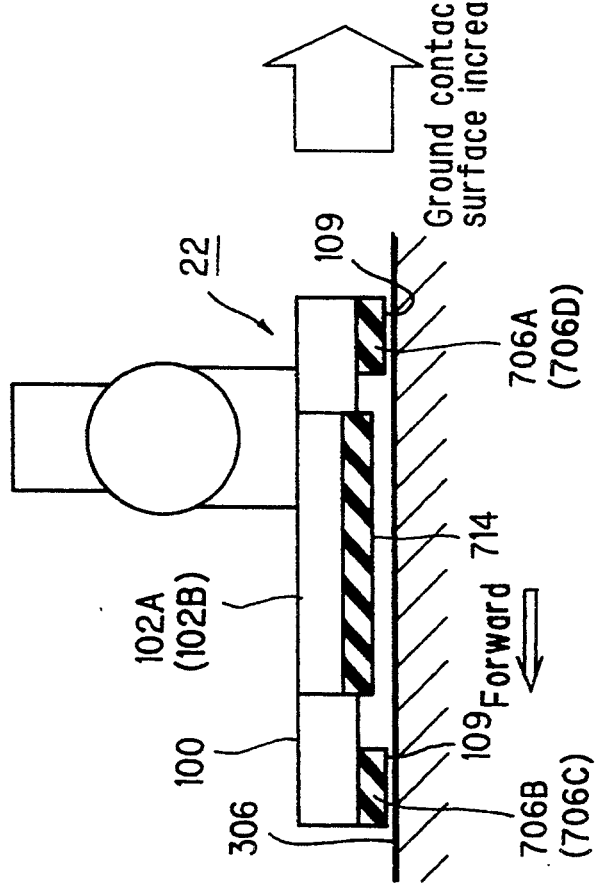

The manner in which the effective ground contact surface area is increased during stair climbing and descent and reduced during level ground walking will now be explained with reference to FIG. 49. FIG. 49(A) shows the state of the foot 22 during walking over the flat terrain 306 and FIG. 49(B) shows the state thereof during climbing of the stairs 300.

As was explained in the foregoing, the robot is adversely affected by even small terrain irregularities when it walks over a generally flat surface such as the flat terrain 306. For example, it becomes unstable when a foot ground contact surface steps on a small bump. As shown in FIG. 49(A), therefore, walking over the flat terrain 306 is conducted with the effective ground contact surface area in the small state, namely with the movable foot pieces 102A, 102B in the ground non-contacting position where the ground contactable surfaces 714 are off the flat terrain 306 and with the ground contact surface 109 constituted by the fixed ground contact members 706A-706B at the four corners of the main foot member 100. As a result, the robot is able to walk stably unaffected by small bumps and depressions in the flat terrain 306.

On the other hand, during stair climbing and descent, if the effective ground contact surface area is small, namely is constituted only by the ground contact surfaces 109 at the four corners of the main foot member 100 in the foregoing manner, the fixed ground contact members 706A, 706D among the fixed ground contact members 706A-706D at the four corners of the foot will be out of contact with the stair step surface during stair climbing, while the fixed ground contact members 706B, 706C will be out of contact therewith during stair descent. As a result, the robot is liable to become unstable because the foot 22 will contact the stair step surface at an angle and, moreover, because the contact between the foot and the edge of the step will occur with an impact at a part of the foot not provided with a cushioning member. Therefore, as shown in FIG. 49(B), during stair climbing (and, though not shown, also during stair descent), the effective ground contact surface area is enlarged. Specifically, the movable foot pieces 102A, 102B are moved to the ground contactable position. In this state the ground contactable surfaces 714 of the movable foot pieces 102A, 102B are flush with the ground contact surface 109 constituted by the fixed ground contact members 706A-706B and make contact with the step surface 354 of the stairs 300. As a result, even if one or two of the fixed ground contact members 706A-706B should fail to make contact with the step surface 354 of the stairs 300, the foot 22 will still be prevented from tilting and from experiencing an impact. The robot is therefore able to climb or descent the stairs stably.

Figure 50:
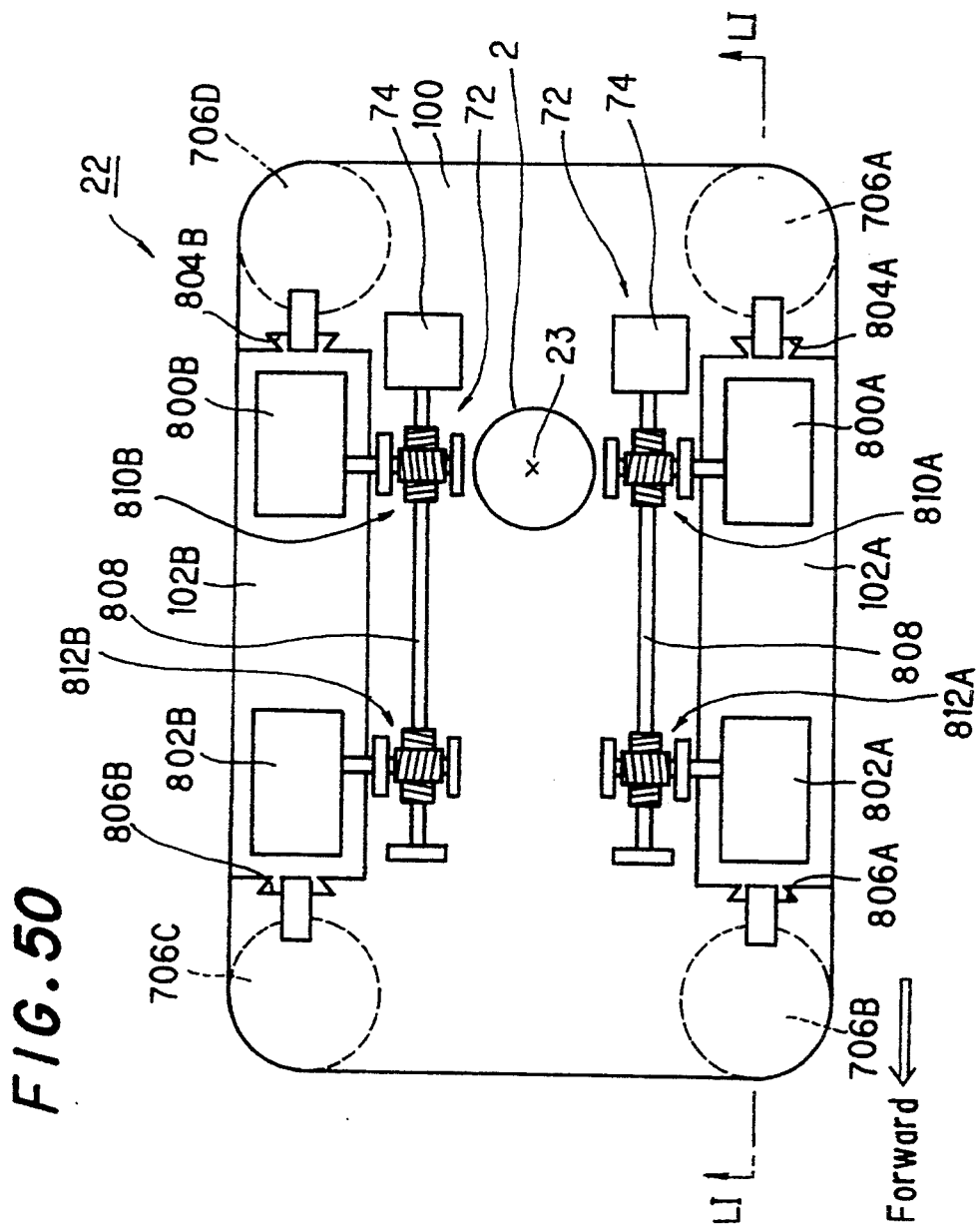
FIG. 50 is a plan view of a robot foot structure according to a seventeenth embodiment of the invention.
Figure 51:
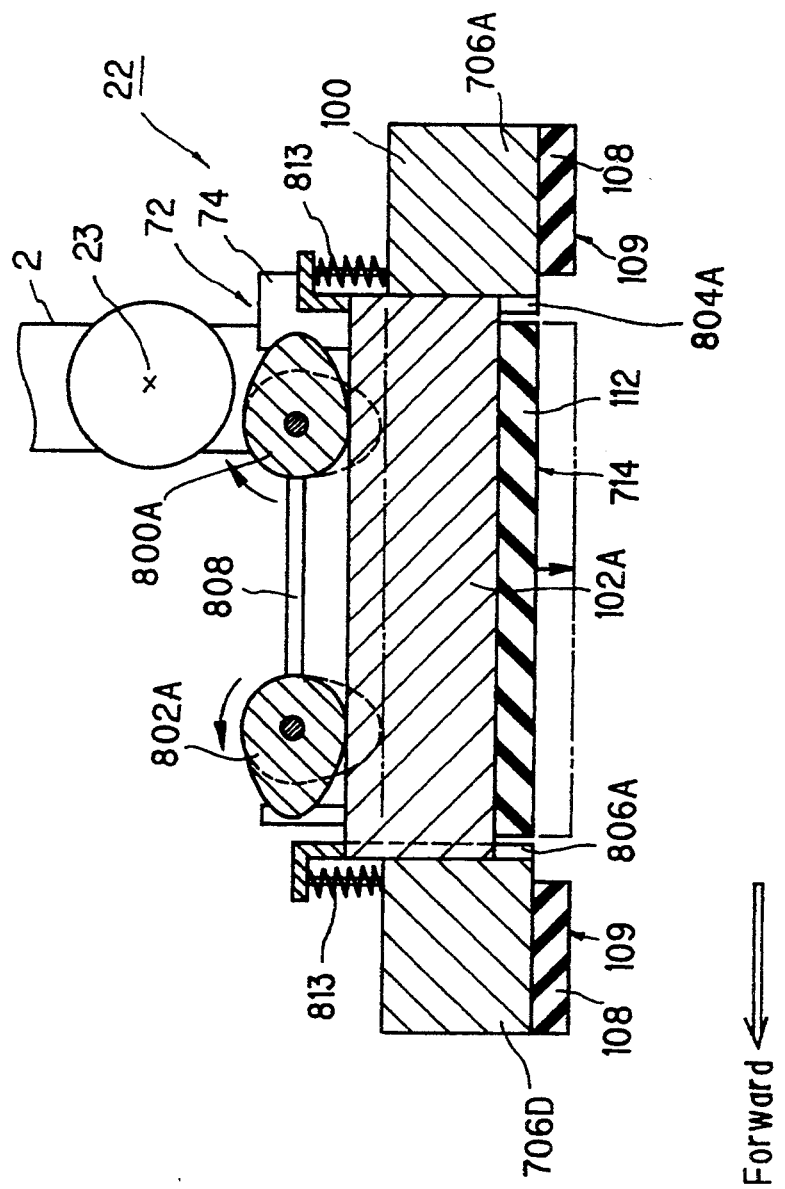
FIG. 51 is a sectional view taken along the line of LI—LI of FIG. 50.

FIGS. 50 and 51 show a seventeenth embodiment of the invention in which the movable foot pieces 102A, 102B are supported to be movable vertically, the actuators 74 of the actuating mechanisms 72 are of the rotational drive type (e.g. motors), and the movable foot pieces 102A, 102B are moved vertically by cams 800A, 800A and 800B, 800B driven by the actuators 74. In the embodiment of FIGS. 50 and 51, the movable foot piece 102A (102B) is provided in the main foot member 100 at the left (right) edge thereof relative to the direction of robot advance, between the fixed ground contact members 706A, 706B (706C, 706D), so as to be slidable up and down under the guidance of vertical guide grooves 804A, 806A (804B, 806B). The motor or other type rotational drive type actuator 74 (74) of the actuating mechanism 72 (72) is provided on the main foot member 100 in association with the movable foot piece 102A (102B). The actuator 74 (74) rotates a shaft 808 (808) which is connected with cams 800A, 802A (800B, 802B) through worm gears 810A, 812A (810B, 812B). The cams 800A, 802A (800B, 802B) are positioned in contact with the upper surface of the movable foot piece 102A (102B). In addition, the movable foot piece 102A (102B) is urged upward relative to the main foot member 100 by springs 813, 813 (813, 813) provided at opposite ends thereof.

In the embodiment shown in FIGS. 50 and 51, the movable foot piece 102A (102B) can be moved from the upper position indicated by solid lines in FIG. 51 (i.e. the ground non-contacting position) to the ground contactable position indicated by chain lines, by driving the actuator 74 (74) to rotate the shaft 808 (808), thus rotating the cams 800A, 802A (800B, 802B) via the worm gears 810A, 812A (810B, 812B) and causing them to press the movable foot piece 102A (102B) downward against the force of the springs 813, 813 (813, 813). The result of this is to increase the effective ground contact surface area. While FIGS. 50 and 51 show an example in which the movable foot pieces 102A, 102B are operated by separate rotational drive type actuators 74, it is possible instead to drive them both with a single actuator. In other words, it possible to rotate both of the shafts 808 using a single rotational drive type actuator.

Figure 52:
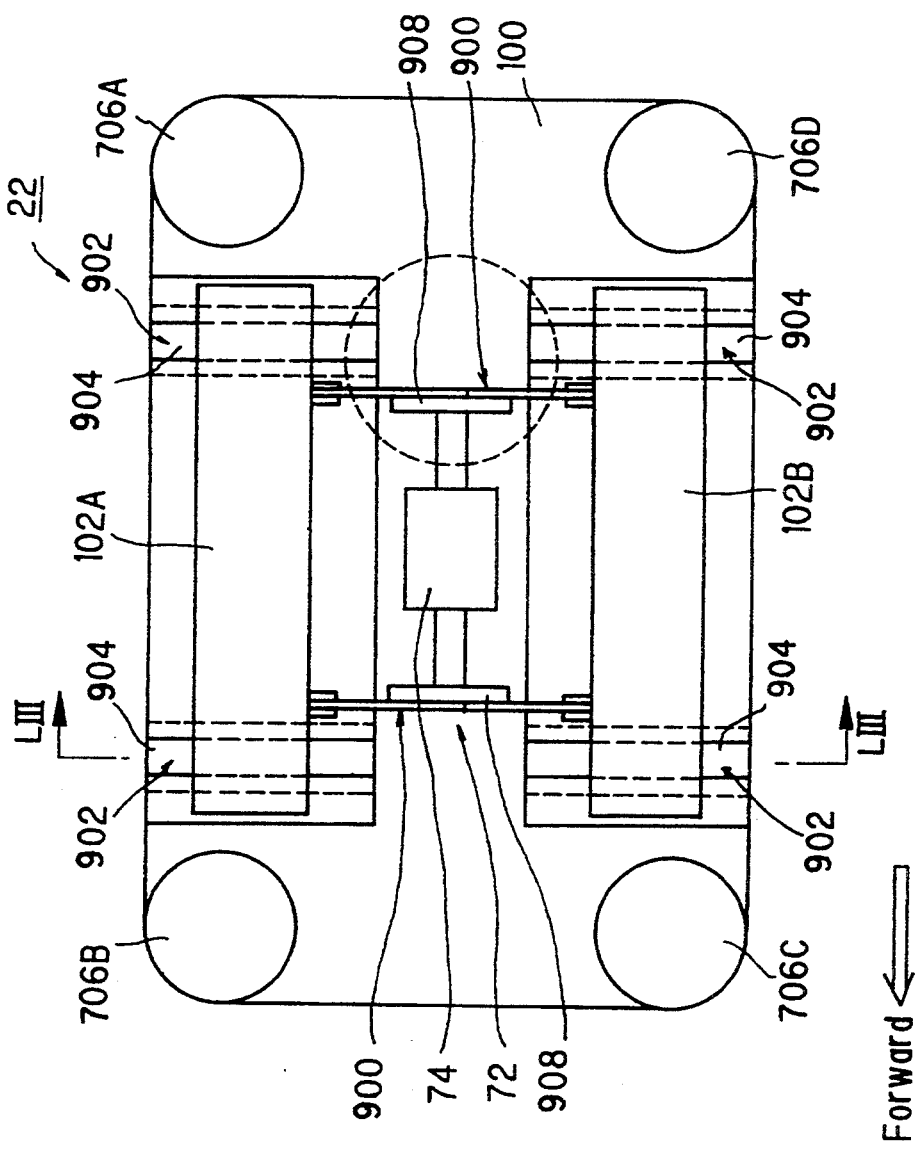
FIG. 52 is a bottom view of a robot foot structure according to an eighteenth embodiment of the invention.
Figure 53:
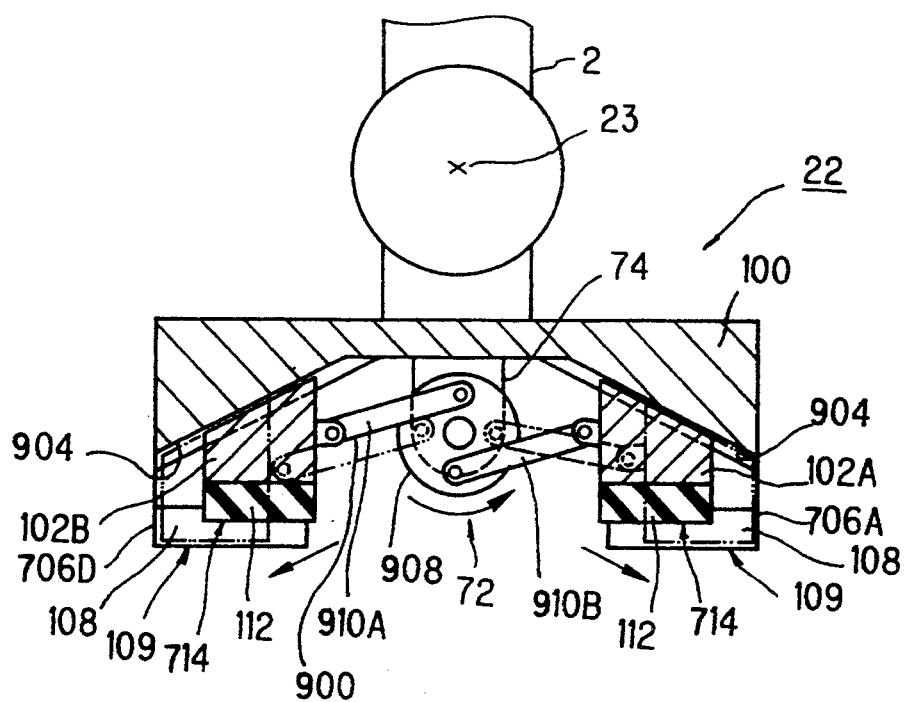
FIG. 53 is a sectional view taken along the line of LIII—LIII of FIG. 52.

FIGS. 52 and 53 show an eighteenth embodiment in which the actuating mechanisms 72 are constituted to move the movable foot pieces 102A, 102B by means of a crank mechanism 900 and inclined slide mechanisms 902. In the embodiment of FIGS. 52 and 53, the main foot member 100 is provided on the bottom surface near its right (left) edge relative to the direction of robot advance and at a position between the fore and aft fixed ground contact members 706B, 706A (706C, 706D) with a movable foot piece 102A (102B) Each of the movable foot pieces 102A, 102B is supported to be slidable along the slope of an inclined slide groove 904 provided on the bottom surface of the corresponding side of the main foot member 100. A motor or other rotational drive type actuator 74 is mounted at the center of the bottom surface of the main foot member 100. The actuator 74 has a rotational cam plate 908 attached to its drive shaft 906. One point near the edge of the rotational cam plate 908 is connected with the movable foot piece 102A via a crank arm 910B and another point near the edge thereof is connected with the movable foot piece 102B via a crank arm 910A.

When the actuator 74 of the embodiment of FIGS. 52 and 53 is operated, the crank mechanism 900 constituted by the rotational cam plate 908 and the crank arms 910A, 910B move the movable foot pieces 102A, 102B diagonally along the inclined slide grooves 904 of the inclined slide mechanisms 902. In other words, the ground contactable surfaces 714 of the movable foot pieces 102A, 102B are moved between a position flush with the ground contact surface 109 constituted by the fixed ground contact members 706A-706B (the ground contactable position) and a position apart from this surface (the ground non-contacting position).

Figure 54:
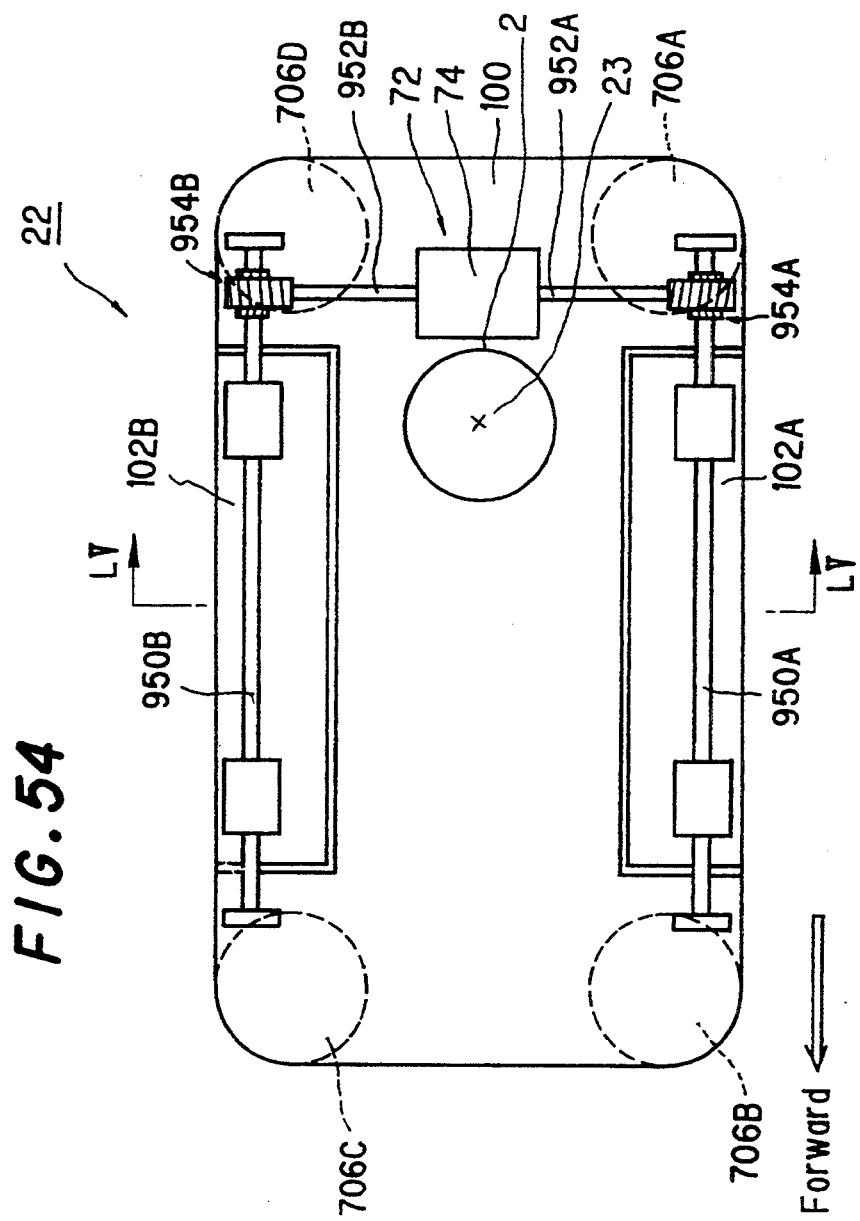
FIG. 54 is a plan view of a robot foot structure according to a nineteenth embodiment of the invention.
Figure 55:
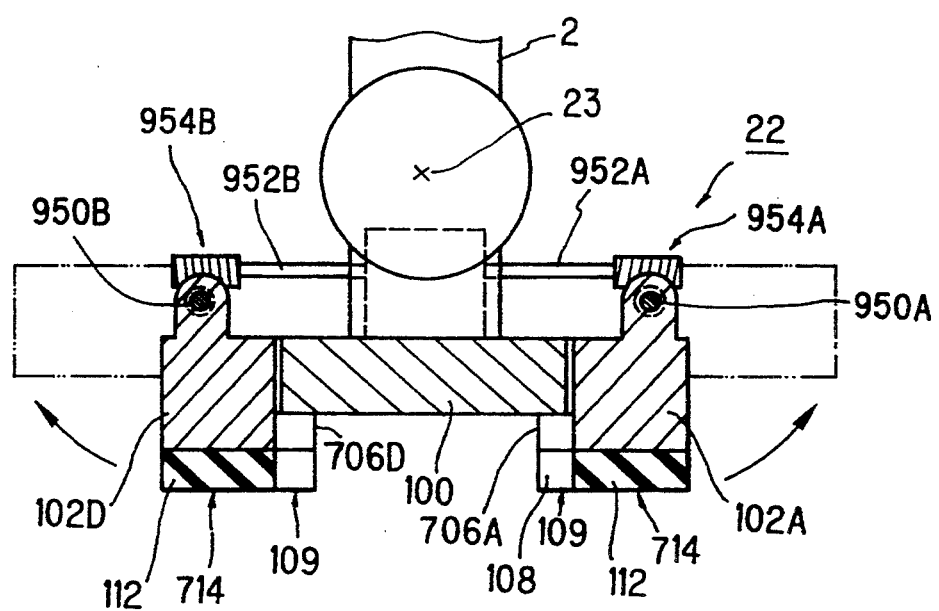
FIG. 55 is a sectional view taken along the line of LV—LV of FIG. 54.

FIGS. 54 and 55 show a nineteenth embodiment in which the actuating mechanism 72 is constituted so as to swing the movable foot pieces 102A, 102B laterally. The movable foot pieces 102A, 102B are attached at their upper portions to shafts 950A, 950B so as to be able to swing about axes lying parallel to the direction of robot advance. The shafts 950A, 950B are connected with rotational shafts 952A, 952B of the motor or other rotational drive type actuator 74 via worm gears 954A, 954B.

When the actuator 74 of the embodiment of FIGS. 54 and 55 is operated, the rotational driving force thereof is transmitted through the rotational shafts 952A, 952B and the worm gears 954A, 954B to the shafts 950A, 950B. The resulting rotation of the shafts 950A, 950B causes the movable foot pieces 102A, 102B to be swung about horizontal axes lying parallel to the direction of robot advance. Specifically, the movable foot pieces 102A, 102B are swung between a state in which their ground contactable surfaces 714 face downward and extend horizontally (the ground contactable position) and a position in which the movable foot pieces 102A, 102B are extended laterally with their ground contactable surfaces 714 facing outward (the ground non-contacting position).

All of the foregoing sixteenth to nineteenth embodiments are equipped with two movable foot pieces 102A, 102B located on opposite sides of the main foot member 100 relative to the direction of robot advance. The invention is not limited to this arrangement, however, and it is alternatively possible to omit one of the two movable foot pieces or to provide one or more additional ones. Irrespective of the number of movable foot members provided, however, the foot structure is generally constituted such that none of the ground contactable surfaces of the movable foot members extend outside the envelope enclosing the outer edge of the ground contact surface 109 constituted by the fixed ground contact members 706A-706B of the main foot member 100.

The foot structure according to the invention can be applied not only to binary walking robots but also to walking robots with one, or three, four or more feet.

Moreover, the present invention has thus been shown and described with reference to the specific embodiments. However, it should be noted that the present invention is in no way limited to the details of the described arrangements, changes and modifications may be made without departing from the scope of the appended claims.

What is claimed is:

1. A legged mobile robot, comprising:
    a foot having a lower surface for contacting the ground;
    a movable foot piece;
    an actuator connected with the movable foot piece for driving the movable foot piece in a first direction to increase the lower surface area of the foot and in a second direction to decrease the lower surface area of the foot; and
    a controller connected with the actuator for controlling the operation of the actuator.

2. A robot according to claim 1, wherein the movable foot piece is displaceably supported by the foot and the controller controls the operation of the actuator in response to a walking condition of the robot.

3. A robot according to claim 1, further including:
    means for detecting if the foot is off the ground;
    and the controller controls the operation of the actuator to drive the movable foot piece when the foot is off the ground.

4. A robot according to claim 1, wherein the controller controls the operation of the actuator to drive the movable foot piece in the second direction and then in the first direction immediately before the foot lands on the ground.

5. A robot according to claim 2, wherein the controller controls the operation of the actuator to drive the movable foot piece in the second direction when a walking speed of the robot exceeds a predetermined speed.

6. A robot according to claim 2, wherein the controller controls the operation of the actuator to drive the movable foot piece in the second direction when the robot climbs stairs.

7. A robot according to claim 6, wherein the controller controls the operation of the actuator to drive the movable foot piece in the second direction such that a distance between the foot's forward end and a point at which the foot is connected to the leg is reduced when the robot climbs stairs.

8. A robot according to claim 2, wherein the controller controls the operation of the actuator to drive the movable foot piece in the first direction when the robot descends stairs.

9. A robot according to claim 8, wherein the controller controls the operation of the actuator to drive the movable foot piece in the first direction such that a distance between the foot's forward end and a point at which the foot is connected to the leg is enlarged when the robot descends stairs.

10. A robot according to claim 2, wherein the controller controls the operation of the actuator to drive the movable foot piece in the first direction when the ground is inclined.

11. A robot according to claim 1, further including:
    a seismometer linked to the controller, for detecting the occurrence of an earthquake;
    and the controller controls the operation of the actuator to drive the movable foot piece in the first direction when an earthquake is detected to occur.

12. A robot according to claim 1, further including:
    a transmission mechanism interposed between the movable foot piece and the actuator.

13. A robot according to claim 12, wherein the transmission mechanism acts to absorb ground reaction force generated when the foot lands on the ground.

14. A robot according to claim 1, wherein the robot has a plurality of legs and the controller controls the operation of the actuator to drive the movable foot piece in the first direction, when the plurality of legs are contacting the ground.

15. A robot according to claim 1, wherein the first direction and the second direction are in a plane parallel with the ground.

16. A robot according to claim 1, wherein the first direction and the second direction are in a plane parallel with the robot's forward direction.

17. A robot according to claim 16, wherein the movable foot piece is driven in the plane about an axis parallel with the ground.

18. A robot according to claim 2, wherein the robot has a plurality of legs, with substantially each leg having at least one movable foot piece and an actuator for driving the foot piece.

19. A robot according to claim 1, wherein the robot is a biped robot.

20. The robot according to claim 1 wherein the movable foot piece is positioned at an edge of the foot.

21. The robot according to claim 1 wherein the movable foot piece is positioned at a corner of the foot.

22. The robot of claim 1 wherein the movable foot piece is pivotably attached to the foot and is movable in a plane parallel to the lower surface of the foot.

23. The robot according to claim 1 wherein driving the movable foot piece changes the length or width of the profile of the foot.

24. A legged mobile robot having at least one leg with a foot contacting the ground, comprising:
a movable foot piece;
an actuator connected with the movable foot piece for driving the movable foot into a first position at which a ratio between a first distance between one end of a surface of the foot contacting the ground and a point at which the foot is connected to the leg and a second distance between the opposite end of the surface and the point is enlarged, or into a second position at which the ratio is reduced; and
a controller connected to the actuator for controlling the operation of the actuator.

25. A robot according to claim 24, wherein the movable foot piece is provided at the foot and the controller controls the operation of the actuator in response to a walking condition of the robot.

26. A robot according to claim 24, further including:
means for detecting if the foot is off the ground;
and the controller controls the operation of the actuator to drive the foot piece into either the first or second position when the foot is off the ground.

27. A robot according to claim 25, wherein the controller controls the operation of the actuator to drive the movable foot piece into the first position when a walking speed of the robot exceeds a predetermined speed.

28. A robot according to claim 25, wherein the controller controls the operation of the actuator to drive the movable foot piece into the first position when the robot climbs stairs.

29. A robot according to claim 28, wherein the controller controls the operation of the actuator to drive the movable foot piece into the first position such that the ratio becomes approximately 1 when the robot climbs stairs.

30. A robot according to claim 25, wherein the controller controls the operation of the actuator to drive the movable foot piece into the second position when the robot descends stairs.

31. A robot according to claim 29, further including:
a transmission mechanism interposed between the movable foot piece and the actuator.

32. A robot according to claim 31, wherein the transmission mechanism acts to absorb ground reaction force generated when the foot lands on the ground.

33. A robot according to claim 24, wherein the first position and the second position are in a plane parallel with the ground.

34. A robot according to claim 24, wherein the first position and the second position are in a plane parallel with the robot's forward direction.

35. A robot according to claim 34, wherein the movable foot piece is driven in a plane about an axis parallel with the ground.

36. A robot according to claim 25, wherein a plurality of the movable foot pieces are provided and the controller controls the actuator's operation at least with respect to one of the movable foot piece.

37. A robot according to claim 24, wherein the robot is a biped robot.

38. A legged mobile robot having at least one leg comprising:
a foot connected to the leg and having a bottom surface for contacting the ground;
a movable foot piece provided at an edge of the foot;
an actuator connected with the movable foot piece for driving the movable foot piece within a range between a first position at which the movable foot piece contacts the ground and a second position at which the second portion does not contact the ground; and
a controller connected with the actuator for controlling the operation of the actuator.

39. A robot according to claim 38, wherein the controller controls the operation of the actuator in response to a walking condition of the robot.

40. A robot according to claim 39, wherein the controller controls the operation of the actuator to drive the movable foot piece into the second position when the robot walks on flat ground.

41. A robot according to claim 36, wherein a plurality of movable foot pieces are provided at the foot and the controller controls the actuator's operation to drive at least one movable foot piece into the second position when the robot walks on flat ground.

42. A robot according to claim 39, wherein the controller controls the operation of the actuator to drive the movable foot piece into the first position when the robot walks.

43. A robot according to claim 42, wherein the controller controls the actuator's operation to drive the movable foot piece into the first position when the robot moves on stairs.

44. A robot according to claim 42, further including:
means for detecting if the foot is off the ground;
and the controller controls the actuator's operation to drive the movable foot piece into the first position when foot is off the ground.

45. A robot according to claim 38, wherein at least one of the bottom surface of the foot and a bottom surface of the movable foot piece includes an elastic pad.

46. A robot according to claim 38, wherein the robot is a biped robot.

* * * * *

UNITED STATES PATENT AND TRADEMARK OFFICE
CERTIFICATE OF CORRECTION

PATENT NO. : 5,416,393
DATED : May 16, 1995
INVENTOR(S) : Gomi et al.

It is certified that error appears in the above-identified patent and that said Letters Patent is hereby corrected as shown below:

Column 26, line 1, change the numeral "29" to read -- 24 --.

Column 26, line 42, change the numeral "36" to read -- 40 --.

Signed and Sealed this

Twenty-second Day of July, 1997

BRUCE LEHMAN

*Attest:*

*Attesting Officer*      *Commissioner of Patents and Trademarks*